(12) United States Patent
Beecher et al.

(10) Patent No.: US 12,522,137 B2
(45) Date of Patent: Jan. 13, 2026

(54) ACTUATOR FOR FOLDING AND ADJUSTMENT

(71) Applicant: MOTHERSON INNOVATIONS COMPANY LTD., London (GB)

(72) Inventors: Stephen Beecher, Portchester (GB); Tom Harris, Portchester (GB); Gareth Aspden, Portchester (GB); David Kershaw, Portchester (GB); Levente Kurti, Portchester (GB); Dong Myeong Park, Portchester (GB); Warwick Jones, Portchester (GB)

(73) Assignee: Motherson Innovations Company Limited, London (GB)

( * ) Notice: Subject to any disclaimer, the term of this patent is extended or adjusted under 35 U.S.C. 154(b) by 365 days.

(21) Appl. No.: 18/040,578

(22) PCT Filed: Oct. 1, 2021

(86) PCT No.: PCT/EP2021/077170
§ 371 (c)(1),
(2) Date: Feb. 3, 2023

(87) PCT Pub. No.: WO2022/069737
PCT Pub. Date: Apr. 7, 2022

(65) Prior Publication Data
US 2023/0278495 A1    Sep. 7, 2023

Related U.S. Application Data

(60) Provisional application No. 63/086,746, filed on Oct. 2, 2020.

(51) Int. Cl.
*B60R 1/074*    (2006.01)
(52) U.S. Cl.
CPC .................................. *B60R 1/074* (2013.01)

(58) Field of Classification Search
CPC ...................................................... B60R 1/074
See application file for complete search history.

(56) References Cited

U.S. PATENT DOCUMENTS

2006/0117890 A1    6/2006  Li et al.
2017/0240114 A1*   8/2017  Brouwer ............... B60R 1/072
(Continued)

FOREIGN PATENT DOCUMENTS

CN      102320263       1/2012
DE      102019108303    10/2020
(Continued)

OTHER PUBLICATIONS

Patent Cooperation Treaty, PCT/EP2021/077170, International Search Report and Written Opinion, Jan. 20, 2022.

*Primary Examiner* — Bobby Rushing, Jr.
(74) *Attorney, Agent, or Firm* — Jones Day

(57) ABSTRACT

The present disclosure refers to a gear assembly (502) for an actuator (400), comprising a gear assembly (502) having a secondary tilt gear (620) and a secondary fold gear (622); wherein said secondary tilt gear (620) comprises a first spur gear portion (902), a first worm gear portion (904), and a first transition point (906), wherein said first transition point (906) divides said secondary tilt gear (620) into said first spur gear portion (902) and said first worm gear portion (904); wherein said secondary fold gear (622) comprises a second spur gear portion (912), a second worm gear portion (914), and a second transition point (916), wherein said second transition point (916) divides said secondary fold gear (622) into said second spur gear portion (912) and said second worm gear portion (914); and wherein said second worm gear portion (914) and said second spur gear portion (912) are formed as a single element. It also refers to an (Continued)

actuator (400) with such a gear assembly (502) and a rearview device (102, 104) with such an actuator (400).

10 Claims, 48 Drawing Sheets

(56) References Cited

U.S. PATENT DOCUMENTS

2021/0046875 A1\*  2/2021  Harris .................... B60R 1/072
2021/0213880 A1\*  7/2021  Esser ..................... G02B 7/182

FOREIGN PATENT DOCUMENTS

WO    WO 2016/076713         5/2016
WO    WO-2019226423 A1 \* 11/2019  ........... G02B 7/1827

\* cited by examiner

ACTUATOR FOR FOLDING AND ADJUSTMENT

CROSS-REFERENCE TO RELATED APPLICATIONS

This application is a is a National Stage Entry of International Patent Application No. PCT/EP2021/077170, filed on Oct. 1, 2021, which claims the benefit of priority to U.S. Provisional Application No. 63/086,746, filed on Oct. 2, 2020, each of which is hereby incorporated by reference in its entirety for all purposes.

FIELD

The present disclosure relates to a gear assembly, an actuator for folding and adjustment for use with a rearview device and rearview device.

BACKGROUND

The statements in this section merely provide background information related to the present disclosure and may not constitute prior art.

Vehicles are mandated by safety regulation to have a rearview system that is operable to provide a driver of the vehicle a rearward field of view. The rearview system typically includes one or more components that are required to be actuated relative to the vehicle body along a first axis, such components may include mirrors or cameras. As an example, the actuation of components along a first axis may provide the driver of the vehicle the ability to fine tune the rearward field of view provided by the rearview system.

Further, some rearview systems provide actuation of one or more components along a second axis, such components may include mirrors or cameras. As an example, the actuation of components along a secondary axis allows the components to be stored closer to the vehicle body in certain conditions. Generally, actuation of components in a rearview system along a secondary axis is achieved using a secondary actuator.

Electromechanical actuators are typically used to rotate the components relative to the vehicle body. However, existing electromechanical actuators may be noisy, heavy, and large in size and often require high strength metallic parts (e.g., gearing) due to high shock loads acting on a gear train during impacts, thereby making the actuators heavier and costlier.

It is the object of the present disclosure to provide a gear assembly for an actuator as well as an actuator overcoming the drawbacks of the prior art. In particular the disclosure allows the use of a single actuator to provide adjustment of components along multiple axes allows for adjustment along a second axis which can reduce rearview system design cost and complexity.

SUMMARY

The object of the present disclosure is solved by embodiments recited in the claims. Certain embodiments include further gear assemblies according to the present disclosure. Certain embodiments include a rearview device with an actuator of the present disclosure.

Thus according to a first aspect of the present disclosure there is provided a gear assembly for an actuator comprising: a gear assembly having a secondary tilt gear and a secondary fold gear; wherein said secondary tilt gear comprises a first spur gear portion, a first worm gear portion, and a first transition point, wherein said first transition point divides said secondary tilt gear into said first spur gear portion and said first worm gear portion; wherein said first worm gear portion comprises a first end having a first diameter and a second end having a second diameter, wherein said first end is disposed adjacent to said first transition point of said secondary tilt gear and, wherein said second end is disposed opposite of said first end, and wherein said first diameter is larger than said second diameter; wherein said secondary fold gear comprises a second spur gear portion, a second worm gear portion, and a second transition point, wherein said second transition point divides said secondary fold gear into said second spur gear portion and said second worm gear portion; wherein said second worm gear portion comprises a third end having a third diameter and a fourth end having a fourth diameter, wherein said third end is disposed adjacent to said second transition point of said secondary fold gear and, wherein said fourth end is disposed opposite of said third end, and wherein said third diameter is larger than said fourth diameter; and wherein said second worm gear portion and said second spur gear portion are formed as a single element.

It is another aspect of the present disclosure, wherein said secondary fold gear comprises a cavity.

It is another aspect of the present disclosure, said gear assembly further comprising a biasing element and a worm insert, wherein the biasing element is received into said cavity of said secondary fold gear such that said worm insert is movably received in said cavity and abutted against said biasing element.

According to a second aspect of the present disclosure, there is provided a gear assembly for an actuator comprising: a secondary tilt gear comprising an aperture; a secondary fold gear comprising an aperture and a cavity; a spindle having a first end and a second end; a biasing element; a worm insert; a slide having a channel; wherein said aperture of said secondary tilt gear receives said first end of said spindle; wherein said slide is attached to said spindle by fitting said channel onto said spindle, and wherein said slide is arranged adjacent to said secondary tilt gear; wherein said biasing element is arranged to be received inside of said cavity of said secondary fold gear; wherein said worm insert is arranged to be received inside of said cavity of said secondary fold gear; wherein said biasing element is received into said cavity of said secondary fold gear such that said worm insert is movably received in said cavity and abutted against said biasing element; and wherein said aperture of said secondary fold gear receives said second end of said spindle.

It is another aspect of the present disclosure, wherein said biasing element exerts a biasing force against said worm insert; and wherein said biasing force biases said slide towards said secondary tilt gear.

It is another aspect of the present disclosure, wherein said secondary tilt gear further comprises a first spur gear portion, a first worm gear portion, and a first transition point, wherein said first transition point divides said secondary tilt gear into said first spur gear portion and said first worm gear portion; wherein said first worm gear portion comprises a first end having a first diameter and a second end having a second diameter, wherein said first end is disposed adjacent to said first transition point of said secondary tilt gear and, wherein said second end is disposed opposite of said first end, and wherein said first diameter is larger than said second diameter; wherein said secondary fold gear further comprises a second spur gear portion, a second worm gear portion, and a second transition point, wherein said second transition point divides said secondary fold gear into said second spur gear portion and said second worm gear portion; wherein said second worm gear portion comprises a third end having a third diameter and a fourth end having a fourth diameter, wherein said third end is disposed adjacent to said second transition point of said secondary fold gear and, wherein said fourth end is disposed opposite of said third end, and wherein said third diameter is larger than said fourth diameter; and wherein said second worm gear portion and said second spur gear portion are formed as a single element.

According to a third aspect of the present disclosure, an actuator is provided for use with a rearview device having a mirror head and a mirror base, said actuator comprising: a fold drive operable to rotate said mirror head in a first direction about a first axis relative to said mirror base and rotate said mirror head in a second direction about said first axis; a tilt drive operable to rotate said mirror head in a third direction about a second axis relative to said mirror base and rotate said mirror head in a fourth direction about said second axis relative to said mirror base; a gear assembly comprising a secondary tilt gear and a secondary fold gear; wherein the rotation of said secondary fold gear in a first secondary fold gear direction results in said fold drive rotating said mirror head in said first direction about said first axis and wherein the rotation of said secondary fold gear in a second secondary fold gear direction results in said fold drive rotating said mirror head in said second direction about said first axis; and wherein the rotation of said secondary tilt gear in a first secondary tilt gear direction results in said tilt drive rotating said mirror head in said third direction about said second axis and wherein the rotation of said secondary tilt gear in a second secondary tilt gear direction results in said tilt drive rotating said mirror head in said fourth direction about said second axis.

It is another aspect of the present disclosure, wherein said secondary fold gear may rotate as said secondary tilt gear remains stationary.

It is another aspect of the present disclosure, wherein said secondary tilt gear may rotate as said secondary fold gear remains stationary.

It is another aspect of the present disclosure, wherein said secondary fold gear may rotate as said secondary tilt gear rotates.

According to a fourth aspect of the present disclosure, an actuator is provided for a rearview device, said actuator comprising: a primary fold gear; and a secondary fold gear; said primary fold gear comprising a plurality of extensions extending radially inward from an inner circumference of said primary fold gear; and a first set of teeth; wherein a distance between each of said plurality of extensions is uniformly arranged around said inner circumference; and wherein said plurality of extensions further comprises a first taper; said secondary fold gear having a second set of teeth; and wherein said first set of teeth of said primary fold gear mesh with said second set of teeth of said secondary fold gear such that said first set of teeth and said second set of teeth have a first spacing.

It is another aspect of the present disclosure, said actuator further comprising: a gear seat arranged adjacent to said primary fold gear; wherein said gear seat has a second taper; and wherein said first taper of said primary fold gear contacts said second taper of said gear seat.

It is another aspect of the present disclosure, said actuator further comprising a spring operable to apply a biasing force to said primary fold gear such that said primary fold gear is biased towards said gear seat; and wherein a deformation of the primary fold gear occurs when said primary fold gear is biased towards said gear seat.

It is another aspect of the present disclosure, wherein said deformation of said primary fold gear modifies the first spacing between said first set of teeth of said primary fold gear and said second set of teeth of said secondary fold gear to a second spacing; wherein said first spacing is different than said second spacing.

It is another aspect of the present disclosure, wherein said actuator further comprises a secondary tilt gear comprising a spur gear portion, a worm gear portion, and a transition point; wherein said transition point divides said secondary fold gear into said spur gear portion and said worm gear portion; and wherein said worm gear portion comprises a second set of teeth.

According to a fifth aspect of the present disclosure, an actuator is provided for a rearview device, said actuator comprising: a gear assembly comprising a primary tilt gear, a spindle and a carrier arranged on said spindle wherein said carrier comprises a slot; wherein said primary tilt gear comprises a carrier connector receivable in said slot of said carrier; wherein said primary tilt gear may rotate in a first tilt direction or a second tilt direction; and wherein said carrier is slidable in a first translation direction along said spindle when the primary tilt gear rotates in said first tilt direction; and said carrier is slidable in a second translation distance along the spindle when said primary tilt gear rotates in said second tilt direction.

It is another aspect of the present disclosure, said actuator further comprising a wiper attached to said carrier.

It is another aspect of the present disclosure, said actuator further comprising a printed circuit board (PCB) with an attached carbon strip wherein said wiper contacts said carbon strip.

It is another aspect of the present disclosure, wherein said wiper is slidable along said carbon strip in a first wiper direction when said carrier slides in said first translation direction along said spindle; and wherein said wiper is slidable along said carbon strip in a second wiper direction when said carrier slides in said second translation direction along said spindle.

It should be noted that the features set out individually in the following description can be combined with each other in any technically advantageous manner and set out other forms of the present disclosure. It should be understood, however, that the disclosure is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the disclosure. The figures are not necessarily drawn to scale. Like numbers used in the figures refer to like components. However, it will be understood that the use of a number to refer to a component in a given figure is not intended to limit the component in another figure labelled with the same number. The description further characterizes and specifies the present disclosure in particular in connection with the figures.

DRAWINGS

In order that the disclosure may be well understood, there will now be described various forms thereof, given by way of example, reference being made to the accompanying drawings, in which.

DETAILED DESCRIPTION

Figure 1:
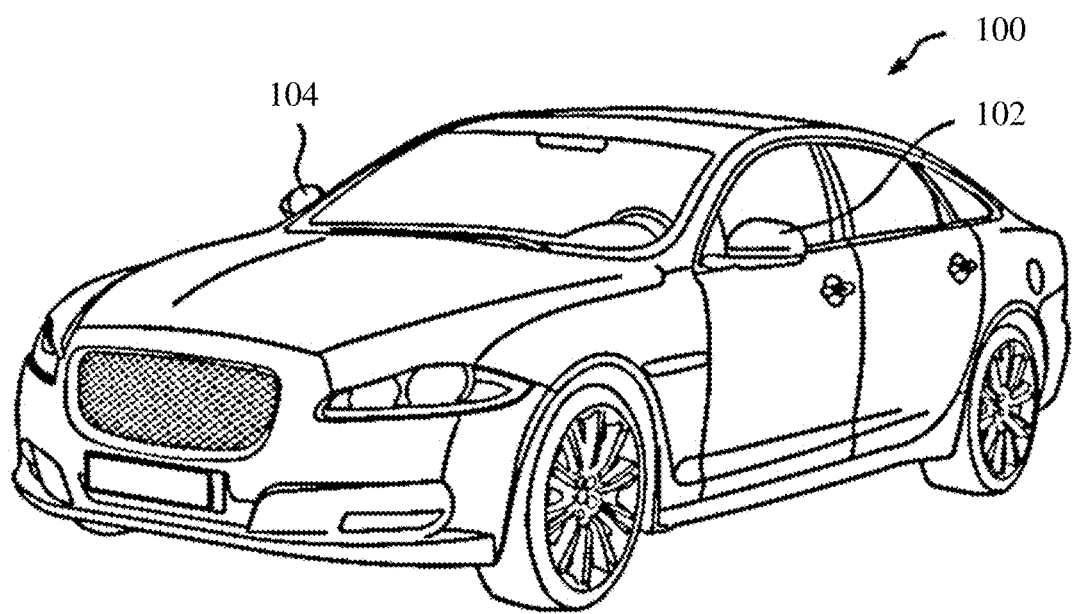
FIG. 1 illustrates a vehicle in accordance with aspects of the present disclosure.

The following description is merely exemplary in nature and is not intended to limit the present disclosure, application, or uses. It should be understood that throughout the drawings, corresponding reference numerals indicate like or corresponding parts and features.

FIG. 1 illustrates a vehicle 100 in accordance with aspects of the present disclosure.

As shown in FIG. 1, vehicle 100 includes a rearview mirror assembly 102 and a rearview mirror assembly 104.

Although vehicle 100 is illustrated as a passenger car, vehicle 100 may be any other type of vehicle, non-limiting examples of vehicle 100 include a truck, off-road vehicle, bus, motorcycle, aircraft, tram, locomotive, or heavy-duty vehicle.

In FIG. 1, rearview mirror assembly 102 and rearview mirror assembly 104 are illustrated as side view mirrors. In alternative variations, rearview mirror assembly 102 and rearview mirror assembly 104 may be implemented as camera systems. Rearview mirror assembly 102 and rearview mirror assembly 104 are arranged on vehicle 100 such that they may be adjusted to provide a view rearward of the vehicle to the driver.

The operation of rearview mirror assembly 102 and rearview mirror assembly 104 will now be further described with additional reference to FIGS. 2A-3C.

Figure 2A:
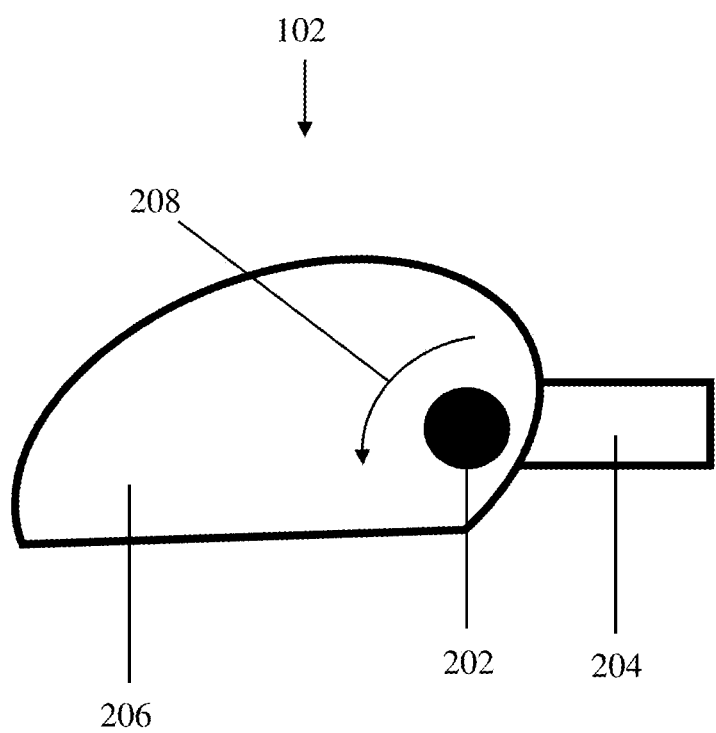
FIG. 2A illustrates a top down view of a rearview mirror assembly in accordance with aspects of the present disclosure, in the driving position.
Figure 2B:
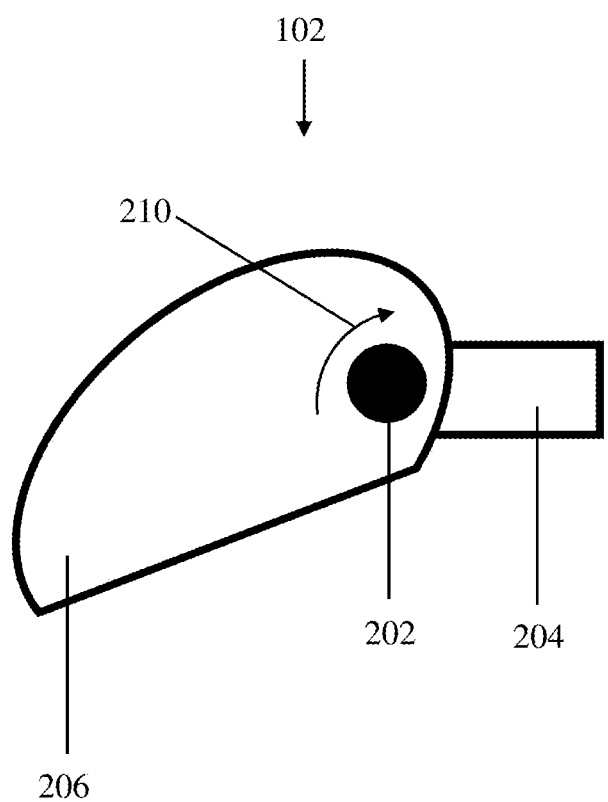
FIG. 2B illustrates the top down view of the rearview mirror assembly of FIG. 2A, rotated into a stored position.

FIG. 2A-B illustrates a top down view of rearview mirror assembly 102 in accordance with aspects of the present disclosure.

As shown in the figure, rearview mirror assembly 102 includes an axis 202, a mirror base 204, and a mirror head 206. In FIG. 2A, rearview mirror assembly 102 can be seen in a top down view with mirror head 206 in the drive position. When actuated in a first fold direction 208 relative to axis 202, movement is imparted to mirror head 206 to rotate it around axis 202 to a stored position as shown in FIG. 2B. Additionally, when actuated in second fold direction 210 relative to axis 202, movement can be imparted to mirror head 206 when in the stored position shown in FIG. 2B to rotate it back to the drive position shown in FIG. 2A.

The actuation of the mirror head about axis 202 can be done from any position to move the mirror head to any other position about axis 202. For example, the mirror head may start in the stored position as shown in FIG. 2B and then be actuated in the second fold direction 210 about axis 202 to move the mirror head to the drive position. Mirror head 206 may be adjusted to any position between the drive position shown in FIG. 2A and the stored position shown in FIG. 2B.

Additionally, when mirror head 206 is in the drive position as shown in FIG. 2A, actuation can be performed such that it moves mirror head 206 to adjust the rearward field of view of the driver of the vehicle. Generally, the amount of movement adjusting mirror head 206 such that it adjusts the rearward field of view of the driver of the vehicle is less than the movement required to adjust mirror head 206 from the drive position to the stored position or from the stored position to the drive position.

Figure 3A:
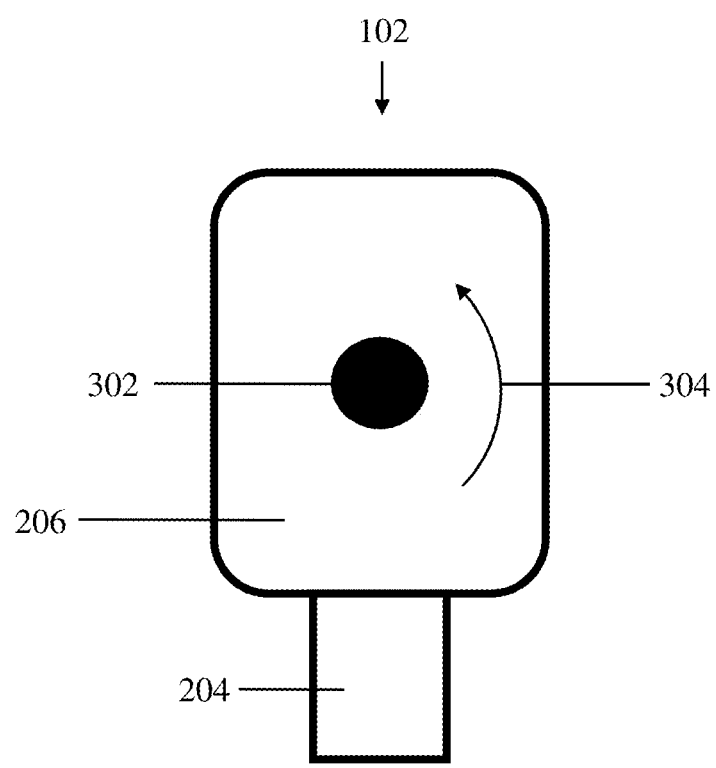
FIG. 3A illustrates a side view of rearview mirror assembly in accordance with aspects of the present disclosure.
Figure 3B:
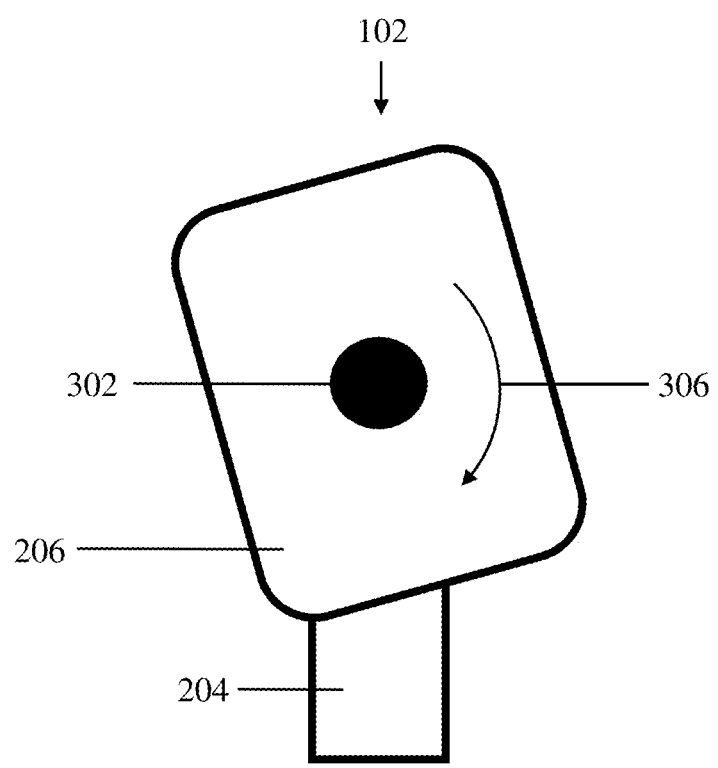
FIG. 3B illustrates a side view of rearview mirror assembly in accordance with aspects of the present disclosure.
Figure 3C:
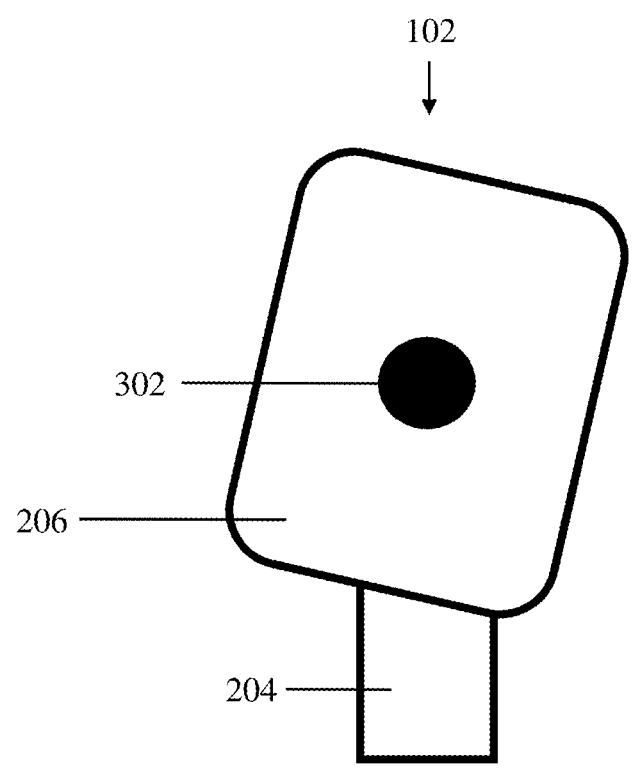
FIG. 3C illustrates a side view of rearview mirror assembly in accordance with aspects of the present disclosure.

FIG. 3A-C illustrates a side view of rearview mirror assembly 102 in accordance with aspects of the present disclosure.

As shown in FIG. 3A-C, rearview mirror assembly 102 includes a mirror base 204, a mirror head 206, and an axis 302. In FIG. 3A, rearview mirror assembly 102 can be seen in a side view with mirror head 206 in a nominal position. When actuated in first tilt direction 304, movement is imparted to mirror head 206 such that it is tilted upwards to the position shown in FIG. 3B. When actuated in second tilt direction 306, movement is imparted to mirror head 206 such that it is tilted downward to the position shown in FIG. 3C.

The actuation of the mirror head 206 about axis 302 can be done from any position to move the mirror head 206 to any other position about axis 302. For example, the mirror head 206 may start in a tilted upwards position as shown in FIG. 3B and then actuated in the second tilt direction 306 to tilt the mirror head downwards. While being tilted downwards, actuation can be stopped to adjust the mirror head 206 to the nominal position shown in FIG. 3A or continued to adjust the mirror head 206 downwards until it reaches the position shown in FIG. 3C. Further, the mirror head 206 can be tilted to any position between the positions shown in FIG. 3B and FIG. 3C. The description and the discussion of the figures that follows is in regards to rearview mirror assembly 102, however it should be noted that rearview mirror assembly 104 functions in a similar fashion.

Figure 4:
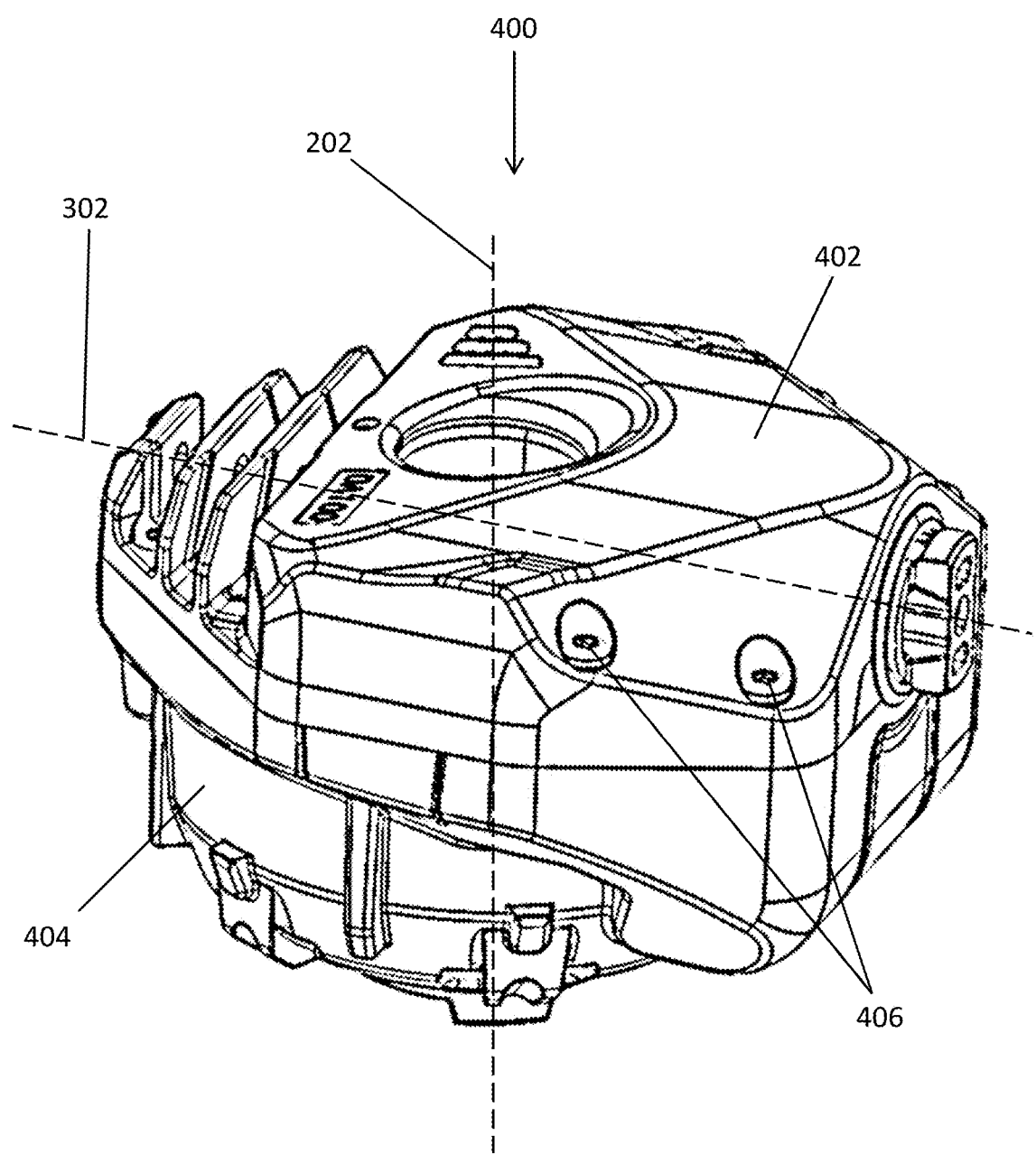
FIG. 4 illustrates an actuator in accordance with aspects of the present disclosure.

FIG. 4 illustrates an actuator in accordance with aspects of the present disclosure.

As shown in the figure, actuator 400 includes axis 202, axis 302, an upper housing 402, a lower housing 404, and fasteners 406.

Upper housing 402 and lower housing 404 are joined together using fasteners 406 so that they may house and seal the internal components of actuator 400. Fasteners 406 may be any known fastener or fastening method, non-limiting examples of which include bolts, clips, or pins. In this example, fasteners 406 are screws.

Figure 5:
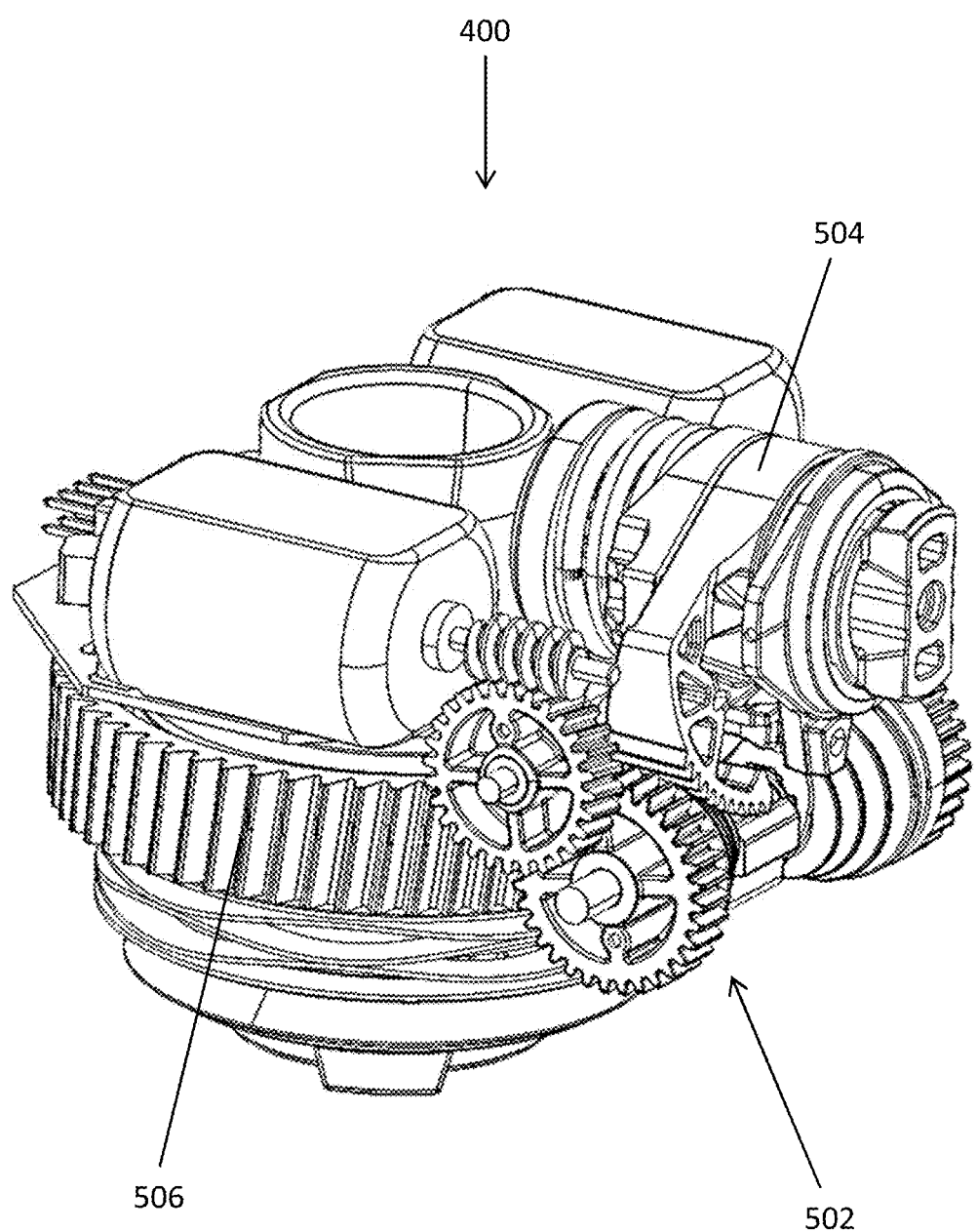
FIG. 5 illustrates an actuator with its upper housing and lower housing removed in accordance with aspects of the present disclosure.

FIG. 5 illustrates actuator 400 with upper housing 402 and lower housing 404 of FIG. 4 removed in accordance with aspects of the present disclosure.

As shown in the figure, actuator 400 includes a gear assembly 502, a tilt drive 504, and a fold drive 506. Tilt drive 504 is operable to rotate mirror head 206 around axis 302, and fold drive 506 is operable to rotate mirror head 206 around axis 202. The operation and arrangement of gear assembly 502, tilt drive 504, and fold drive 506 will now be described with additional reference to FIGS. 6-42.

Figure 6:
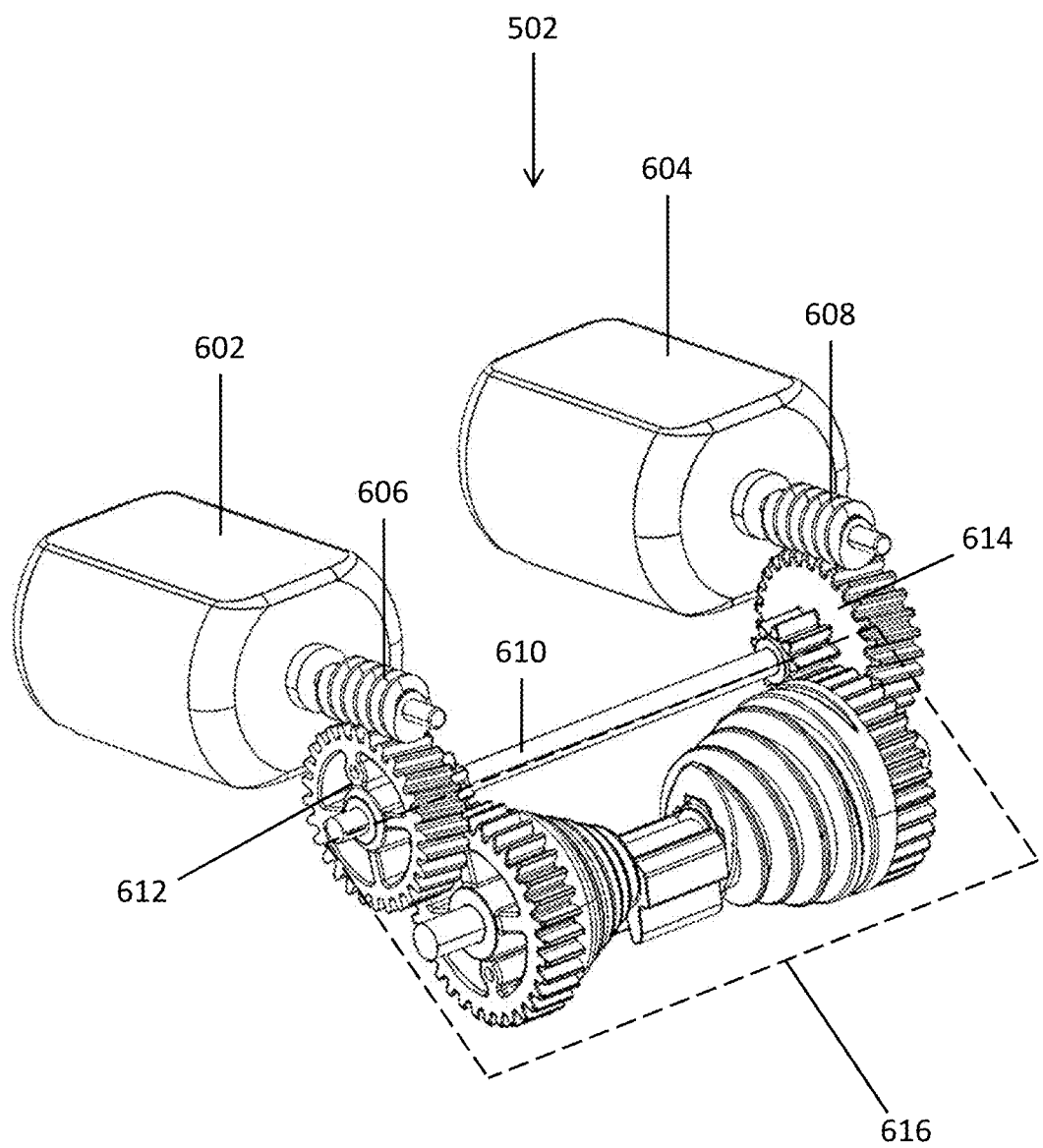
FIG. 6 illustrates a perspective view of a gear assembly in accordance with aspects of the present disclosure.

FIG. 6 illustrates a perspective view of gear assembly 502 in accordance with aspects of the present disclosure.

As shown in FIG. 6, gear assembly 502 includes a motor 602, a motor 604, a worm gear 606, a worm gear 608, an intermediate spindle 610, an intermediate tilt gear 612, an intermediate fold gear 614, and a gear sub assembly 616. The operation of gear assembly 502 and gear sub assembly 616 will now be described with additional reference to FIGS. 7-14.

Figure 7:
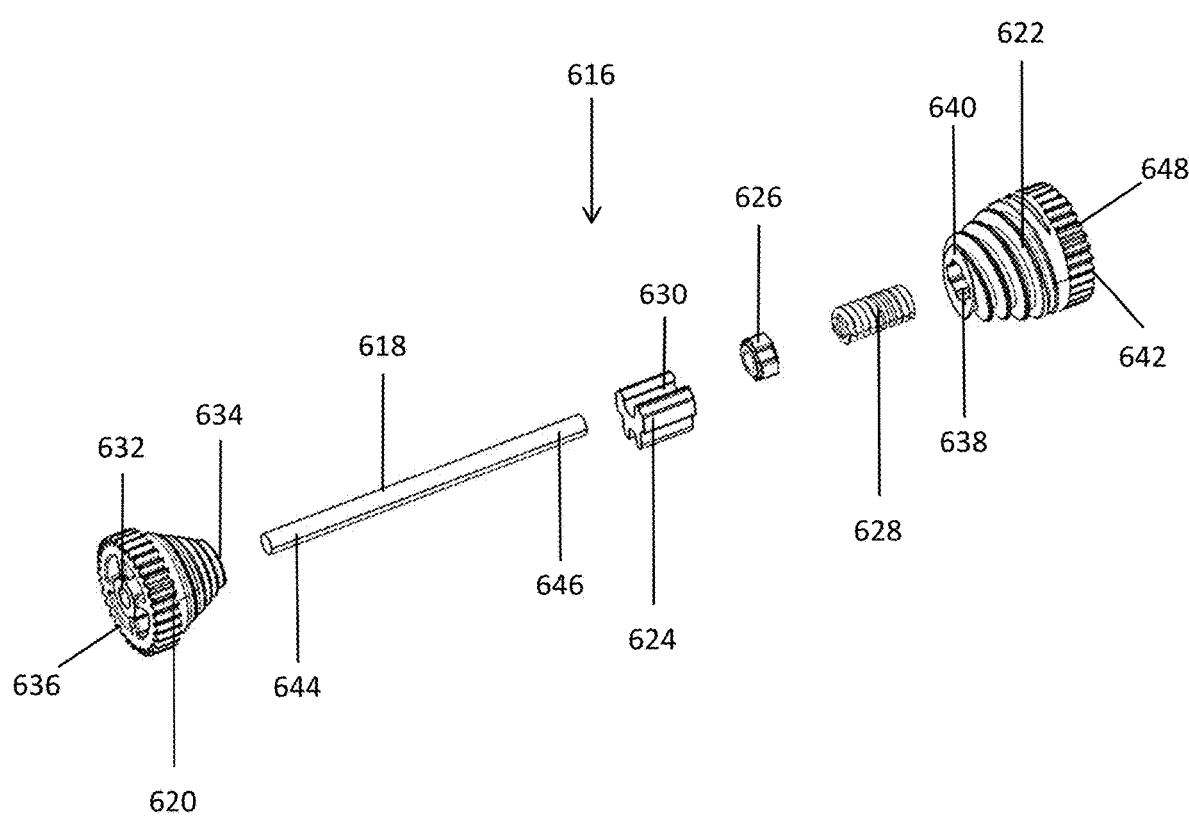
FIG. 7 illustrates an exploded view of a gear sub assembly in accordance with aspects of the present disclosure.
Figure 8:
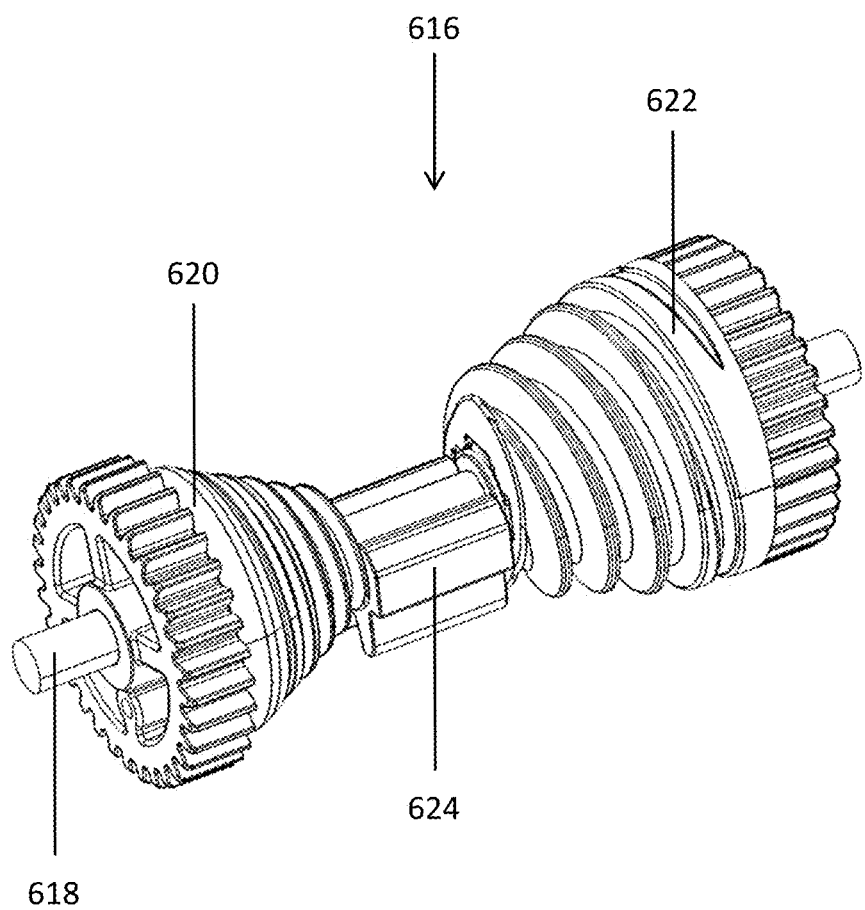
FIG. 8 illustrates a gear sub assembly fully assembled in accordance with aspects of the present disclosure.

FIG. 7 illustrates an exploded view of gear sub assembly 616 and FIG. 8 illustrates gear sub assembly 616 fully assembled in accordance with aspects of the present disclosure. As shown in the figures, gear sub assembly 616 includes a spindle 618, a secondary tilt gear 620, a secondary fold gear 622, a slide 624, a worm insert 626, and a biasing element 628. In this example variation, biasing element 628 is a spring. However in other variations, biasing element 628 may be any element operable to provide a biasing force.

To assemble gear sub assembly 616, first end 644 of spindle 618 is inserted into aperture 632 of secondary tilt gear 620. Next, slide 624 is inserted onto second end 646 of spindle 618 via channel 630, the contour of channel 630 matches that of spindle 618 so that it may be attached to spindle 618. Once attached, slide 624 is moved along spindle 618 from second end 646 towards first end 644 until it abuts against boss 634 of secondary tilt gear 620. After slide 624 has been attached, worm insert 626 is placed onto second end 646 of spindle 618 followed by biasing element 628. At this time secondary fold gear 622 is arranged such that second end 646 of spindle 618 may be insert through cavity 638 and aperture 648. Once secondary fold gear 622 has been placed onto spindle 618 it can be moved from second end 646 towards first end 644 of spindle 618 until boss 640 abuts against slide 624.

Secondary fold gear 622 is arranged such that during the assembly of gear sub assembly 616, biasing element 628 and worm insert 626 are able to fit inside of cavity 638. Biasing element 628 and worm insert 626 arranged inside of cavity 638 enables secondary fold gear 622 to be slid along spindle 618 until it abuts against slide 624.

Figure 9:
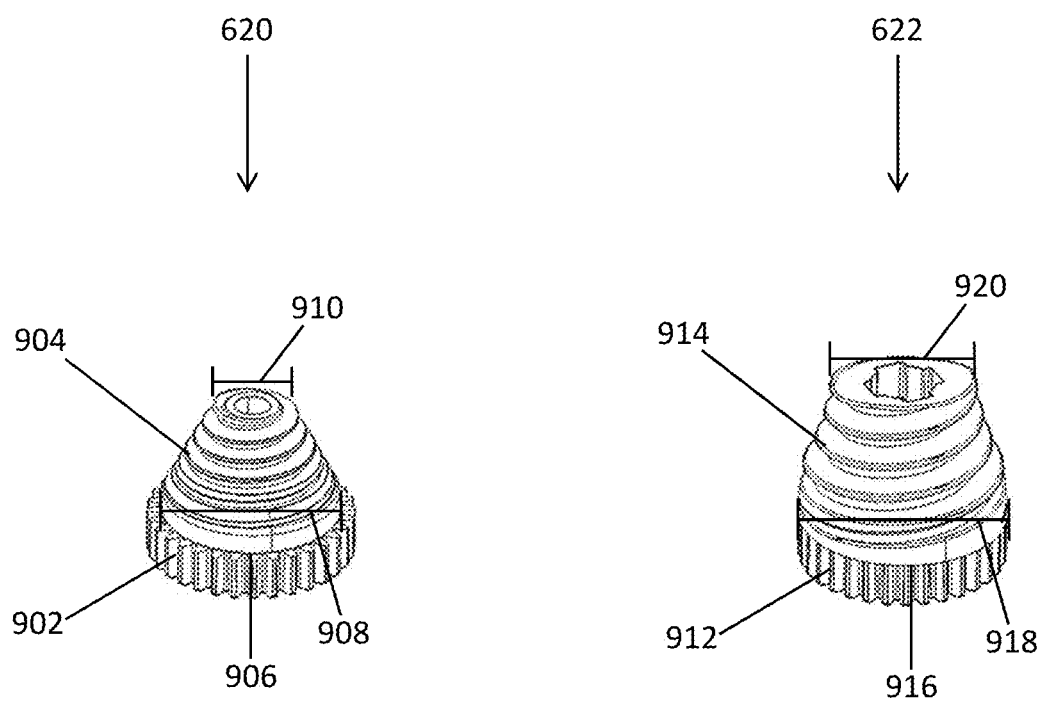
FIG. 9 illustrates a tilt gear and fold gear in accordance with aspects of the present disclosure.

FIG. 9 illustrates secondary tilt gear 620 and secondary fold gear 622 in accordance with aspects of the present disclosure. As shown in the figure, secondary tilt gear 620 includes a spur gear portion 902 and a worm gear portion 904. Secondary fold gear 622 includes a spur gear portion 912, and a worm gear portion 914.

The secondary tilt gear 620 and secondary fold gear 622 are formed as a single structure comprising two different gear portions. Secondary tilt gear 620 is formed by spur gear portion 902 and worm gear portion 904 and secondary fold gear 622 is formed by spur gear portion 912 and worm gear portion 914. Transition point 906 marks the transition from spur gear portion 902 to worm gear portion 904 of secondary tilt gear 620 and transition point 916 marks the transition from spur gear portion 912 to worm gear portion 914 of secondary fold gear 622. In this example variation, secondary tilt gear 620 and secondary fold gear 622 are formed from spur gear portions 902, 912 and worm gear portions 904, 914. In other example variations, secondary tilt gear 620 and secondary fold gear 622 may be formed from a combination of any number of different types of gears.

The formation of secondary tilt gear 620 and secondary fold gear 622 as a single component, each comprising a spur gear portion (902, 912) and a worm gear portion (904,914) helps prevent backlash within gear assembly 502, tilt drive 504, and fold drive 506 of FIG. 5.

A first end of worm gear portion 904, located at transition point 906, has a diameter shown by line 908. A second end of worm gear portion 904, opposite of its first end, has a diameter shown by line 910, where diameter 910 is smaller than diameter 908. Similarly, a first end of worm gear portion 914, located at transition point 916, has a diameter shown by line 918. A second end of worm gear portion 914, opposite of its first end, has a diameter shown by line 920, where diameter 920 is smaller than diameter 908. The relationship of worm gear portion 904 and worm gear portion 914 is such that diameter 908 is smaller than diameter 918 and diameter 910 is smaller than diameter 920.

Figure 10:
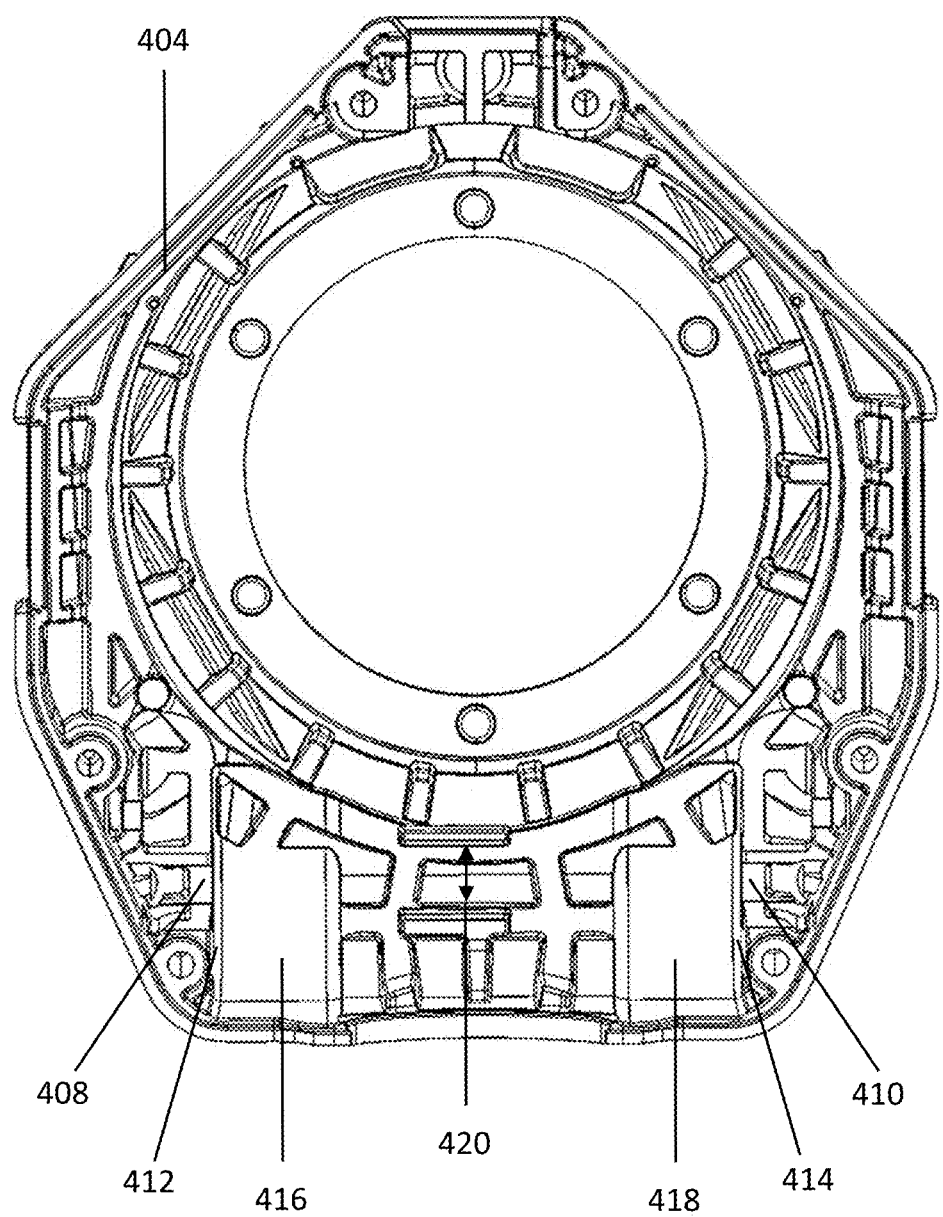
FIG. 10 illustrates a lower housing without a gear sub assembly installed in accordance with aspects of the present disclosure.
Figure 11:
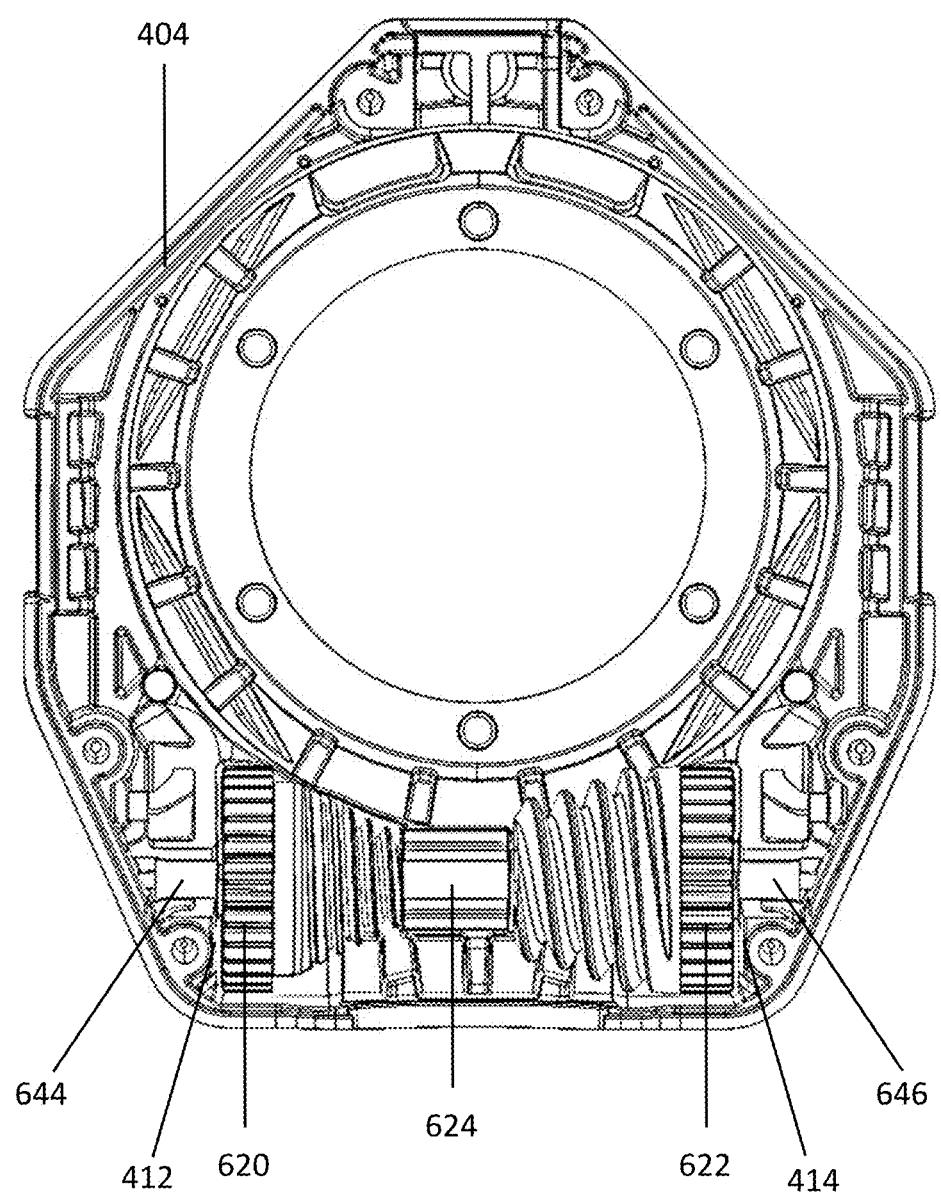
FIG. 11 illustrates a lower housing with a gear sub assembly installed in accordance with aspects of the present disclosure.

FIG. 10 illustrates lower housing 404 without gear sub assembly 616 installed and FIG. 11 illustrates lower housing 404 with gear sub assembly 616 installed in accordance with aspects of the present disclosure.

As shown in the figures, lower housing 404 includes a bearing 408, a bearing 410, an end surface 412, an end surface 414, a recess 416, a recess 418, and a channel 420. The listed components of lower housing 404 are designed such that they may receive and affix gear sub assembly 616 without impeding the operation of gear sub assembly 616 within actuator 400 of FIG. 4.

Bearing 408 is arranged to receive the first end 644 (FIG. 7) of spindle 618 and bearing 410 is arranged to receive the second end 646 (FIG. 7) of spindle 618. Recess 416 is arranged to receive secondary tilt gear 620 such that its end surface 636 (FIG. 7) abuts against end surface 412 and recess 418 is arranged to receive secondary fold gear 622 such that its end surface 642 (FIG. 7) abuts against end surface 414. In this configuration, slide 624 is received in channel 420 of lower housing 404.

Since lower housing 404 is a single part, the distance between end surface 412 and end surface 414 is fixed. The fixed distance between end surface 412 and end surface 414 means that gear sub assembly 616 is installed into lower housing 404 with worm insert 626 and biasing element 628 located within cavity 638 of secondary fold gear 622. Biasing element 628 is compressed so it may fit inside of cavity 638, once gear sub assembly 616 is installed within lower housing 404, biasing element 628 will then exert a force along the components of gear sub assembly 616.

The force exerted by biasing element 628 forces secondary tilt gear 620 against end surface 412 via worm insert 626 and slide 624, and also forces secondary fold gear 622 against end surface 414. The application of force by biasing element 628 improves the meshing between secondary tilt gear 620 and tilt drive 504 and between secondary fold gear 622 and fold drive 506. The improved meshing reduces backlash within gear sub assembly 616 that would occur if secondary tilt gear 620 or secondary fold gear 622 were able to freely slide along spindle 618.

Figure 12:
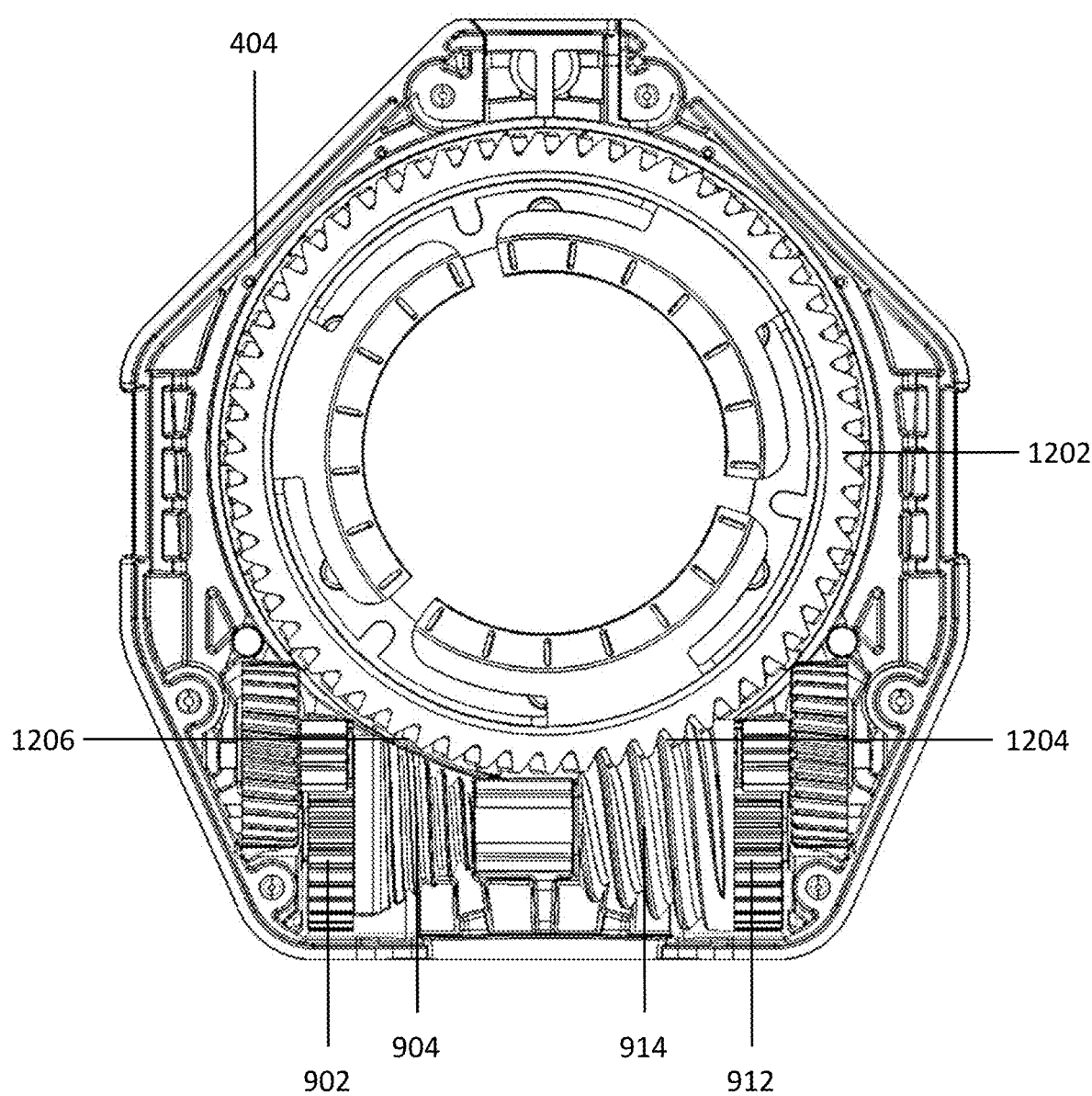
FIG. 12 illustrates the relative positions between a gear sub assembly and a fold drive in accordance with aspects of the present disclosure.

FIG. 12 illustrates the relative positions of gear sub assembly 616 and fold drive 506 in accordance with aspects of the present disclosure. As shown in the figure, gear sub assembly 616 is installed in lower housing 404 as described above in FIG. 10-11. FIG. 12 additionally shows primary fold gear 1202 of fold drive 506 in its installed position within actuator 400.

Point 1204 shows the meshing between worm gear portion 914 and the teeth of primary fold gear 1202, and point 1206 shows a gap between the teeth of worm gear portion 904 and primary fold gear 1202. Since worm gear portion 914 has a diameter 918 and diameter 920 that is larger than the corresponding diameters of worm gear portion 904, namely diameter 908 and diameter 910, worm gear portion 914 is operable to mesh with the teeth of primary fold gear 1202 while worm gear portion 904 does not. In this manner, secondary fold gear 622 can be rotated independent of secondary tilt gear 620 in order to operate fold drive 506.

Figure 13:
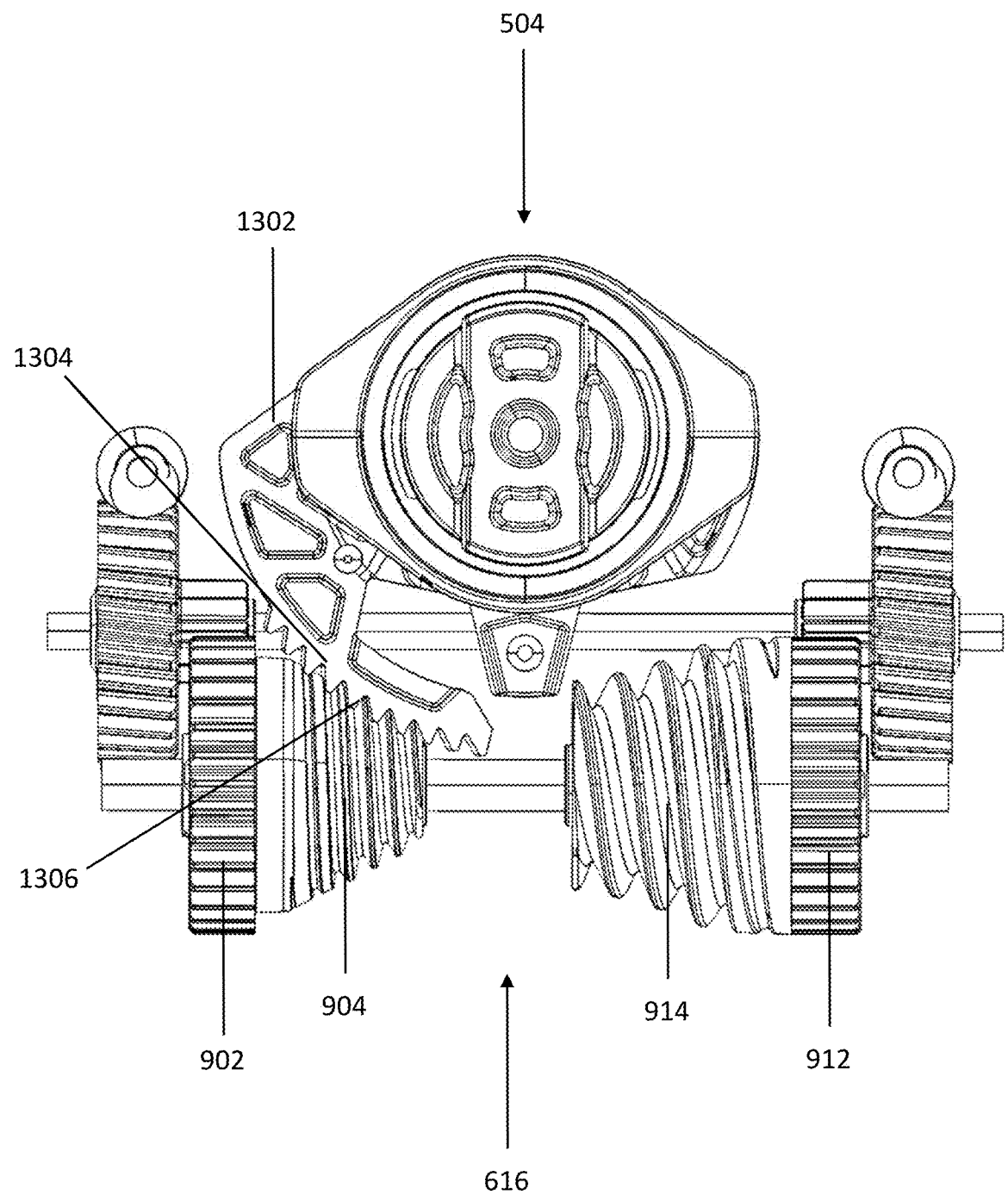
FIG. 13 illustrates the relative positions between a gear sub assembly and a tilt drive in accordance with aspects of the present disclosure.

FIG. 13 illustrates the relative positions of gear sub assembly 616 and tilt drive 504 in accordance with aspects of the present disclosure. As shown in the figure, gear sub assembly 616 is shown in its installed position within lower housing 404, however for clarity, lower housing 404 is not shown. The figure additionally shows primary tilt gear 1302 from tilt drive 504 in its installed position.

Point 1306 shows the meshing between worm gear portion 904 and the teeth of primary tilt gear 1302. The relationship of the diameters between worm gear portion 914 and worm gear portion 904 does not affect meshing with primary tilt gear 1302 in the same manner the relationship affected meshing with primary fold gear 1202 of FIG. 12.

Primary tilt gear 1302 has a tilt gear extension 1304 which extends in the direction of worm gear portion 904 and away from worm gear portion 914. This extension allows meshing between worm gear portion 904 and the teeth of primary tilt gear 1302 without interference from worm gear portion 914 even though worm gear portion 914 has a larger diameter, shown as diameter 918 of FIG. 9, when compared to diameter 908 of FIG. 9. In this manner, secondary tilt gear 620 can be rotated independent of secondary fold gear 622 in order to operate tilt drive 504.

Figure 14:
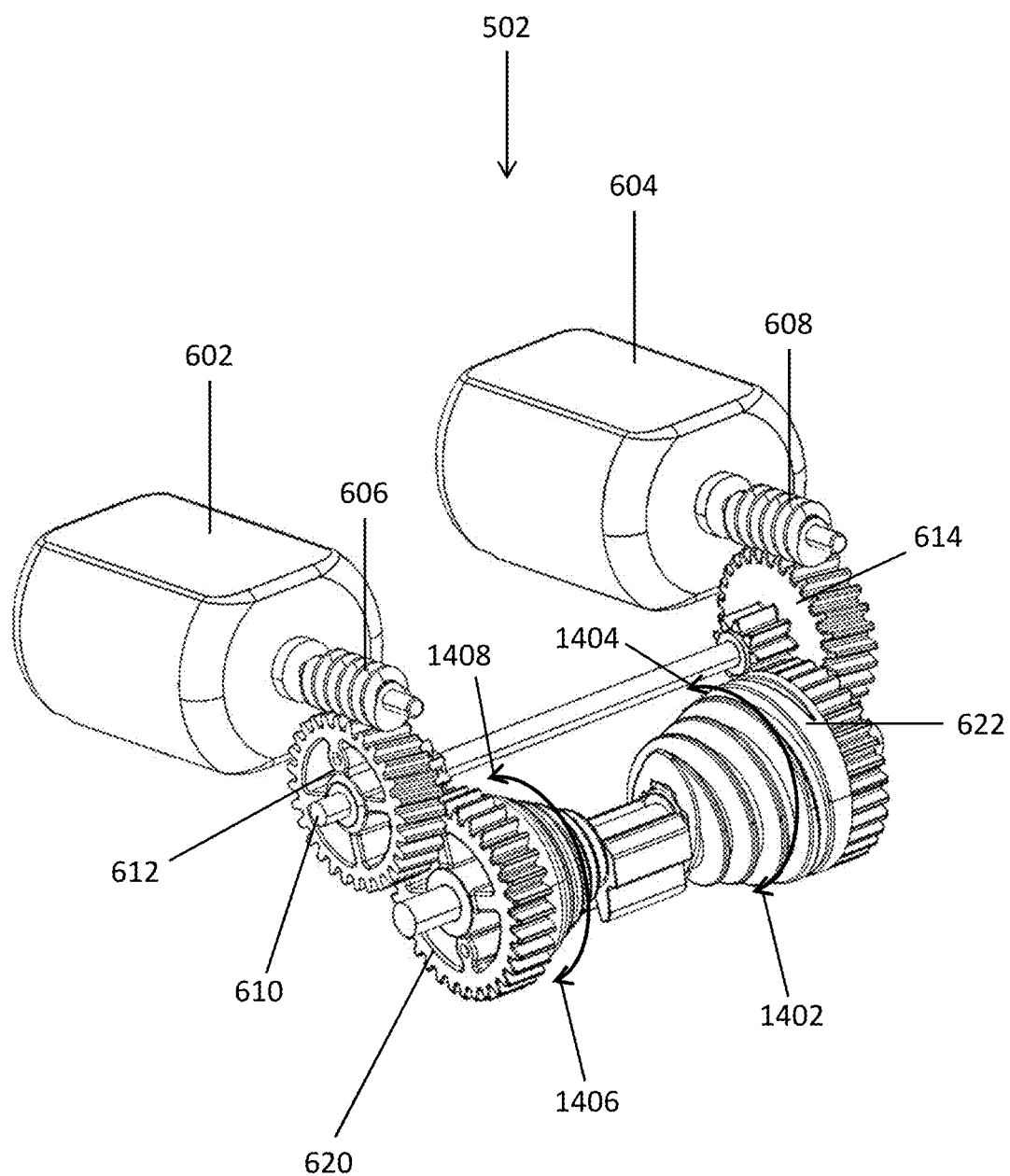
FIG. 14 illustrates a perspective view of a gear assembly during operation in accordance with aspects of the present disclosure.

FIG. 14 illustrates a perspective view of gear assembly 502 during operation in accordance with aspects of the present disclosure. As shown in the figure, gear assembly 502 includes the elements of gear assembly 502 of FIG. 6 described above and for purposes of brevity, will not be described again here. FIG. 14 additionally includes a first fold gear direction 1402, a second fold gear direction 1404, a first tilt gear direction 1406, and a second tilt gear direction 1408.

If operation of tilt drive 504 is requested by the vehicle operator in order to adjust mirror head 206 of FIG. 2, power is delivered from an external source (not shown) to motor 602, causing motor 602 to turn worm gear 606 in a first direction. As worm gear 606 rotates, it drives intermediate tilt gear 612, which then turns secondary tilt gear 620. In this example, motor 602 turning in first direction results in secondary tilt gear 620 rotating in first tilt gear direction 1406. Alternatively, if motor 602 rotates worm gear 606 in a second direction, it will drive intermediate gear 612 to turn secondary tilt gear 620 in second tilt gear direction 1408. The rotation of secondary tilt gear 620 imparts a rotation to primary tilt gear 1302 (FIG. 13) in order to operate tilt drive 504 and rotate mirror head 206 (FIG. 3A) about axis 302 FIG. 3A).

Briefly referring to FIG. 11, when gear sub assembly 616 is installed in lower housing 404, the first end 644 and second end 646 of spindle 618 are supported by bearing 408 and bearing 410 respectively. The pressure exerted by biasing element 628 limits travel along the axis of spindle 618 by forcing secondary tilt gear 620 against end surface 412, which enables secondary tilt gear 620 to be driven via intermediate tilt gear 612. This arrangement allows secondary tilt gear 620 to rotate around spindle 618, while keeping spindle 618 fixed in place.

Referring back to FIG. 14, if operation of the fold drive is requested by the vehicle operator in order to adjust mirror head 206, power is first delivered to motor 604 from an external source (not shown). Upon receiving power, motor 604 will rotate worm gear 608 in a first direction which drives intermediate fold gear 614. The rotation of intermediate fold gear 614 rotates secondary fold gear 622, which in this example is first fold gear direction 1402. Alternatively, if motor 604 rotates worm gear 608 in a second direction, it will drive intermediate fold gear 614 to turn secondary fold gear 622 in a second fold gear direction 1404. The rotation of secondary fold gear 622 imparts a rotation to primary fold gear 1202 in order to operate fold drive 506 and rotate mirror head 206 (FIG. 2A) about axis 202 (FIG. 2A).

The rotation of secondary fold gear 622 is similar to that of secondary tilt gear 620 described above, since spindle 618 of gear sub assembly 616 is fixed in place, secondary fold gear 622 is free to rotate around spindle 618. In this manner, operation of the fold drive 506 and tilt drive 504 can be achieved simultaneously. However, simultaneous operation of fold drive 506 and tilt drive 504 is not required, the arrangement of gear assembly 502 allows for independent operation of tilt drive 504 or fold drive 506. The operation of gear assembly 502 and tilt drive 504 will now be described with reference to FIGS. 15A-24.

Figure 15A:
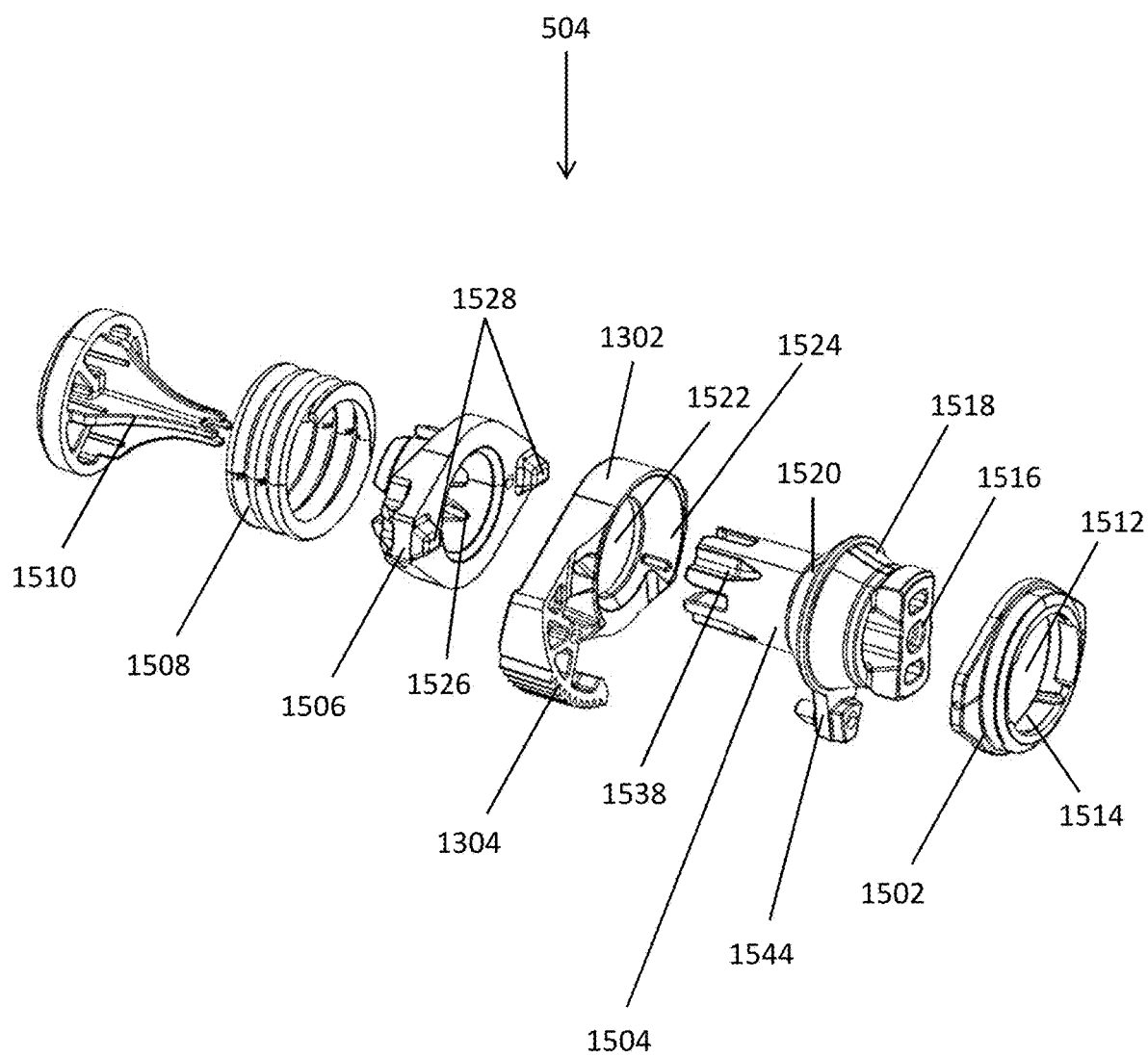
FIG. 15A illustrates an exploded view of the front of a tilt drive in accordance with aspects of the present disclosure.
Figure 15B:
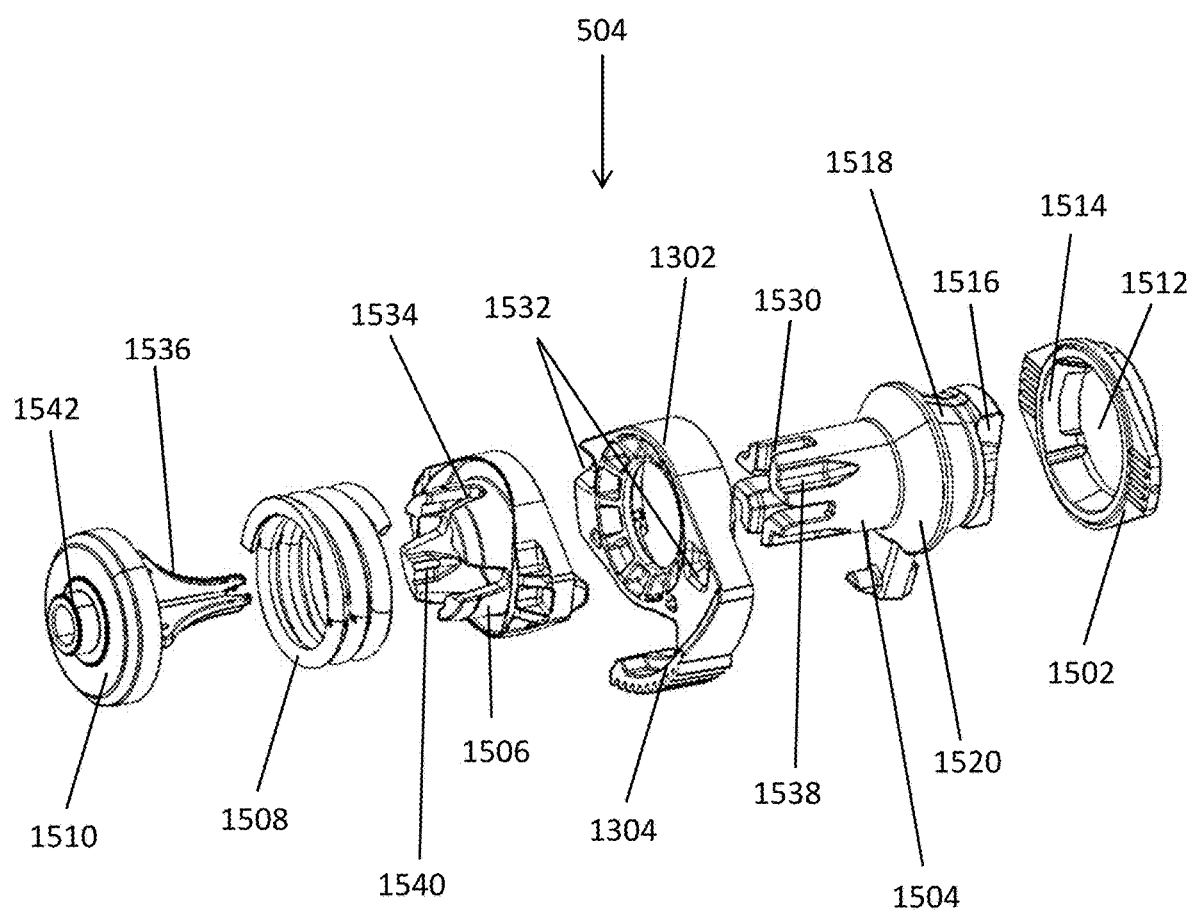
FIG. 15B illustrates an exploded view of the back of a tilt drive in accordance with aspects of the present disclosure.

FIG. 15A illustrates an exploded view of the front of tilt drive 504 in accordance with aspects of the present disclosure. FIG. 15B illustrates an exploded view of the back of tilt drive 504 in accordance with aspects of the present disclosure. As shown in the figures, tilt drive 504 includes primary tilt gear 1302, a tilt journal 1502, a tilt axle 1504, a tilt clutch 1506, a tilt spring 1508, and a tilt inner 1510.

Tilt axle 1504 further comprises taper 1518 which cooperates with taper 1514 of tilt journal 1502. Tilt journal 1502 is arranged such that it is retained in place between upper housing 402 and lower housing 404 of actuator 400. Tilt journal 1502 being retained between upper housing 402 and lower housing 404 ensures the correct location of taper 151, so that the cooperation between taper 1514 and taper 1518 leads to tilt axle 1504 being properly aligned. Without tilt journal 1502, any mismatch between the alignment of upper housing 402 and lower housing 404 would result in a step during the operation of tilt drive 504. A step during the operation of tilt drive 504 would increase friction, create an audible noise as well as create an in-balance of the operation of tilt axle 1504. Tilt axle 1504 additionally includes tilt wiper carrier connector 1544 for use with a tilt memory system. A tilt memory system will be described later with reference to FIGS. 25-26.

Figure 16:
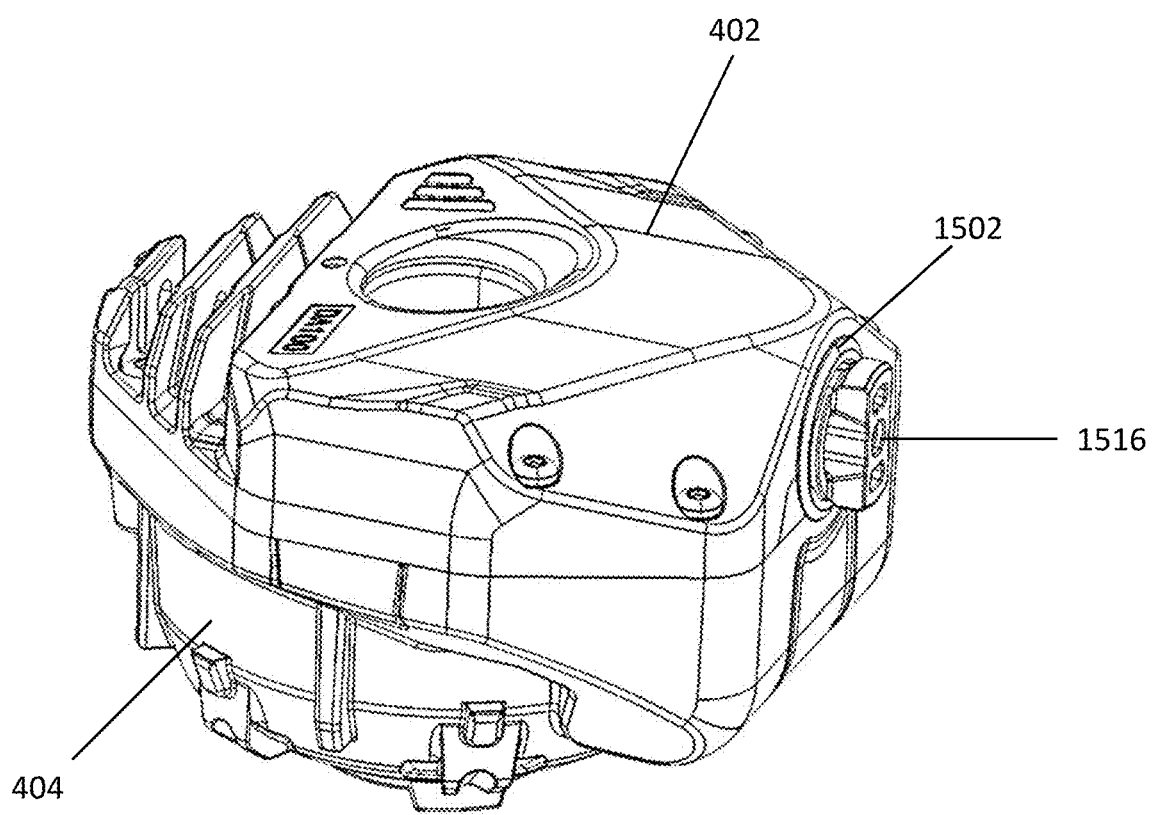
FIG. 16 illustrates the location of a tilt journal and attachment point of a tilt drive in accordance with aspects of the present disclosure.

FIG. 16 illustrates the location of tilt journal 1502 and attachment point 1516 of tilt drive 504 in accordance with aspects of the present disclosure.

The abutment of taper 1518 and taper 1514 allows attachment point 1516 of tilt axle 1504 to protrude through aperture 1512 of tilt journal 1502. The extension of attachment point 1516 through aperture 1512 provides clearance for mirror head 206 (not shown) to be attached to attachment point 1516 while maintaining clearance with the rest of actuator 400. This attachment enables the transfer of motion of tilt drive 504 to mirror head 206 such that it may be rotated about axis 302 of FIG. 3 in a first tilt direction 304 or a second tilt direction 306. In this form, attachment point 1516 is directly connected to the mirror head. It is also within the scope of this disclosure an indirect attachment configuration to the mirror head 206 may also be used.

Referring back to FIGS. 15A-B, tilt axle 1504 further comprises taper 1520 which cooperates with taper 1524 of primary tilt gear 1302. When tilt drive 504 is assembled and installed in actuator 400, tilt spring 1508 applies pressure to push primary tilt gear 1302 against tilt axle 1504. Taper 1520 and taper 1524 act together to center primary tilt gear 1302 on tilt axle 1504. Further, the frictional force created at the interface of taper 1520 and taper 1524 results in tilt axle 1504 rotating when primary tilt gear 1302 is driven.

Tilt clutch 1506 includes protrusion 1528 and primary tilt gear 1302 includes recess 1532, where the geometry of protrusion 1528 is such that it fits into recess 1532. Tilt spring 1508 applies a pressure which holds tilt clutch 1506 against primary tilt gear 1302 such that protrusion 1528 is restrained in recess 1532, which results in tilt clutch 1506 rotating when primary tilt gear 1302 is rotated during operation.

Figure 17:
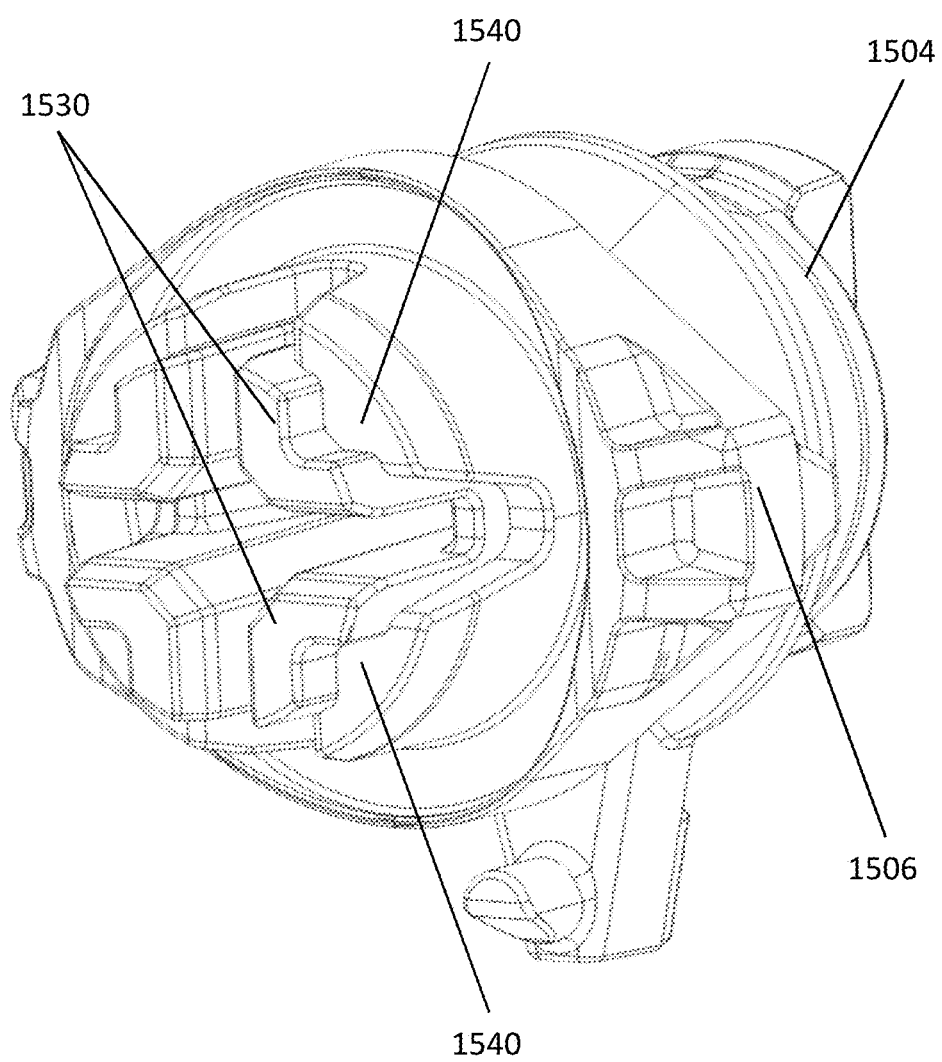
FIG. 17 illustrates the arrangement of a tilt axle and tilt clutch in accordance with aspects of the present disclosure.

FIG. 17 illustrates the arrangement of tilt axle 1504 and tilt clutch 1506 of tilt drive 504 in accordance with aspects of the present disclosure. During the assembly of tilt drive 504, tilt axle 1504 is inserted through aperture 1522 of primary tilt gear 1302 and aperture 1526 of tilt clutch 1506. To insert tilt axle 1504 through tilt clutch 1506, protrusion 1540 of tilt clutch 1506 aligns with slot 1538 of tilt axle 1504. The fitting of protrusion 1540 into slot 1538 rotationally locks tilt clutch 1506 and tilt axle 1504. In this manner, the rotation of tilt axle 1504 always results in the rotation of tilt clutch 1506.

Figure 18:
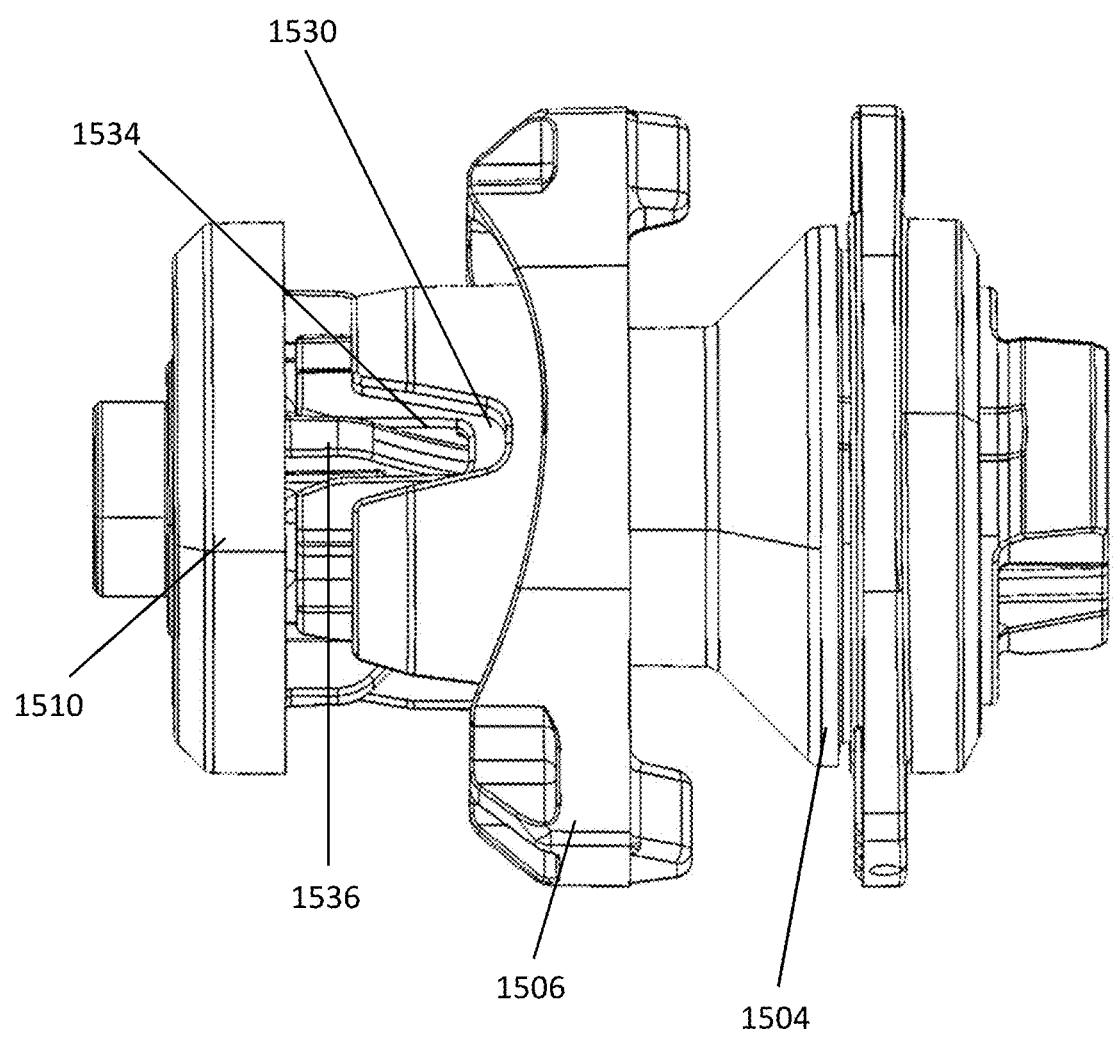
FIG. 18 illustrates the arrangement of a tilt axle, tilt clutch, and tilt inner in accordance with aspects of the present disclosure.

FIG. 18 illustrates the arrangement of tilt axle 1504, tilt clutch 1506, and tilt inner 1510 of tilt drive 504 in accordance with aspects of the present disclosure. Tilt inner 1510 includes extension 1536, which fits into slot 1534 of tilt clutch 1506 and slot 1530 of tilt axle 1504. As described above, tilt axle 1504 is insert through primary tilt gear 1302 and tilt clutch 1506. Then, tilt axle 1504 is then insert through tilt spring 1508 and on to tilt inner 1510 such that extension 1536 of tilt inner 1510 fits into slot 1534 of tilt clutch 1506 and slot 1530. Once assembled the arrangement of protrusion 1540 of tilt clutch 1506 and slot 1538 of tilt axle 1504 as well as the arrangement of extension 1536 of tilt inner 1510 with slot 1534 of tilt clutch 1506 and slot 1530 of tilt axle 1504 ensures that tilt inner 1510, tilt clutch 1506, and tilt axle 1504 are rotationally locked.

Figure 19:
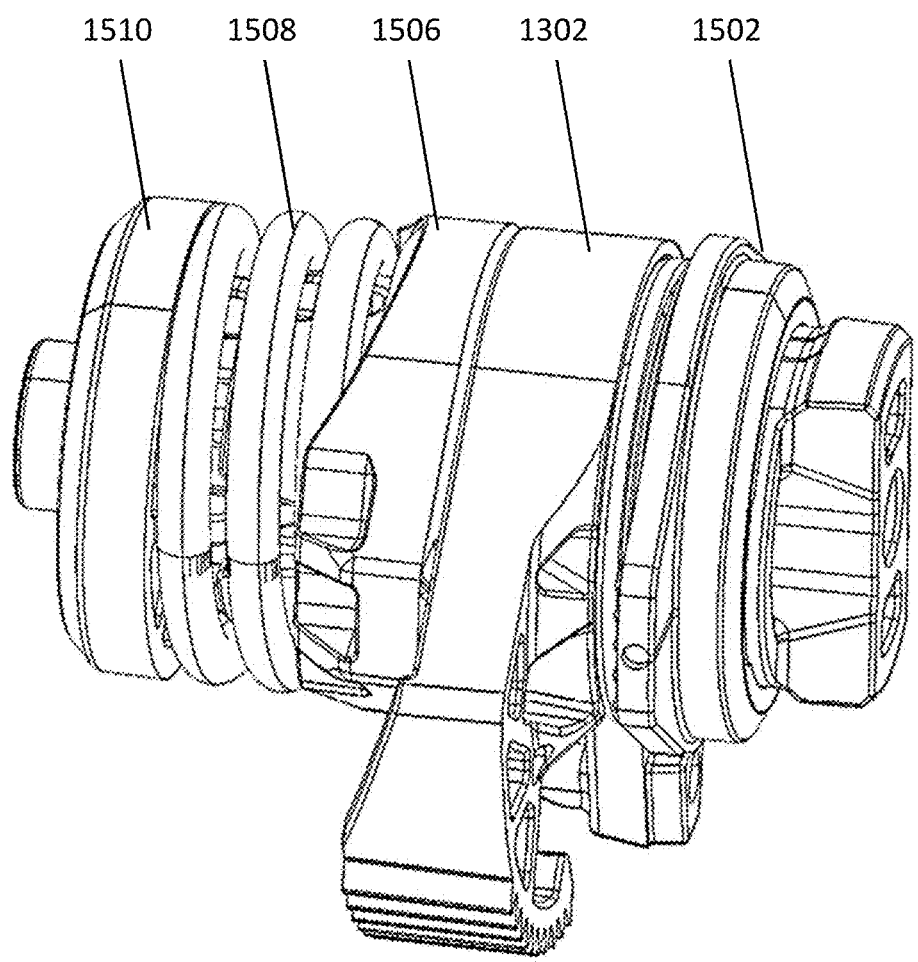
FIG. 19 illustrates a perspective view of a tilt drive fully assembled in accordance with aspects of the present disclosure.

FIG. 19 illustrates a perspective view of tilt drive 504 fully assembled in accordance with aspects of the present disclosure. As shown in the figure, tilt drive 504 has been fully assembled, however for purposes of clarity, even though tilt spring 1508 is shown compressed, tilt spring 1508 cannot be held in a compressed state until tilt drive 504 has been installed in its location within actuator 400. Similarly, tilt journal 1502 is arranged between upper housing 402 and lower housing 404, however is shown in the figure to illustrate the relation between tilt journal 1502 and the rest of tilt drive 504.

Figure 20:
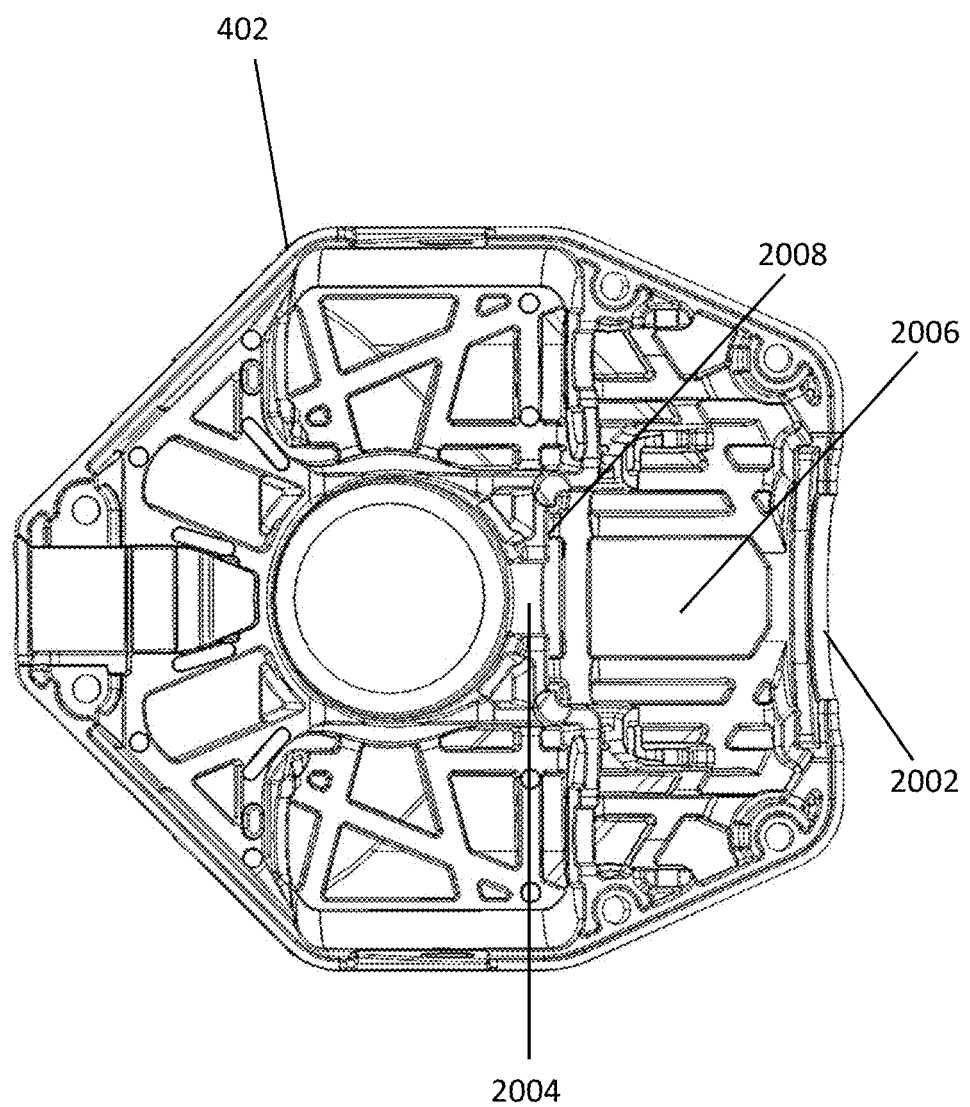
FIG. 20 illustrates a bottom-up view of an upper housing in accordance with aspects of the present disclosure.

FIG. 20 illustrates a bottom-up view of upper housing 402 in accordance with aspects of the present disclosure. As shown in the figure, upper housing 402 includes an aperture 2002, a bearing 2004, a recess 2006, and a surface 2008. Aperture 2002 is arranged to receive tilt journal 1502, bearing 2004 is arranged to receive support 1542 of tilt inner 1510 such that tilt inner 1510 abuts against surface 2008, and recess 2006 is arranged to receive assembled tilt drive 504.

Figure 21:
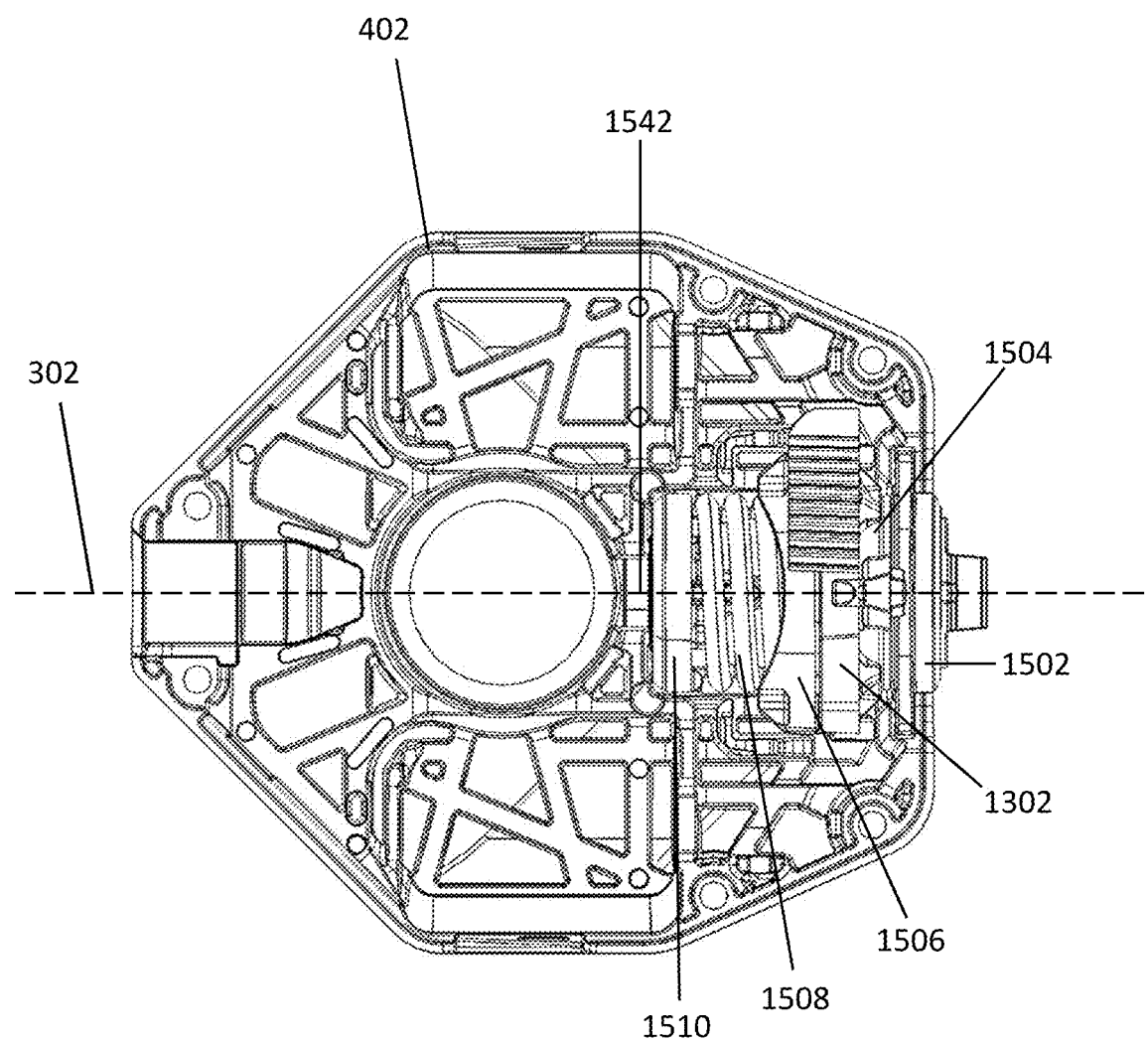
FIG. 21 illustrates a tilt drive assembled within an upper housing in accordance with aspects of the present disclosure.

FIG. 21 illustrates tilt drive 504 assembled within upper housing 402 in accordance with aspects of the present disclosure. In the installed position within upper housing 402, tilt inner 1510 abuts surface 2008 which is in a fixed position, and tilt spring 1508 is in a compressed state and exerts pressure against tilt inner 1510 and tilt clutch 1506. With tilt spring 1508 compressed and tilt inner 1510 abutting surface 2008, tilt spring 1508 exerting pressure holds tilt clutch 1506 against primary tilt gear 1302. Tilt clutch 1506 being forced against primary tilt gear 1302 results in protrusion 1528 being retained within recess 1532 of primary tilt gear 1302.

The force exerted by tilt spring 1508 applies pressure to tilt clutch 1506, which is transferred to primary tilt gear 1302 as described above. The force transferred then holds primary tilt gear 1302 against tilt axle 1504 and tilt axle 1504 against tilt journal 1502, with taper 1524 abutting taper 1520 and taper 1518 abutting taper 1514 respectively. The abutment of taper 1524 against taper 1520 and taper 1518 against taper 1514 forces the alignment of tilt journal 1502, tilt axle 1504, primary tilt gear 1302, and tilt clutch 1506 along axis 302.

Figure 22:
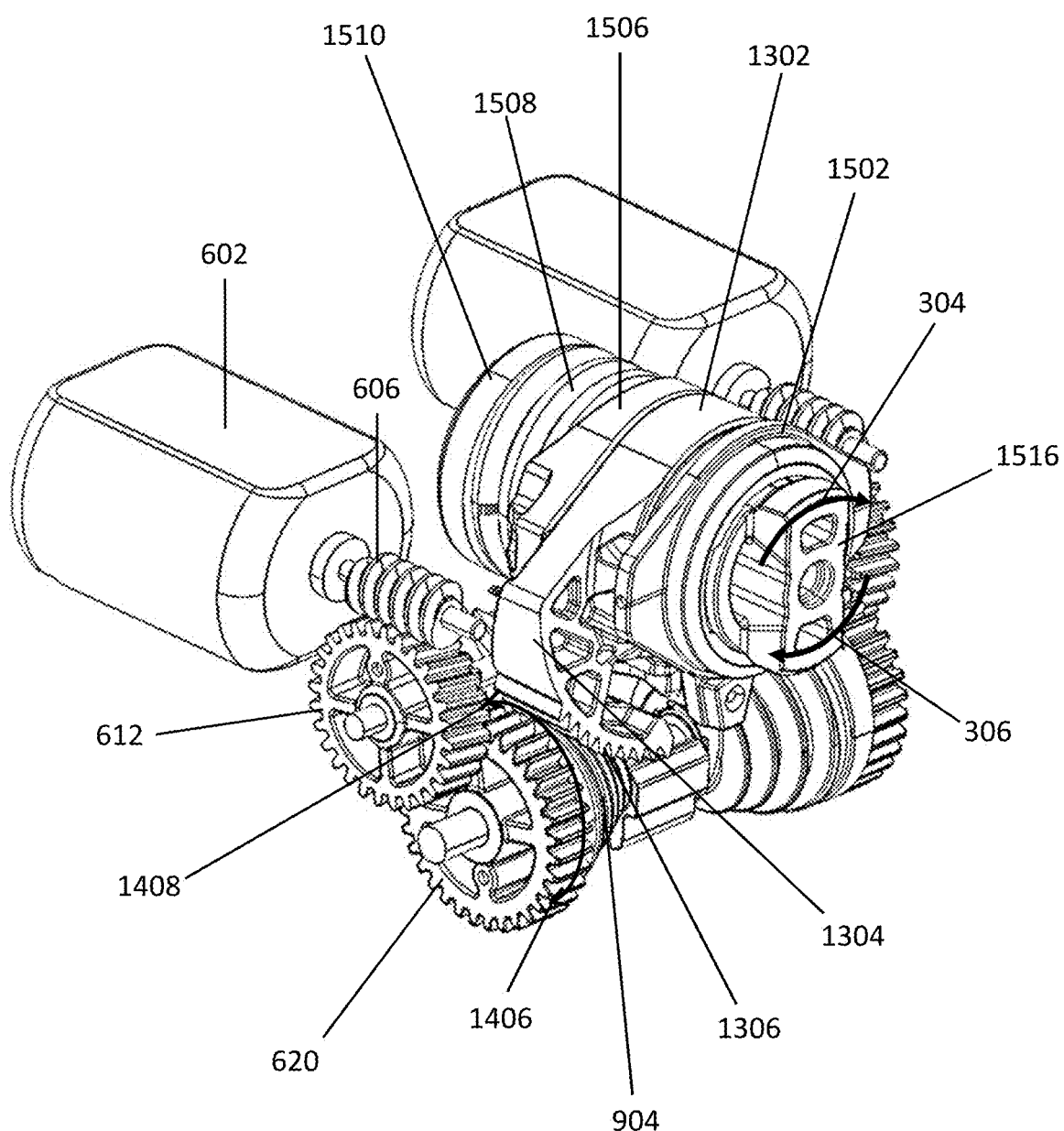
FIG. 22 illustrates the arrangement of a gear assembly and tilt drive in their installed positions within an actuator in accordance with aspects of the present disclosure.

FIG. 22 illustrates the arrangement of gear assembly 502 and tilt drive 504 in their installed positions within actuator 400 of FIG. 4 in accordance with aspects of the present disclosure. As stated above, FIG. 22 illustrates the arrangement of gear assembly 502 and tilt drive 504 in their installed positions within actuator 400. However, for purposes of clarity, all other elements of actuator 400 have been removed.

To operate tilt drive 504, power is delivered to motor 602 from an external source (not shown), such as a vehicle's 100 battery or electrical system. Once supplied with power, motor 602 will turn worm gear 606, which may then rotate intermediate tilt gear 612, which in turn rotates secondary tilt gear 620. With tilt drive 504 in the installed position, the teeth of tilt gear extension 1304 mesh with the worm gear portion 904 of secondary tilt gear 620 so as secondary tilt gear 620 rotates, it results in the rotation of primary tilt gear 1302. In this example variation, when secondary tilt gear 620 rotates in first tilt gear direction 1406, primary tilt gear 1302 rotates in first tilt direction 304 and secondary tilt gear 620 rotating in second tilt gear direction 1408 results in primary tilt gear 1302 rotating in second tilt direction 306. Additionally, the arrangement of primary tilt gear 1302 and more specifically, tilt gear extension 1304 and secondary tilt gear 620 allows tilt drive 504 to be operated independent of fold drive 506.

As tilt gear extension 1304 is rotated by the rotation of secondary tilt gear 620, primary tilt gear 1302 begins to rotate. Since tilt clutch 1506 is rotationally locked to primary tilt gear 1302 via protrusion 1528 and recess 1532, rotation of primary tilt gear 1302 results in tilt clutch 1506 rotating as well. Further, as described above in FIG. 17, tilt clutch 1506 is rotationally locked to tilt axle 1504 via protrusion 1540 of tilt clutch 1506 and protrusion 1528 of tilt axle 1504. In this manner, rotation of primary tilt gear 1302 results in the rotation of tilt clutch 1506 and tilt axle 1504.

Attachment point 1516 of tilt axle 1504 is attached to mirror head 206, therefore, when tilt axle 1504 rotates the connection between mirror head 206 and attachment point 1516 results in the tilting of mirror head 206 in either first tilt direction 304 or second tilt direction 306 about axis 302. In this manner, mirror head 206 can be actuated such that a reflective element (not shown) attached to mirror head 206 provides an acceptable view rearward of the vehicle 100. For example, tilt drive 504 can be operated such that mirror head 206 rotates about axis 302 in first tilt direction 304 to the position shown in FIG. 3B. Alternatively, tilt drive 504 may be operated such that mirror head 206 rotates about axis 302 in second tilt direction 306 to the position shown in FIG. 3C. In another variation, tilt drive 504 may be operated in order to rotate mirror head 206 from either the position shown in FIG. 3B or FIG. 3C to the position shown in FIG. 3A.

As stated above, with mirror head 206 attached to attachment point 1516 of tilt axle 1504, when tilt drive 504 is electrically operated, it results in the adjustment of mirror head 206 about axis 302. Conversely, if mirror head 206 is manually adjusted, the connection between mirror head 206 and tilt axle 1504 via attachment point 1516 results in the rotation of tilt axle 1504. The operation of tilt drive 504 during manual operation will now be described with additional reference to FIGS. 23A-24.

Figure 23A:
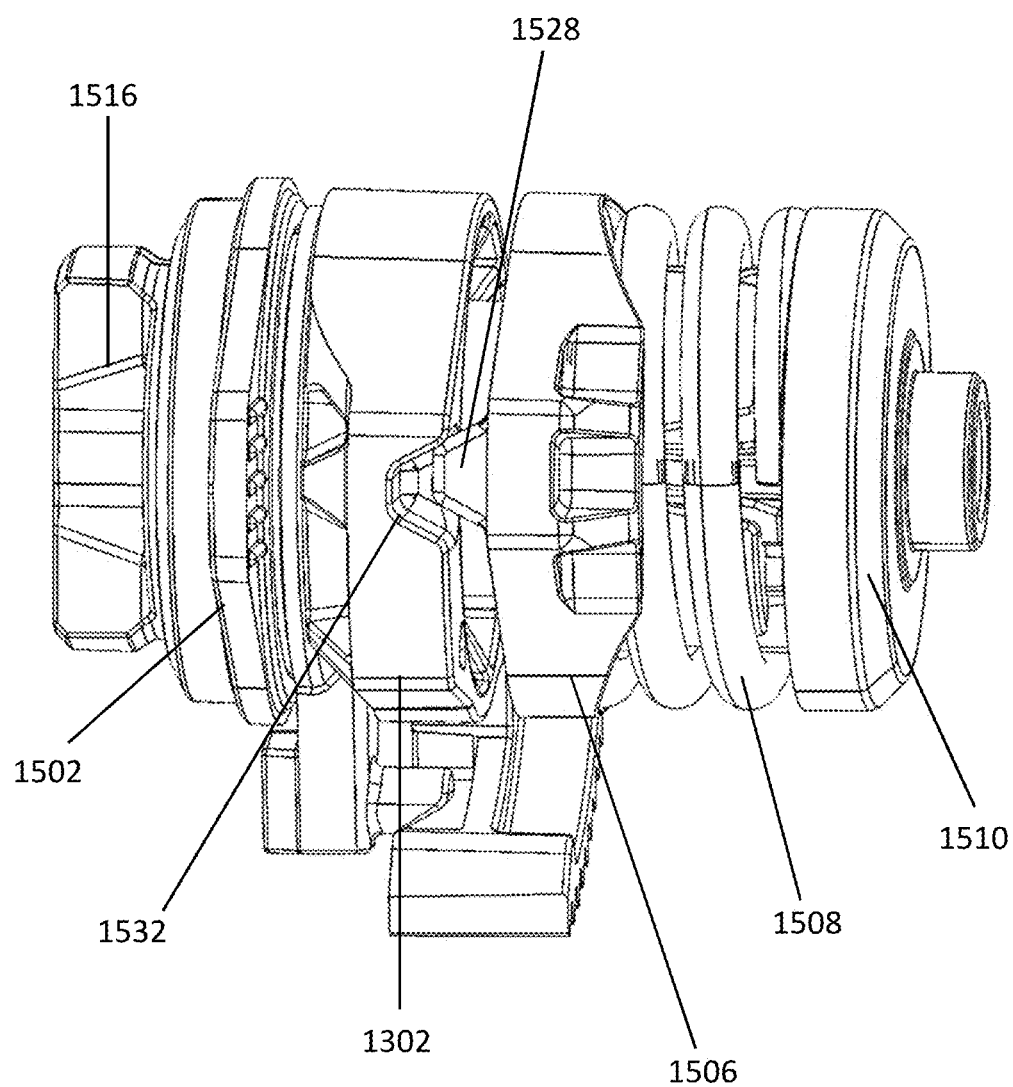
FIG. 23A illustrates the operation of a tilt clutch during manual operation in accordance with aspects of the present disclosure.
Figure 23B:
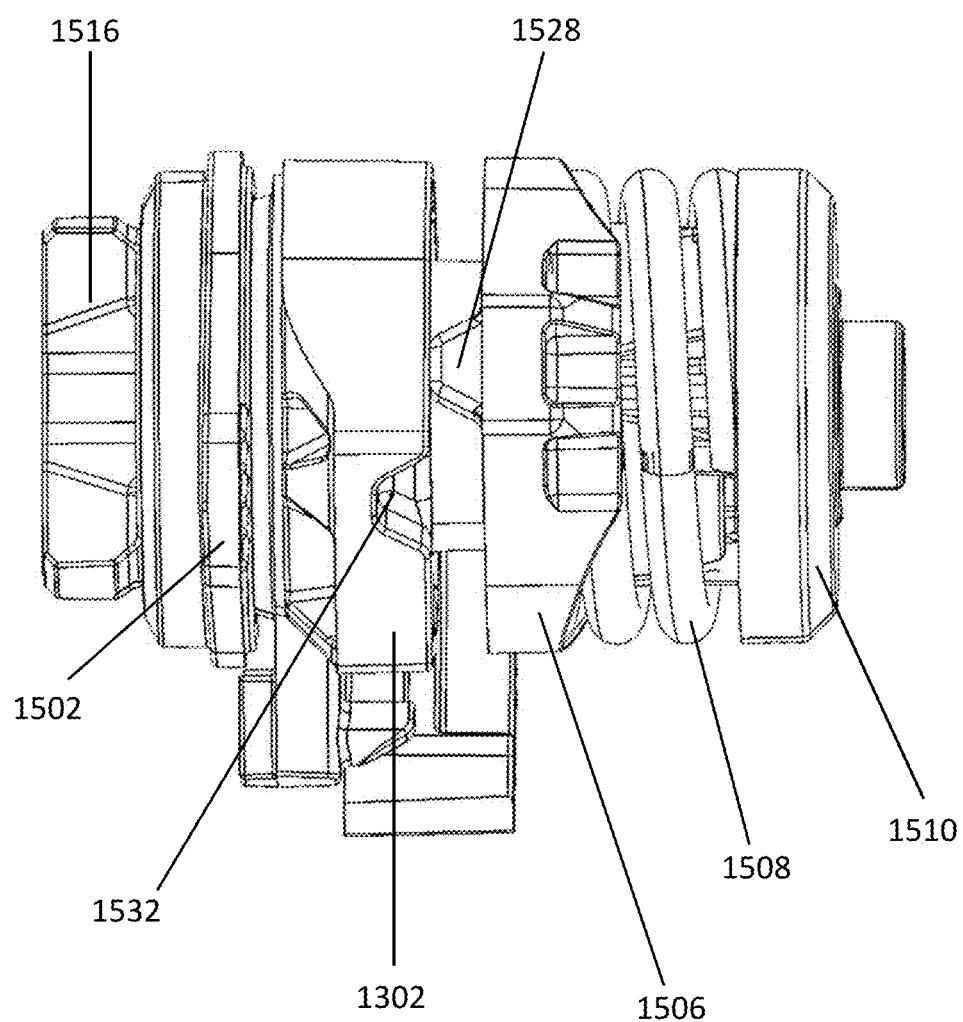
FIG. 23B illustrates the operation of a tilt clutch during manual operation in accordance with aspects of the present disclosure.
Figure 24:
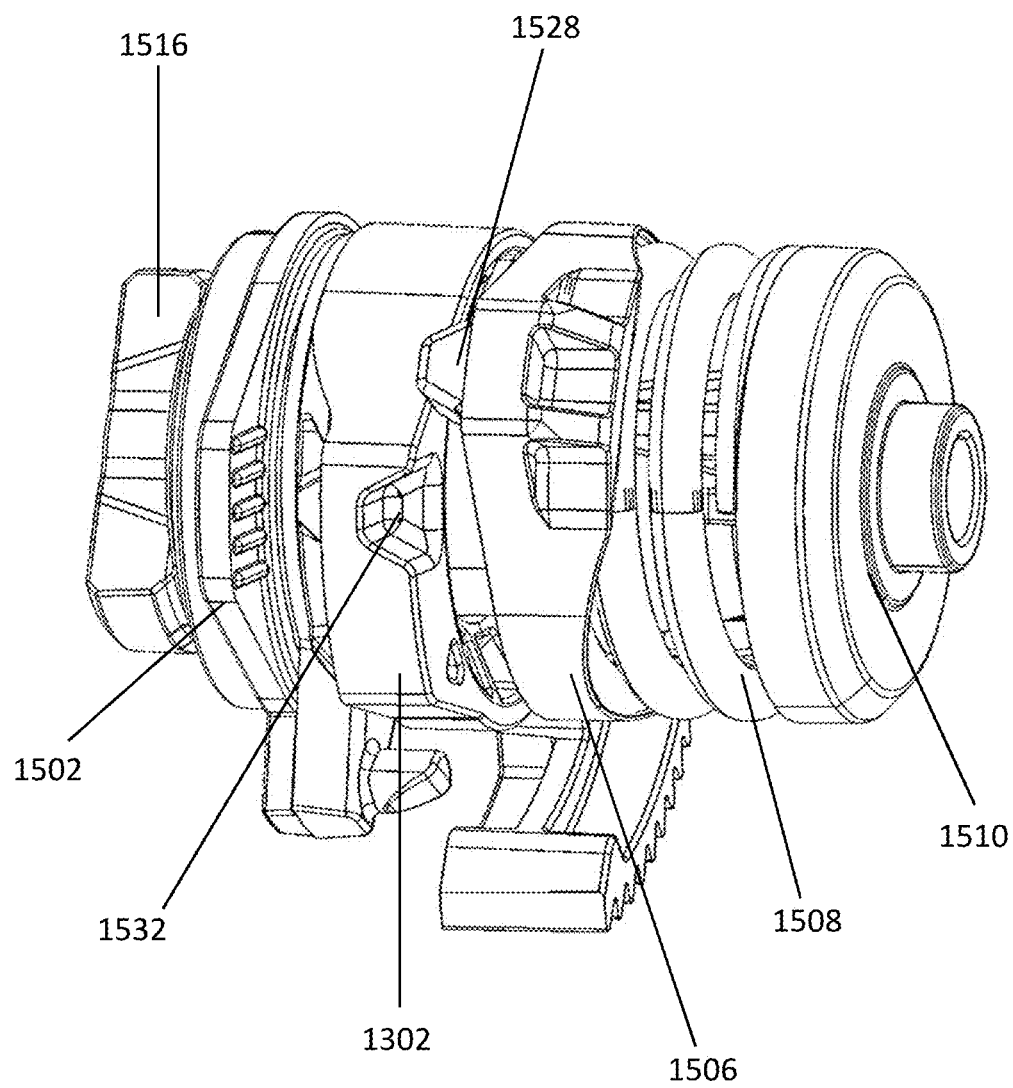
FIG. 24 illustrates a tilt clutch sliding along a tilt gear when manually disengaged in accordance with aspects of the present disclosure.

FIG. 23A illustrates the operation of tilt clutch 1506 during manual operation in accordance with aspects of the present disclosure. FIG. 23B illustrates the operation of tilt clutch 1506 during manual operation in accordance with aspects of the present disclosure. FIG. 24 illustrates tilt clutch 1506 sliding along primary tilt gear 1302 when manually disengaged in accordance with aspects of the present disclosure.

Mirror head 206 will rotate as it is manually adjusted which results in the rotation of tilt axle 1504 via attachment point 1516. As described above in FIG. 17, since tilt clutch 1506 is rotationally locked with tilt axle 1504, it will rotate as tilt axle 1504 rotates. When mirror head 206 is being adjusted manually, primary tilt gear 1302 is not rotating since there is no power being deliver to motor 602. Therefore, as tilt axle 1504 and tilt clutch 1506 rotate, the edge of protrusion 1528 slides against the edge of recess 1532, tilt clutch 1506 begins to move towards tilt inner 1510 and compress tilt spring 1508 as shown in FIG. 23A.

Tilt axle 1504 and tilt clutch 1506 continue to rotate until protrusion 1528 finally extends out of recess 1532 and tilt clutch 1506 becomes disengaged from primary tilt gear 1302, tilt spring 1508 is compressed as shown in FIG. 23B. Referring to FIG. 24, once disengaged, tilt axle 1504 and tilt clutch 1506 rotate freely as mirror head 206 is manually adjusted and protrusion 1528 may slide along the back surface of primary tilt gear 1302.

Returning mirror head 206 to its drive position can be done through electrical actuation or manually. In the case of manual operation, mirror head 206 can be rotated toward back towards its drive position. Since mirror head 206 is attached to tilt axle 1504 via attachment point 1516, as mirror head 206 rotates so does tilt axle 1504 and tilt clutch 1506. As tilt axle 1504 and tilt clutch 1506 rotate, protrusion 1528 moves towards recess 1532 of primary tilt gear 1302.

When protrusion 1528 reaches recess 1532 they interlock and allow the force exerted by tilt spring 1508 to push tilt clutch 1506 against primary tilt gear 1302.

In the case of electrical operation, power is delivered to motor 602 which then rotates primary tilt gear 1302 as described above in reference to FIG. 22. While primary tilt gear 1302 is rotating, tilt axle 1504 and tilt clutch 1506 remain static. Once primary tilt gear 1302 rotates enough such that recess 1532 aligns with protrusion 1528, the force exerted by tilt spring 1508 forces protrusion 1528 into recess 1532 and tilt clutch 1506 to abut against primary tilt gear 1302. At this time, mirror head 206 can be actuated by tilt drive 504 as described above.

In some instances, it may be desirable to have a memory function for use with actuator 400. A memory function would allow the driver of a vehicle 100 to set a specific fold and tilt angle for mirror head 206 that can then be stored. If the position of mirror head 206 is changed, the stored position could then be retrieved at a later time to automatically move mirror head 206 back to the stored position without any fine tune adjustment by the driver. A tilt memory function of actuator 400 will now be described with reference to FIGS. 25-26.

Figure 25:
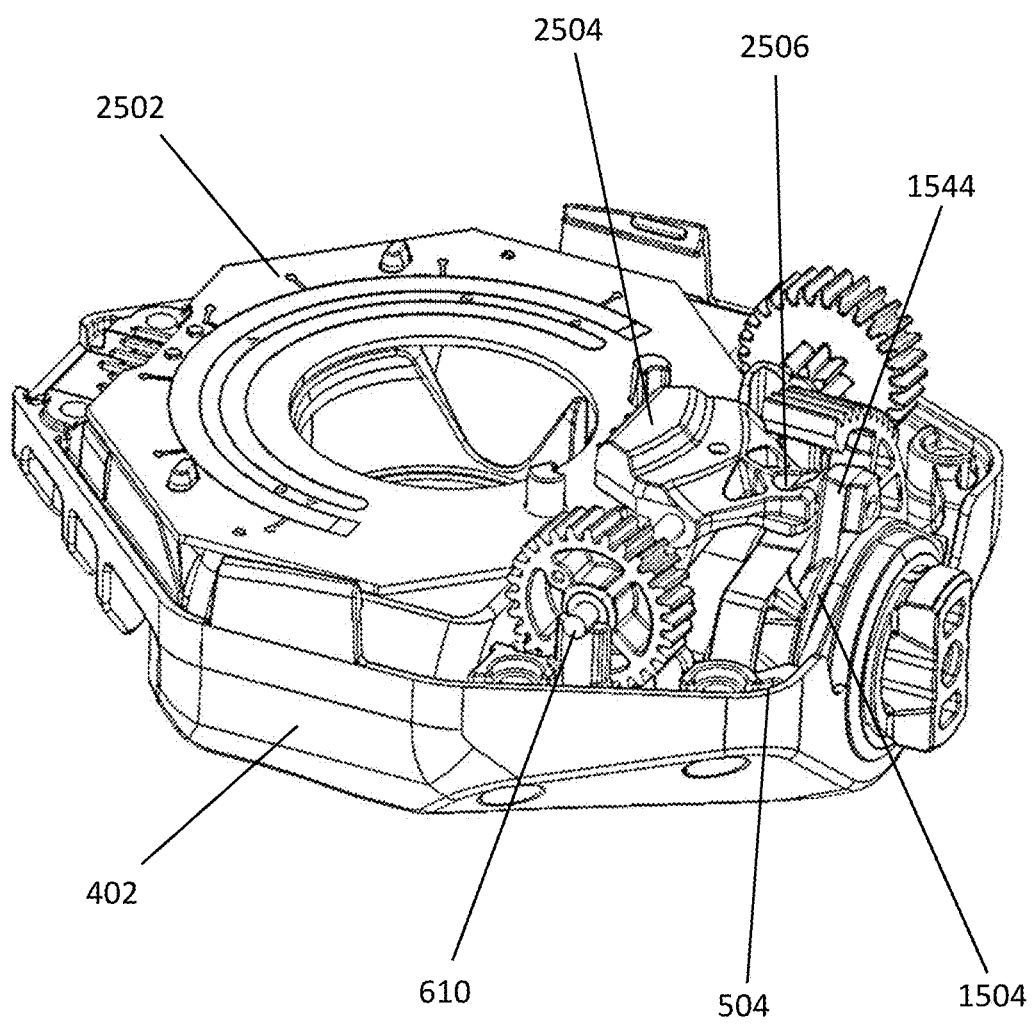
FIG. 25 illustrates a tilt memory system in accordance with aspects of the present disclosure.

FIG. 25 illustrates a tilt memory system in accordance with aspects of the present disclosure. As shown in the figure, tilt wiper carrier 2504 is attached to intermediate spindle 610 and tilt wiper carrier connector 1544. Tilt wiper carrier connector 1544 is directly connected to tilt axle 1504 as described above in FIG. 15, such that when tilt axle 1504 rotates, so does tilt wiper carrier connector 1544. Tilt wiper carrier 2504 is attached to tilt wiper carrier connector 1544 via slot 2506, so when tilt axle 1504 rotates, tilt wiper carrier 2504 slides along intermediate spindle 610. The rotational motion of tilt axle 1504 results in the linear motion of tilt wiper carrier 2504 which can then be used with a potentiometer system to map and store the tilt position of mirror head 206.

Figure 26:
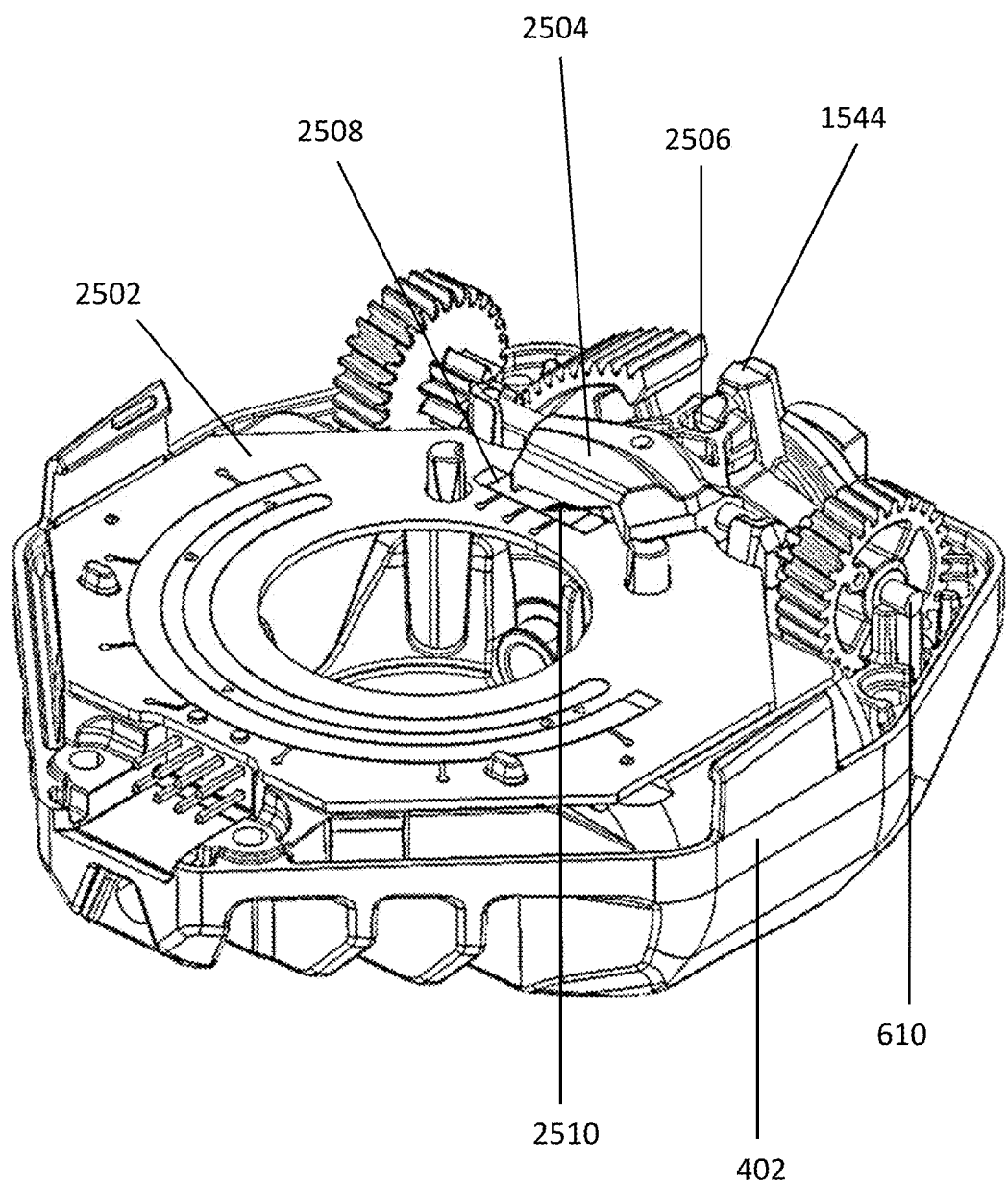
FIG. 26 illustrates an alternative view of a tilt memory system in accordance with aspects of the present disclosure.

FIG. 26 illustrates an alternative view of a tilt memory system in accordance with aspects of the present disclosure.

As shown in the figure, PCB 2502 is arranged on upper housing 402 and further includes a carbon strip 2508 and tilt wiper carrier 2504 further includes a tilt wiper 2510. Carbon strip 2508 is arranged on PCB 2502 such that tilt wiper 2510 is operable to make direct contact with carbon strip 2508. At this time, when tilt drive 504 is operated, tilt axle 1504 will rotate resulting in tilt wiper carrier 2504 sliding along intermediate spindle 610. As tilt wiper carrier 2504 slides along intermediate spindle 610 so does tilt wiper 2510, which leads to tilt wiper 2510 contacting a different point along carbon strip 2508. Once the desired tilt position of mirror head 206 is reached, a measurement may be taken by a potentiometer (not shown) to record the position where tilt wiper 2510 contacts carbon strip 2508. In order to adjust the tilt angle of mirror head 206 by using the memory system, power may delivered to motor 602 to adjust the tilt angle of mirror head 206 until the potentiometer system detects that the position of tilt wiper 2510 has contacted the point along carbon strip 2508 that matches the stored position of tilt wiper 2510 along carbon strip 2508.

The operation of gear assembly 502 and fold drive 506 will now be described with reference to FIGS. 27-40B.

Figure 27:
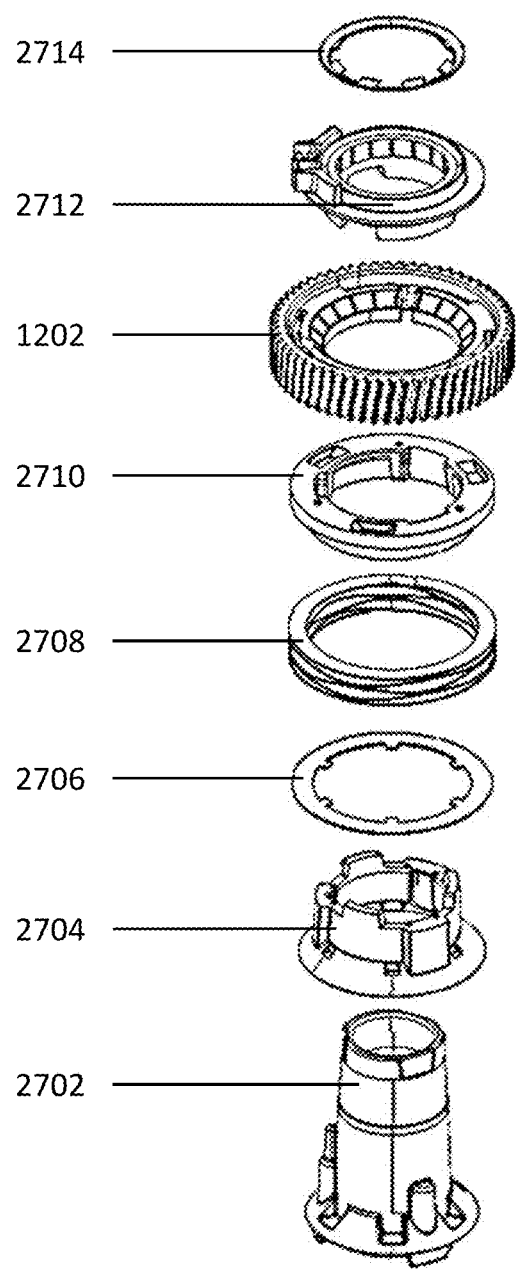
FIG. 27 illustrates an exploded top-down view of a fold drive in accordance with aspects of the present disclosure.

FIG. 27 illustrates an exploded top-down view of fold drive 506 in accordance with aspects of the present disclosure.

As shown in the figures, fold drive 506 includes primary fold gear 1202, a shaft 2702, a slip collar 2704, a lock ring 2706, a fold spring 2708, a fold clutch 2710, a gear seat 2712, and a retainer 2714. The assembly and arrangement of the elements of fold drive 506 will now be described with additional reference to FIGS. 28-40B.

Figure 28:
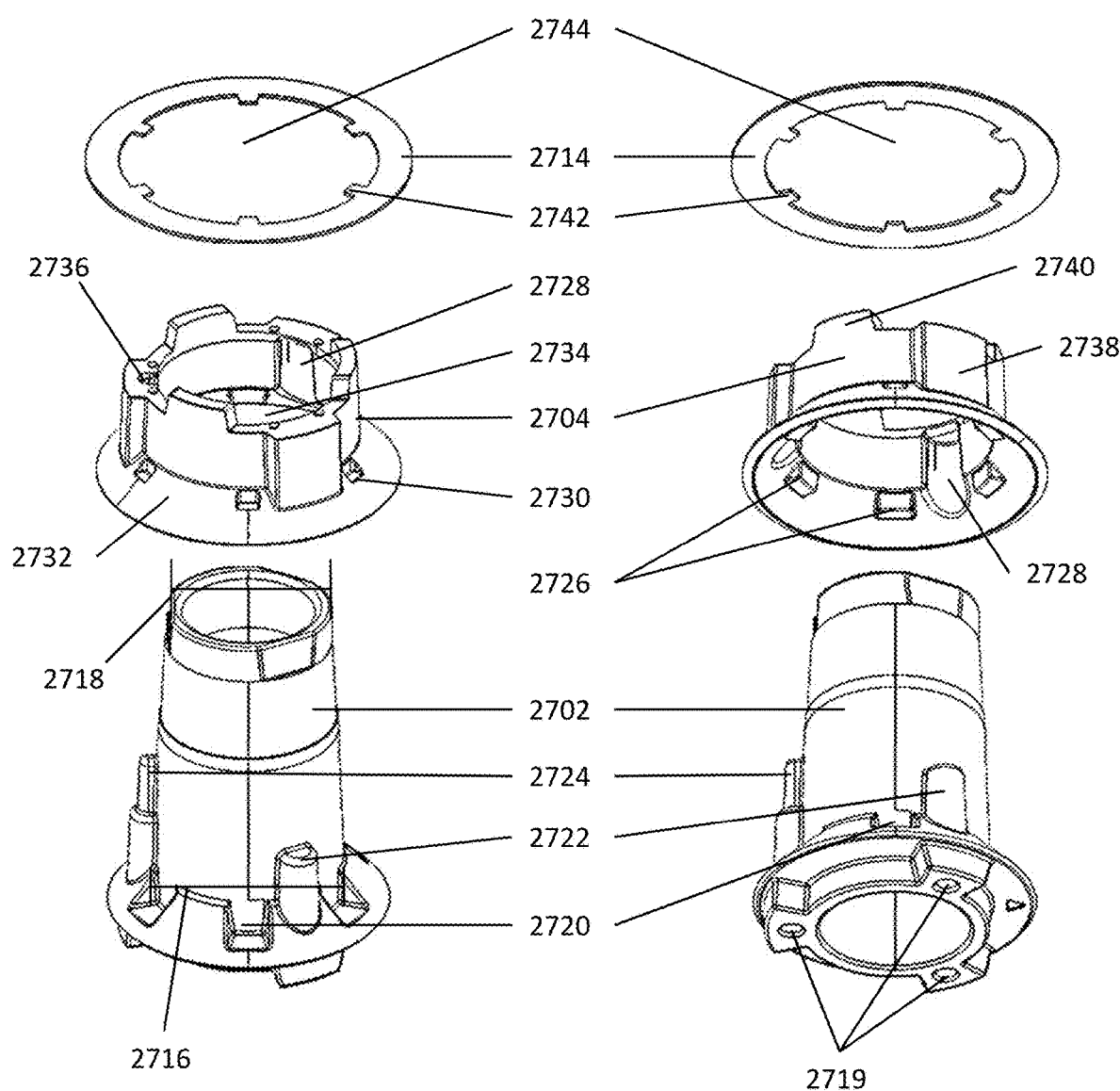
FIG. 28 illustrates a detailed view of a shaft, slip collar, lock ring, and fold spring in accordance with aspects of the present disclosure.

FIG. 28 illustrates a detailed view of shaft 2702, slip collar 2704, lock ring 2706, and fold spring 2708 of FIG. 27 in accordance with aspects of the present disclosure. The left side of FIG. 28 illustrates a perspective view from the top-down and the right side of FIG. 28 illustrates a perspective view from the bottom-up.

Shaft 2702 has a diameter 2716 at its proximal end and a diameter 2718 at its distal end, where diameter 2716 is larger than diameter 2718, which gives a taper to shaft 2702. Shaft 2702 additionally includes pins 2722 and locator pin 2724. When assembling fold drive 506, slip collar 2704 is placed onto shaft 2702 such that shaft 2702 passes through aperture 2734. To assure the correct alignment of slip collar 2704, locator pin 2724 fits through aperture 2736 of slip collar 2704. Slip collar 2704 additionally includes protrusion 2738 which is designed to fit within a corresponding recess of fold clutch 2710 of FIG. 27. Slip collar 2704 further includes extension 2740 which is operable to be received by a recess of gear seat 2712 of FIG. 27. Shaft 2702 further includes aperture 2719 which are operable to non-moveably fix shaft 2702 to mirror base 204 (not shown).

Aperture 2736 receiving locator pin 2724 ensures that each of pin 2722 fits with a corresponding recess 2728 on the inner circumference of slip collar 2704. Once locator pin 2724 is aligned with aperture 2736 and pin 2722 aligned with recess 2728, slip collar 2704 can be moved along shaft 2702 until protrusion 2726 of slip collar 2704 fit within recess 2720 of shaft 2702.

Figure 29:
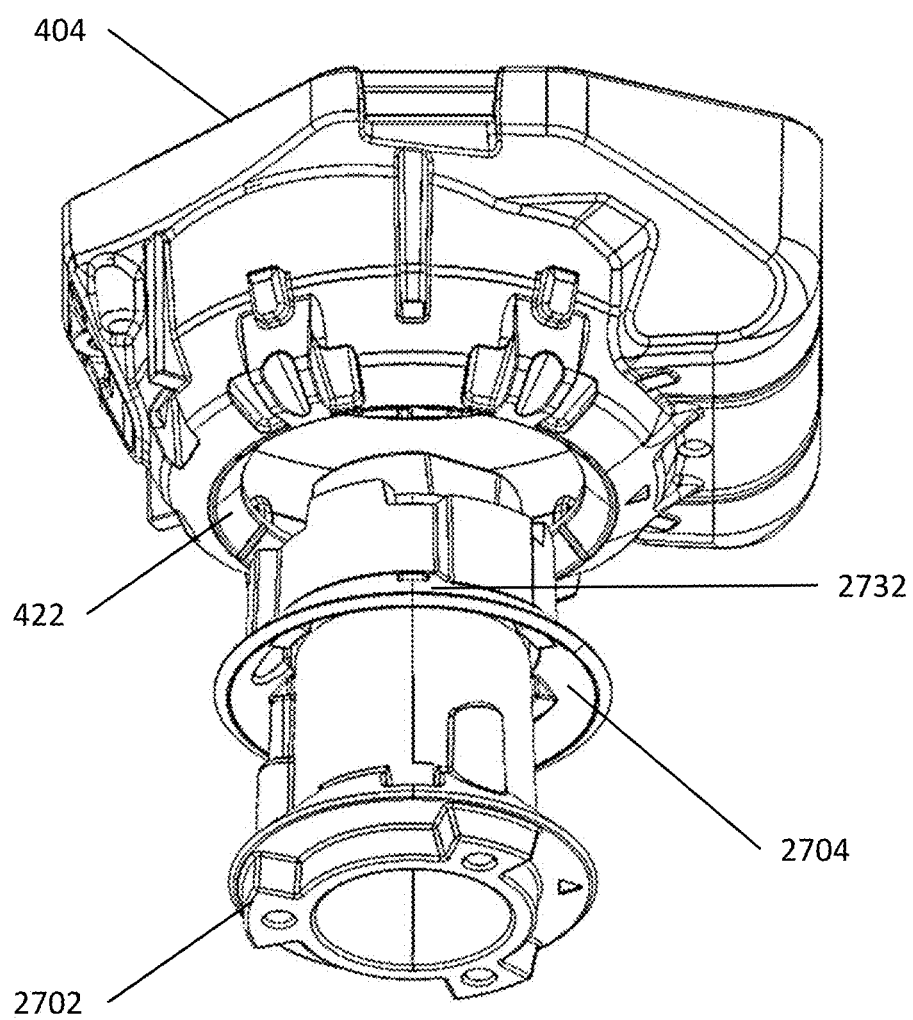
FIG. 29 illustrates the assembly of a fold drive within a lower housing in accordance with aspects of the present disclosure.

FIG. 29 illustrates the assembly of fold drive 506 with lower housing 404 in accordance with aspects of the present disclosure. As shown in the figure, lower housing 404 includes a taper 422. Once slip collar 2704 has been fixed to shaft 2702, as described above in FIG. 29, lower housing 404 may be assembled with fold drive 506. To assemble lower housing 404 with fold drive 506, lower housing 404 is placed onto shaft 2702 and then lowered until taper 422 of lower housing 404 abuts taper 2732 of slip collar 2704.

Figure 30:
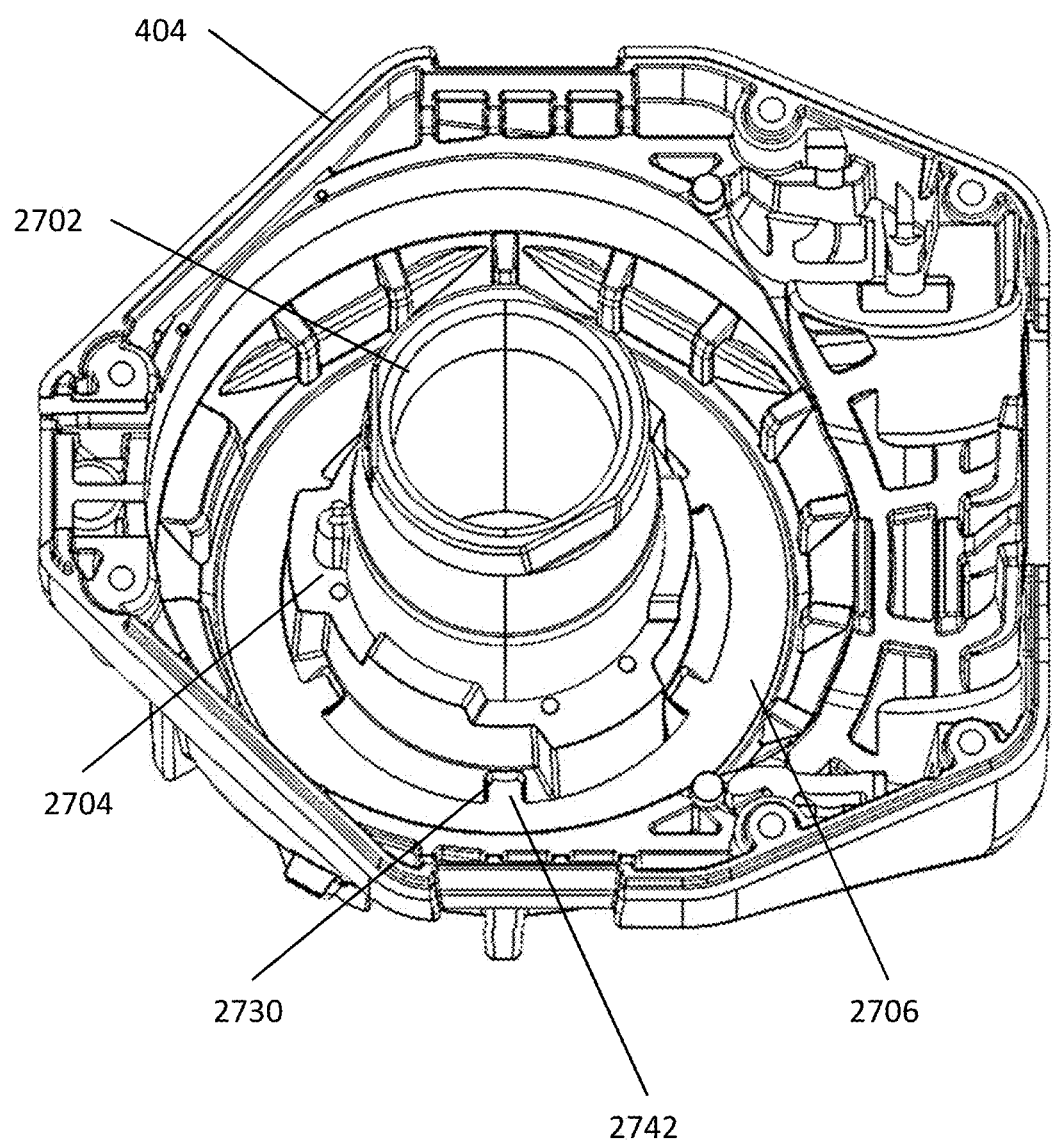
FIG. 30 illustrates a lower housing assembled with a fold drive in accordance with aspects of the present disclosure.
Figure 31:
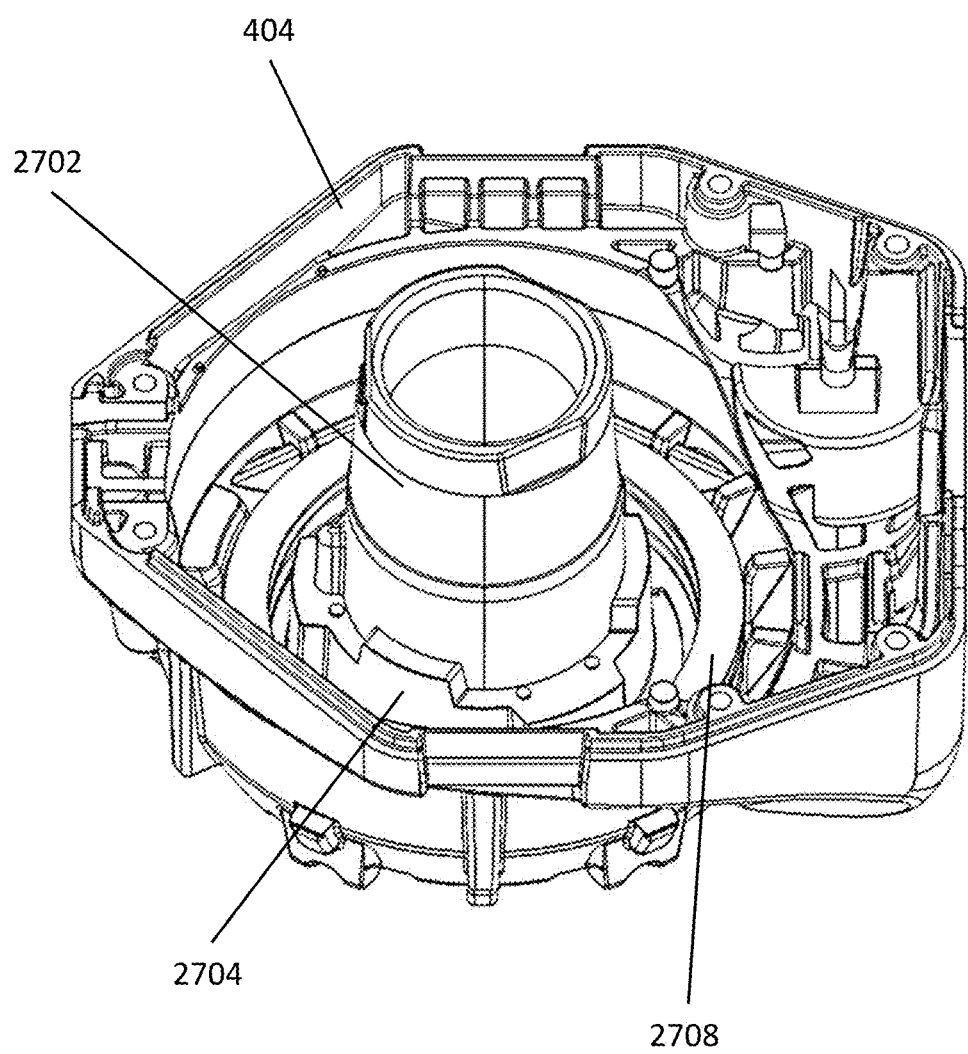
FIG. 31 illustrates a shaft, slip collar, lock ring, fold spring, and lower housing assembled in accordance with aspects of the present disclosure.

FIG. 30 illustrates lower housing 404 assembled with fold drive 506 in accordance with aspects of the present disclosure. FIG. 31 illustrates shaft 2702, slip collar 2704, lock ring 2706, fold spring 2708, and lower housing 404 assembled in accordance with aspects of the present disclosure. As shown in the figure, once lower housing 404 has been arranged such that taper 422 abuts taper 2732 of slip collar 2704, lock ring 2706 may be installed. Next, lock ring 2706 is arranged such that slip collar 2704 fits inside of aperture 2744 (FIG. 28) and lock ring 2706 can be moved along slip collar 2704 until protrusion 2742 of lock ring 2706 fits within recess 2730 of slip collar 2704. At this time, fold spring 2708 can be placed over shaft 2702 and lowered until it rests on lock ring 2706 as shown in FIG. 31.

Figure 32:
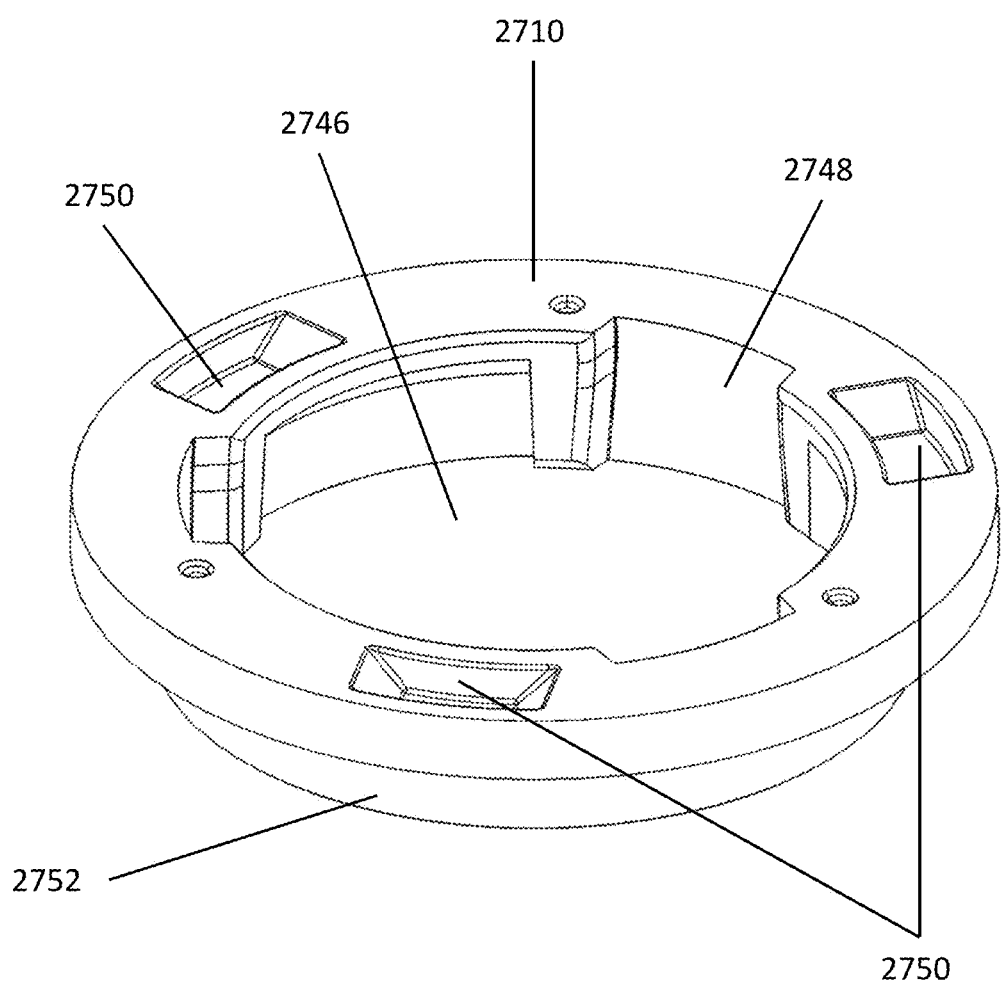
FIG. 32 illustrates a fold clutch in accordance with aspects of the present disclosure.

FIG. 32 illustrates fold clutch 2710 in accordance with aspects of the present disclosure. As shown in the figure, fold clutch 2710 includes an aperture 2746, a recess 2748, at least one recess 2750, and an annular extension 2752. Aperture 2746 is operable such that it may allow the passage of shaft 2702 through fold clutch 2710. Recess 2748 is operable to receive extension 2740 of slip collar 2704 of FIG. 27. Recess 2750 is operable to receive a protrusion of primary fold gear 1202 of FIG. 27. Annular extension 2752 is operable to fit within the inner circumference of fold spring 2708.

Figure 33:
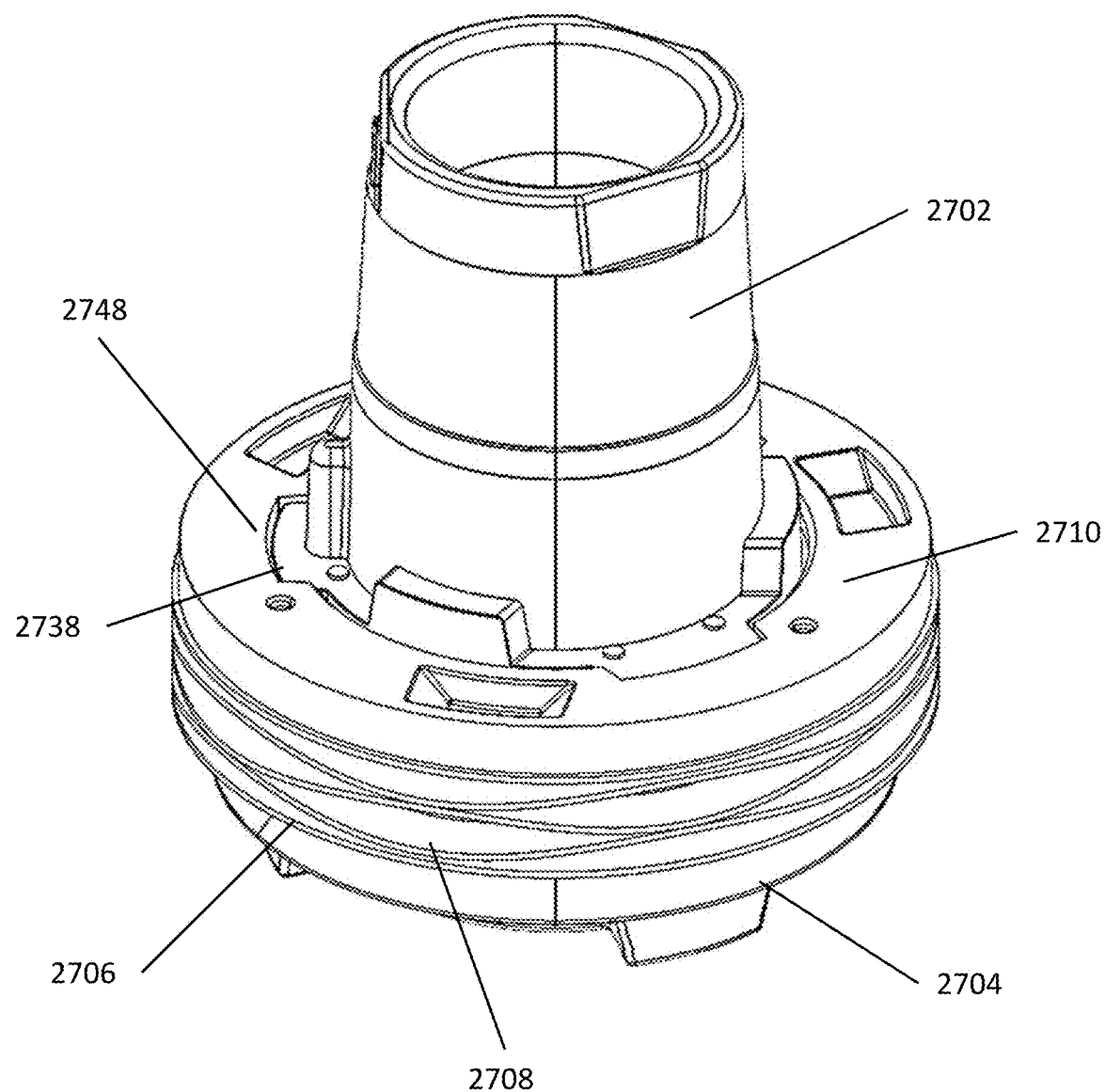
FIG. 33 illustrates a fold clutch installed in a fold drive in accordance with aspects of the present disclosure.

FIG. 33 illustrates fold clutch 2710 installed onto fold drive 506 in accordance with aspects of the present disclosure. However, it should be noted that for the sake of clarity, lower housing 404 is not shown in FIG. 33. As shown in the figure, fold clutch 2710 is lowered such that shaft 2702 passes through aperture 2746. Once protrusion 2738 of slip collar 2704 and recess 2748 of fold clutch 2710 are aligned, fold clutch 2710 can be lowered until it abuts fold spring 2708 and annular extension 2752 of fold clutch 2710 is arranged within the inner circumference of fold spring 2708.

Figure 34:
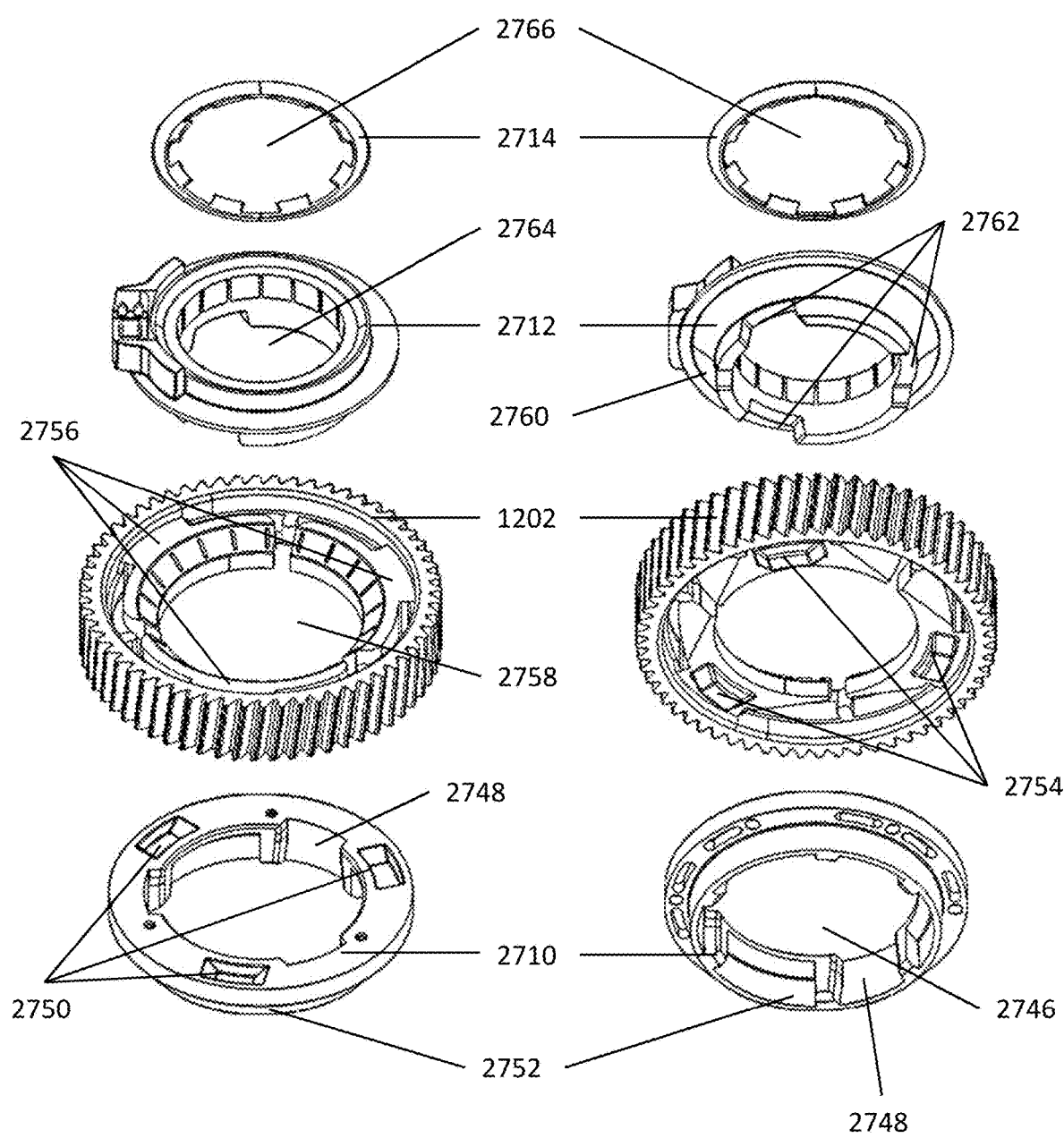
FIG. 34 illustrates a perspective view of a fold clutch, fold gear, gear seat, and retainer in accordance with aspects of the present disclosure.
Figure 35:
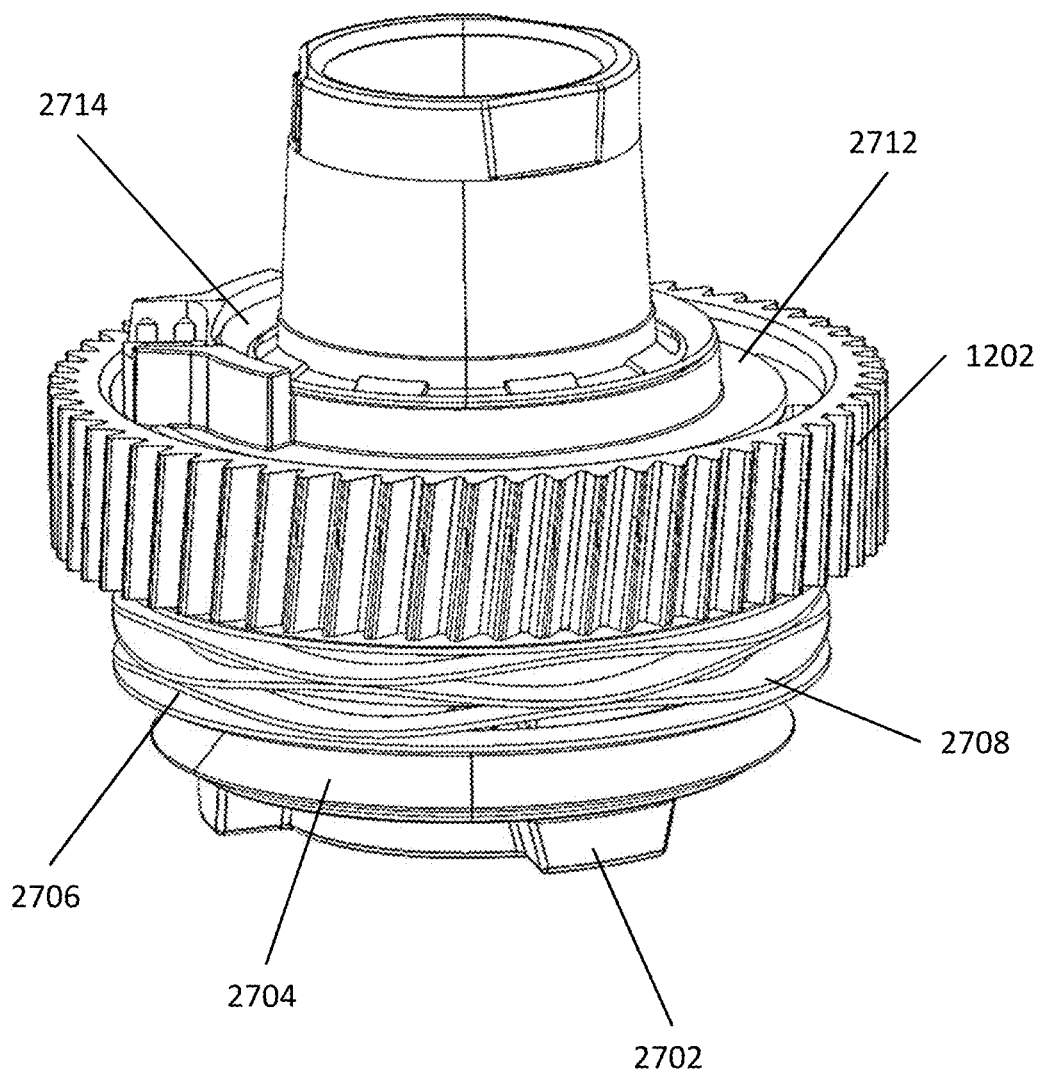
FIG. 35 illustrates a fold drive fully assembled in accordance with aspects of the present disclosure.

FIG. 34 illustrates a perspective view of fold clutch 2710, primary fold gear 1202, gear seat 2712, and retainer 2714 in accordance with aspects of the present disclosure. The left side of FIG. 34 illustrates a perspective view from the top-down and the right side of FIG. 34 illustrates a perspective view from the bottom-up. FIG. 35 illustrates fold drive 506 fully assembled in accordance with aspects of the present disclosure. However, it should be noted that for the sake of clarity, lower housing 404 is not shown.

As shown in FIGS. 34-35, fold clutch 2710 includes the elements described above in FIG. 32 and for purposes of brevity, will not be described again here. The figures additionally includes primary fold gear 1202, gear seat 2712, and retainer 2714. Protrusion 2754 of primary fold gear 1202 is operable to be received by recess 2750 of fold clutch 2710. When assembled within fold drive 506, protrusion 2754 of primary fold gear 1202 fits within recess 2750 of fold clutch 2710. In this manner, fold clutch 2710 and primary fold gear 1202 can be held in abutment against each other by the biasing force of fold spring 2708 in order to rotationally lock fold clutch 2710 and primary fold gear 1202.

The geometry of extension 2756 incorporates a taper which corresponds to taper 2760 of gear seat 2712. When assembled within fold drive 506, fold spring 2708 exerts a biasing force against fold clutch 2710 which is transferred to primary fold gear 1202, which forces the taper of extension 2756 against taper 2760 of gear seat 2712. The corresponding tapers of annular extension 2752 and gear seat 2712 ensures the correct alignment between primary fold gear 1202 and gear seat 2712. When assembled within fold drive 506, retainer 2714 is fixed in place along shaft 2702 to prevent movement of gear seat 2712, primary fold gear 1202, and fold clutch 2710 due to the biasing force of fold spring 2708.

Retainer 2714 is operable to be attached to shaft 2702 (not shown) and fixed in place such that it abuts gear seat 2712. Once fixed to shaft 2702, retainer 2714 can prevent movement of gear seat 2712, primary fold gear 1202, and fold clutch 2710.

Once shaft 2702, slip collar 2704, lower housing 404, lock ring 2706, fold spring 2708, and fold clutch 2710 have been assembled as described above in FIGS. 28-33, primary fold gear 1202 may be installed on shaft 2702.

Primary fold gear 1202 is lowered onto fold clutch 2710 such that shaft 2702 passes through aperture 2758 and protrusion 2754 of primary fold gear 1202 are received within recess 2750 of fold clutch 2710. Next, gear seat 2712 is lowered onto primary fold gear 1202 such that shaft 2702 passes through aperture 2764 until taper 2760 abuts the corresponding taper of extension 2756 of primary fold gear 1202. Finally, retainer 2714 is placed so that shaft 2702 passes through aperture 2766 and lowered until it abuts gear seat 2712, where it is then fixed in place. The fixing of retainer 2714 prevents movement of fold clutch 2710, primary fold gear 1202, and gear seat 2712 against the biasing force of fold spring 2708.

Figure 36:
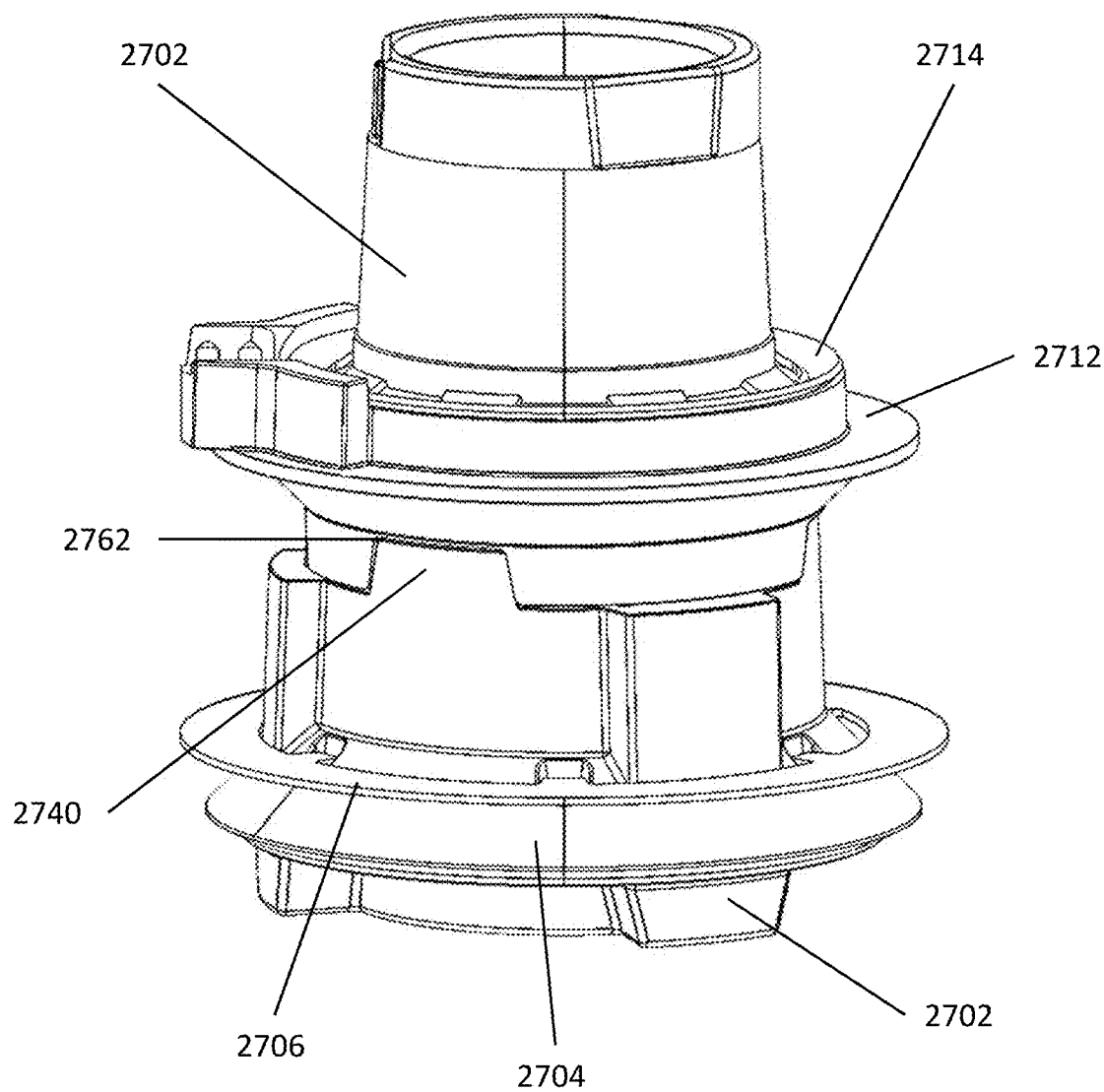
FIG. 36 illustrates an alternative view of a fold drive assembled in accordance with aspects of the present disclosure.

FIG. 36 illustrates an additional view for fold drive 506 assembled in accordance with aspects of the present disclosure. However, it should be noted that fold clutch 2710, primary fold gear 1202, fold spring 2708, and lower housing 404 have been removed for clarity.

As shown in the figure, when fold drive 506 is assembled, gear seat 2712 abuts slip collar 2704 such that extension 2740 of slip collar 2704 is received by recess 2762 of gear seat 2712. Since slip collar 2704 is fixed in place by a force interference fit with shaft 2702 and gear seat 2712 is fixed in place by retainer 2714, it is possible to disengage fold clutch 2710 during manual operation of fold drive 506. Manual operation of fold drive 506 will be described later with reference to FIGS. 40A-B.

Figure 37:
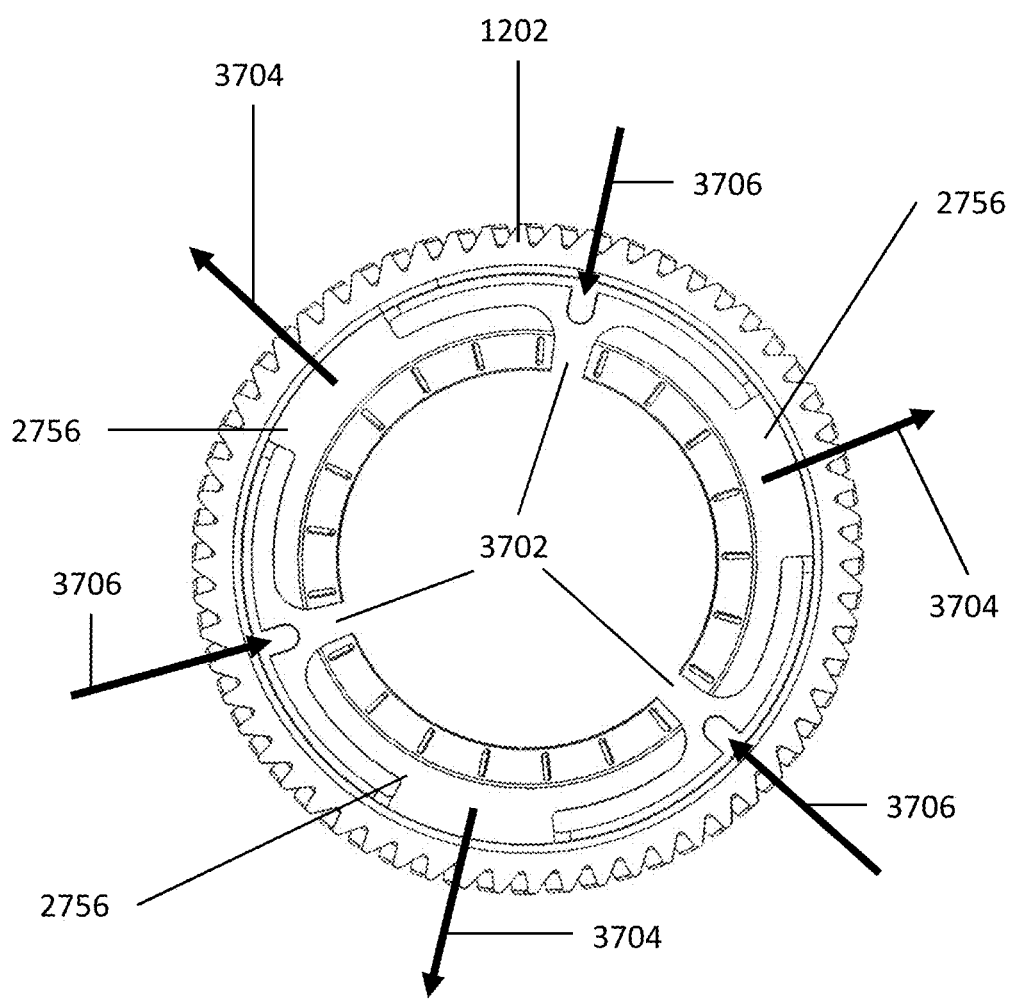
FIG. 37 illustrates a top-down view of a fold gear in accordance with aspects of the present disclosure.

FIG. 37 illustrates a top-down view of primary fold gear 1202 in accordance with aspects of the present disclosure. In operation, when fold drive 506 is assembled within actuator 400 fold spring 2708 exerts a force against fold clutch 2710 which is then transferred to primary fold gear 1202. Primary fold gear 1202 is held in place against the force exerted by fold spring 2708 by retainer 2714 and gear seat 2712. In this arrangement, gear seat 2712 provides a counter force to fold spring 2708 which forces taper 2760 of gear seat 2712 against the taper of extension 2756. Primary fold gear 1202 is constrained to prevent movement along the direction of the force applied by fold spring 2708 which redirects the force radially outward due to the abutment of the tapers incorporated into gear seat 2712 and primary fold gear 1202.

As shown in the figure, extension 2756 is distributed equidistant around the inner circumference of primary fold gear 1202 wherein each end of extension 2756 creates a gap 3702. The abutment of the taper of extension 2756 against taper 2560 of gear seat 2712 forces primary fold gear 1202 to expand radially along extension 2756 as shown by direction 3704. The expansion along direction 3704 is compensated for by gap 3702 which allows primary fold gear 1202 to contract inwards as shown by direction 3706. The expansion of primary fold gear 1202 along direction 3704 and contraction along direction 3706 creates a trilobal shape. The trilobal shape of primary fold gear 1202 improves the meshing with gear assembly 502, which will now be further described with reference to FIG. 38-39.

Figure 38:
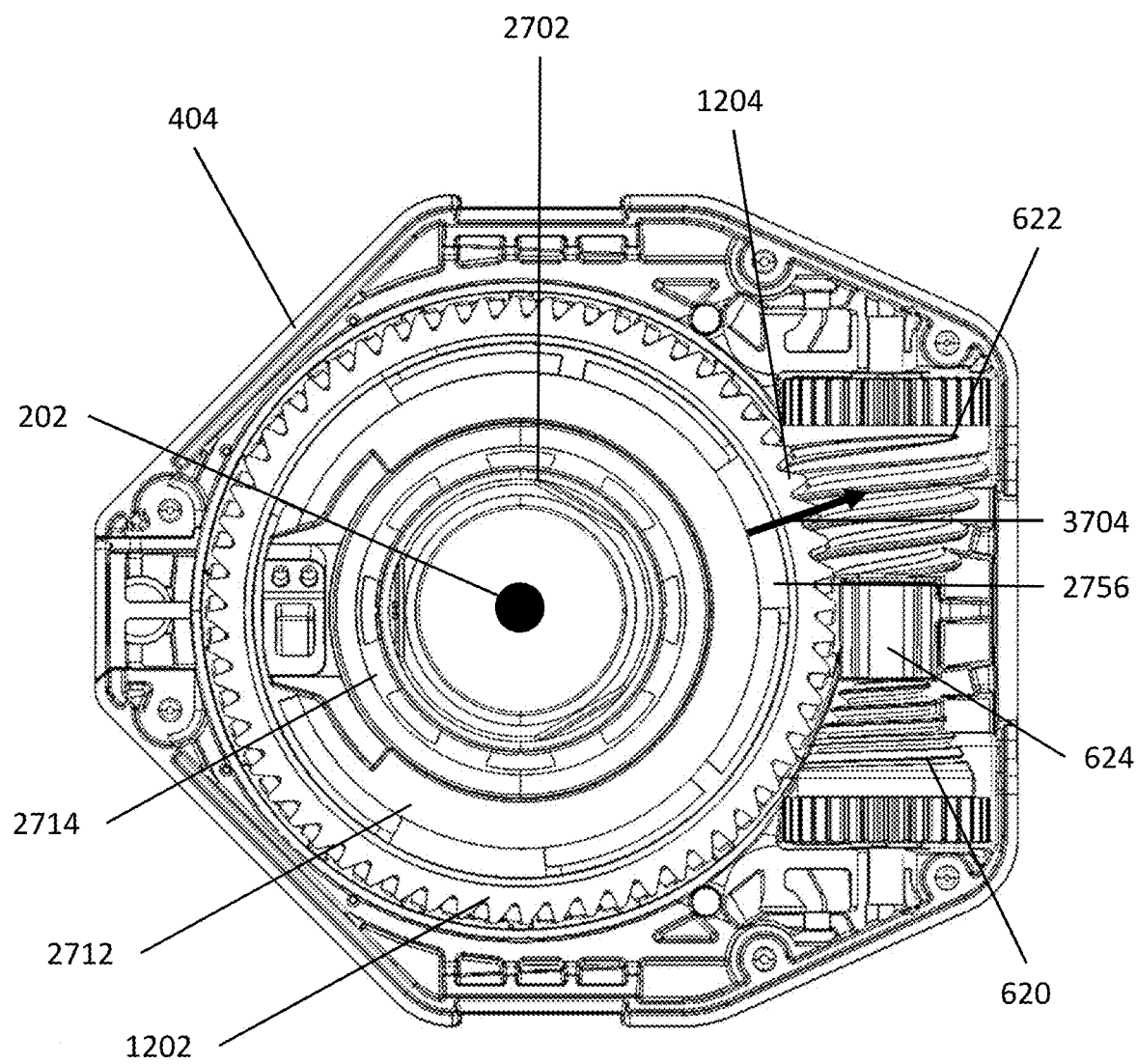
FIG. 38 illustrates a top-down view of a fold drive and gear sub assembly installed within a lower housing of an actuator in accordance with aspects of the present disclosure.
Figure 39:
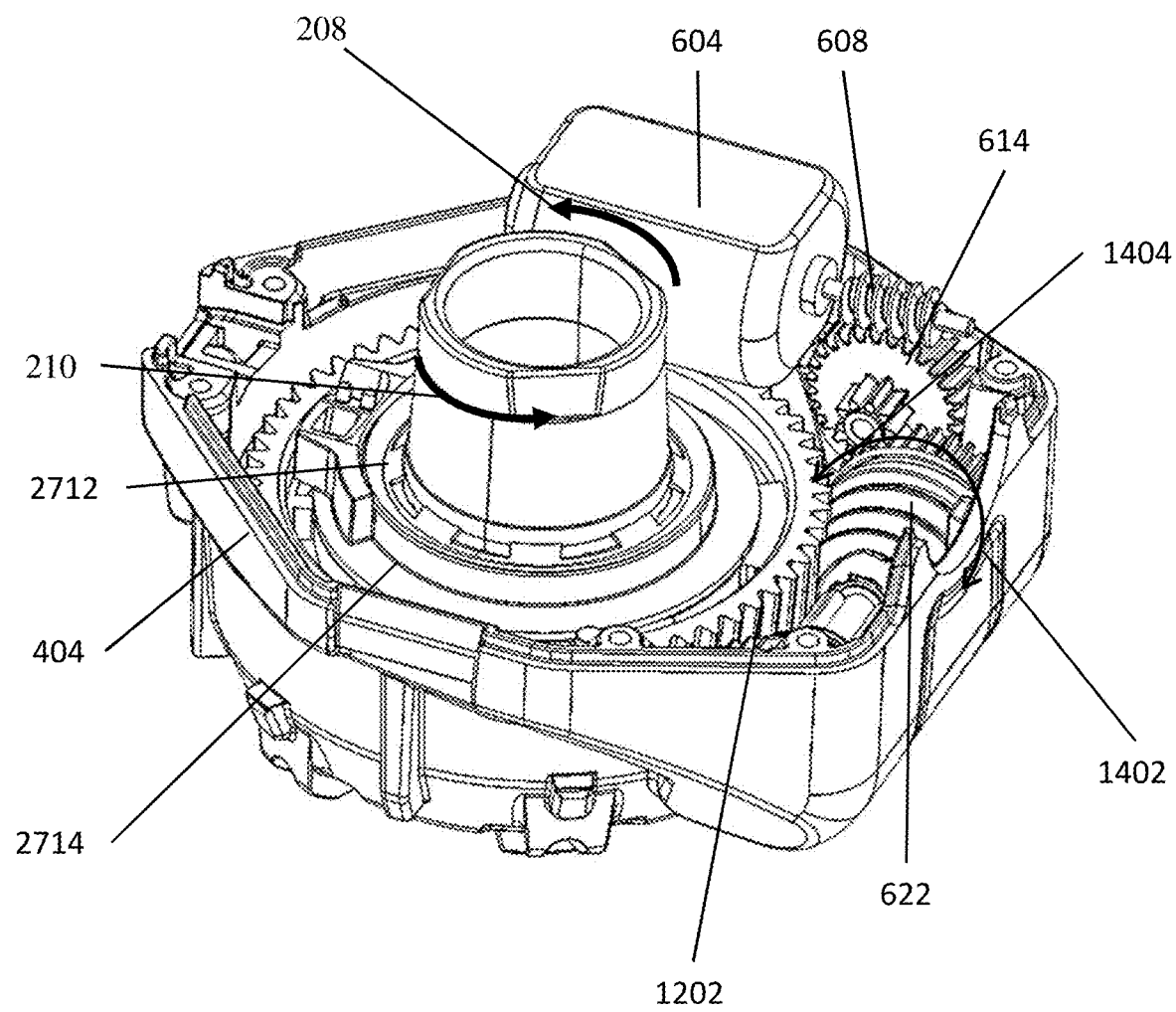
FIG. 39 illustrates a perspective view of a gear assembly and fold drive installed within a lower housing of an actuator in accordance with aspects of the present disclosure.

FIG. 38 illustrates a top-down view of fold drive 506 and gear sub assembly 616 installed within lower housing 404 in accordance with aspects of the present disclosure. FIG. 39 illustrates a perspective view of gear assembly 502 and fold drive 506 installed within lower housing 404 in accordance with aspects of the present disclosure. However, for purposes of clarity, all other elements of gear assembly 502 not utilized for the operation of fold drive 506 in FIGS. 38-39 have been removed. Additionally, in FIG. 38-39, lower housing 404 is shown at its nominal position.

As shown in FIGS. 38-39, when installed within lower housing 404, primary fold gear 1202 meshes with secondary fold gear 622 at point 1204. The arrangement of primary fold gear 1202 is chosen during assembly such that extension 2756 is located adjacent to secondary fold gear 622 of gear assembly 502. As described above in FIG. 37, primary fold gear 1202 has a trilobal form and expands along direction 3704 which increases the meshing between primary fold gear 1202 and secondary fold gear 622. The expansion of primary fold gear 1202 is such that it has a trilobal geometry and the improved meshing is at a maximum when mirror head 206 (not shown) is in a nominal position, since extension 2756 is adjacent to secondary fold gear 622 along direction 3704.

The improved meshing reduces backlash between primary fold gear 1202 and secondary fold gear 622. If a conventional cylindrical fold gear was used, small variations in the arrangement of components within fold drive 506 and even further, actuator 400, would result in free play between the gear teeth of primary fold gear 1202 and secondary fold gear 622. When not being operated, the free play between primary fold gear 1202 and secondary fold gear 622 would result in free play of mirror head 206 (not shown). The free play of mirror head 206 would introduce issues such as mirror head 206 vibrating or wobbling due to external forces such as wind while driving. Additionally, when fold drive 506 is electrically operated, the free play between the gear teeth of primary fold gear 1202 and secondary fold gear 622 would be closed as secondary fold gear 622 rotated. Once the space between the teeth of primary fold gear 1202 and secondary fold gear 622 is closed, the teeth would abruptly contact each other, which could damage either of primary fold gear 1202 or secondary fold gear 622 with repeated use.

In this example, primary fold gear 1202 has expanded to take a trilobal shape, however the primary fold gear 1202 may expand to other geometries as well. For example, if secondary fold gear 622 was too close to primary fold gear 1202, primary fold gear 1202 would deform such that extension 2756 nearest to secondary fold gear 622 would deform so that it moved in the opposing direction, which in this example would be opposite of direction 3704. The remaining extension 2756 would then deform to compensate for the deformation of extension 2756 adjacent to secondary fold gear 622. In this manner, primary fold gear 1202 can morph such that it has the optimal geometry to improve meshing between primary fold gear 1202 and secondary fold gear 622 to account for variations incurred in the production and mounting of the elements of actuator 400.

To operate fold drive 506, power is delivered to motor 604 from an external source (not shown), such as a vehicle's 100 battery or electrical system. Once supplied with power, motor 604 will turn worm gear 608 (FIG. 6), which may then rotate intermediate fold gear 614, which in turn rotates secondary fold gear 622. Referring briefly to FIG. 33-34, since protrusion 2738 of slip collar 2704 is received within recess 2748 of fold clutch 2710, fold clutch 2710 is rotationally locked. With fold clutch 2710 rotationally locked and protrusion 2754 of primary fold gear 1202 received within recess 2750 of fold clutch 2710, primary fold gear 1202 is also rotationally locked.

Returning to FIG. 38-39, as secondary fold gear 622 rotates it results in lower housing 404, and by extension actuator 400, to rotate around primary fold gear 1202 centered about axis 202. Rotation of actuator 400 about primary fold gear 1202 occurs because shaft 2702 is fixed to mirror base 204 via aperture 2719 as described above in FIG. 28. Therefore, since shaft 2702 is static, so are each of slip collar 2704, lock ring 2706, and gear seat 2712. With these elements rotationally locked, when fold clutch 2710 is engaged, fold clutch 2710 and primary fold gear 1202 are rotationally locked as well. With shaft 2702, slip collar 2704, fold clutch 2710, primary fold gear 1202, and gear seat 2712 each rotationally locked while fold clutch 2710 is engaged, actuator 400 will rotate around axis 202 as secondary fold gear 622 rotates. In this example variation, when secondary fold gear 622 rotates in first fold gear direction 1402, actuator 400 rotates in first fold direction 208 and secondary fold gear 622 rotating in second fold gear direction 1404 results in actuator 400 rotating in second fold direction 210. The rotation of actuator 400 about primary fold gear 1202 occurs due to shaft 2702 being static.

As described above in FIG. 22, mirror head 206 is attached to actuator 400 via attachment point 1516 of tilt axle 1504. Therefore, when fold drive 506 is electrically operated, mirror head 206 will rotate about axis 202 in either first fold direction 208 or second fold direction 210. Operation of fold drive 506 in either first fold direction 208 or second fold direction 210 can be performed for short periods of time in order to adjust mirror head 206 such that an attached reflective element (not shown) provides an acceptable view rearward of the vehicle 100.

However, operation of fold drive 506 can be performed for longer periods of time in order to adjust mirror head 206 along first fold direction 208 from a drive position as shown in FIG. 2A to a stored position as shown in FIG. 2B. Alternatively, the operation of fold drive 506 can be performed for a longer period of time in order to adjust mirror head 206 along second fold direction 210 from a storage position as shown in FIG. 2B to a drive position as shown in FIG. 2A. The operation of fold drive 506 during manual operation will now be described with additional reference to FIGS. 40A-B.

Figure 40A:
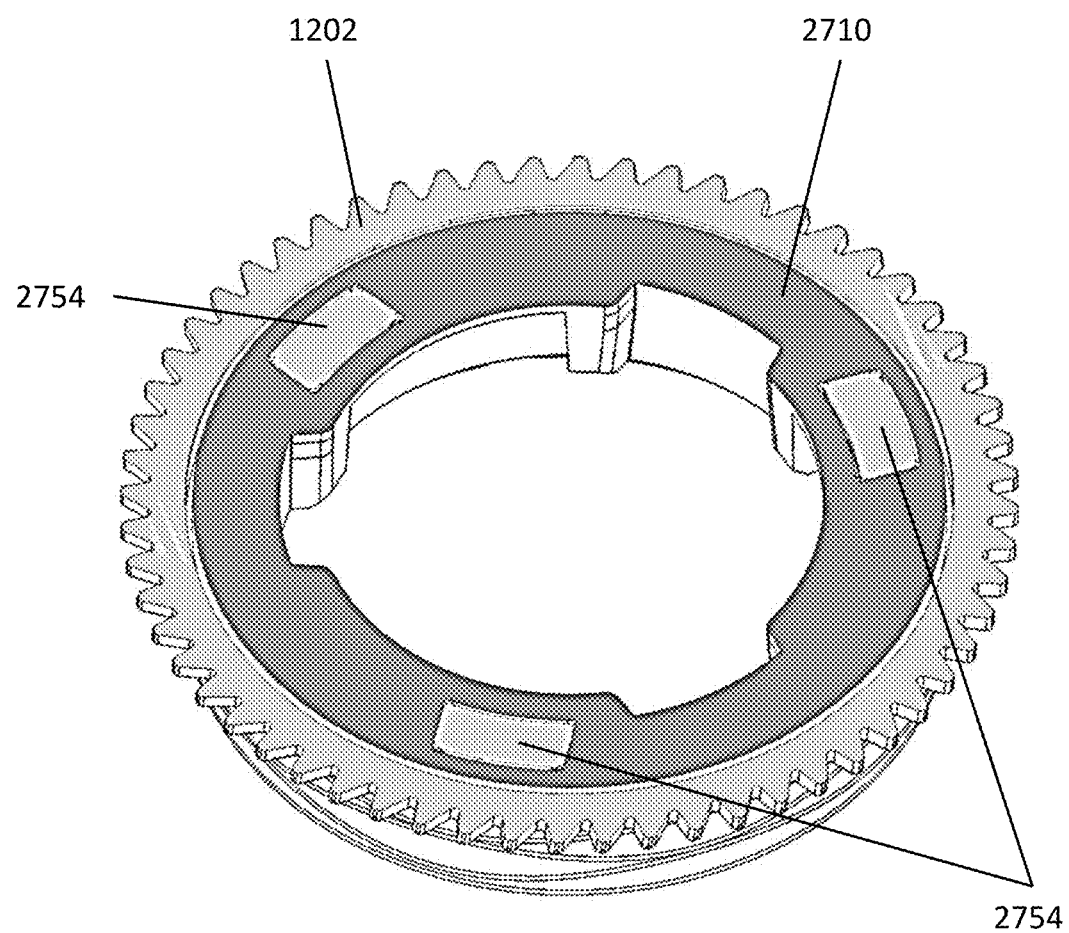
FIG. 40A illustrates a fold clutch engaged during manual operation of a fold drive in accordance with aspects of the present disclosure.
Figure 40B:
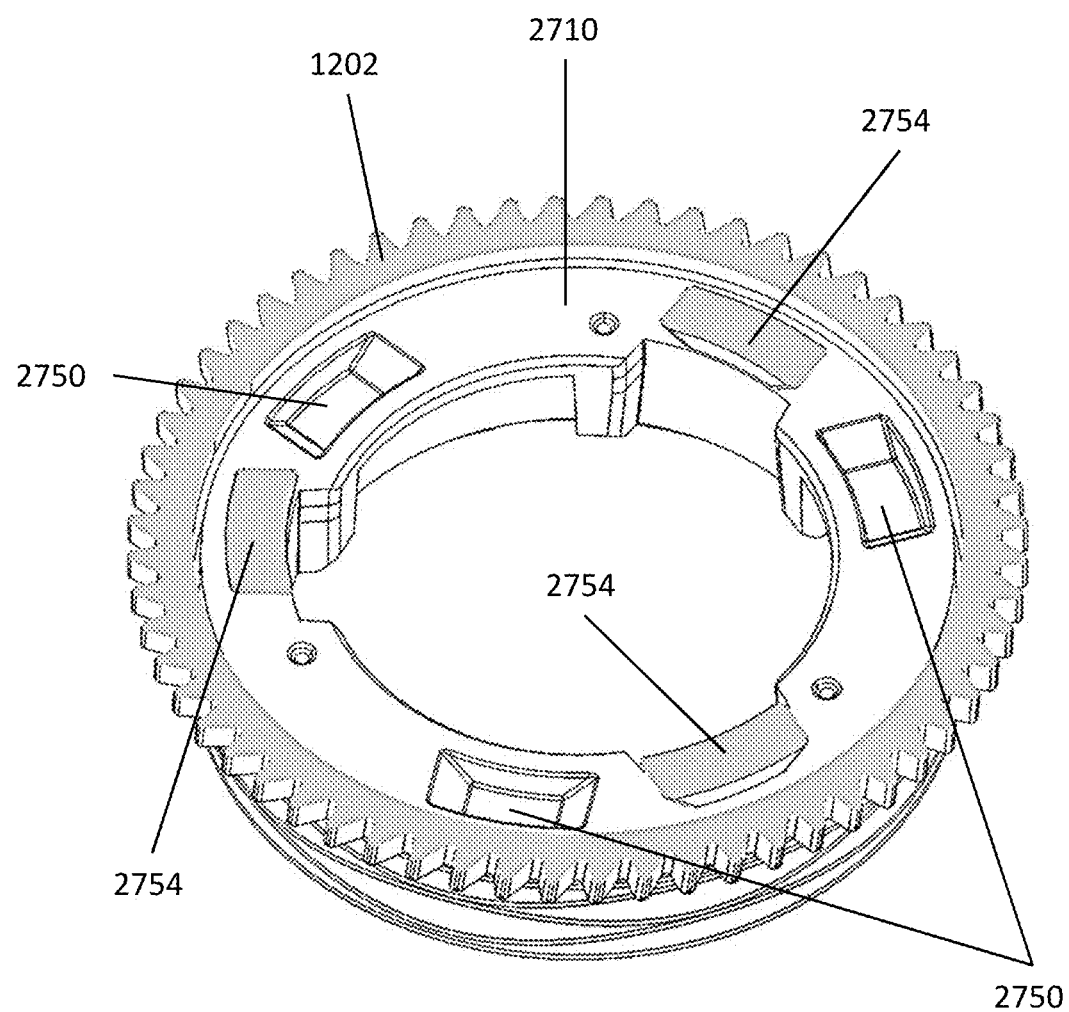
FIG. 40B illustrates a fold clutch disengaged during manual operation of a fold drive in accordance with aspects of the present disclosure.

FIG. 40A illustrates fold clutch 2710 engaged during manual operation of fold drive 506 in accordance with aspects of the present disclosure. FIG. 40B illustrates fold clutch 2710 disengaged during manual operation of fold drive 506 in accordance with aspects of the present disclosure.

When mirror head 206 is in the drive position, actuator 400 is in its nominal position as well. In the nominal position, fold clutch 2710 is engaged, meaning that protrusion 2754 of primary fold gear 1202 is located within recess 2750 of fold clutch 2710, as shown in FIG. 40A. During manual operation, mirror head 206 will rotate as it is manually adjusted which results in the rotation of actuator 400 since mirror head 206 is connected to actuator 400 via attachment point 1516 of tilt axle 1504.

As actuator 400 rotates, so does gear assembly 502, including secondary fold gear 622. Since secondary fold gear 622 meshes with primary fold gear 1202, as actuator 400 rotates the primary fold gear 1202 rotates. Referring briefly to FIG. 33, protrusion 2738 of slip collar 2704 is received by recess 2748, which rotationally locks fold clutch 2710. When primary fold gear 1202 is forced to rotate the edge of protrusion 2754 of primary fold gear 1202 slides against the edge of recess 2750 of fold clutch 2710. With primary fold gear 1202 biased towards gear seat 2712 which is fixed in place retainer 2714, fold clutch 2710 is displaced away from primary fold gear 1202, compressing fold spring 2708.

Referring to FIG. 40B, once the edge of protrusion 2754 of primary fold gear 1202 slides against the edge of recess 2750 of fold clutch 2710, fold clutch 2710 is forced towards fold spring 2708 and becomes disengaged from primary fold gear 1202. At this time, protrusion 2754 of primary fold gear 1202 is able to slide along the surface of fold clutch 2710. In this manner, the manual operation of fold drive 506 can be achieved while protecting gear assembly 502 and fold drive 506.

Returning mirror head 206 to its drive position can be achieved through electrical actuator 400 or manual operation. In the case of manual operation, mirror head 206 can be rotated back towards its drive position. As mirror head 206 rotates, so does primary fold gear 1202 and protrusion 2754 slides along the surface of fold clutch 2710. As mirror head 206 approaches the drive position, protrusion 2754 of primary fold gear 1202 will begin to align with recess 2750 of fold clutch 2710. Once mirror head 206 reaches the drive position, the biasing force of fold spring 2708 will force protrusion 2754 of primary fold gear 1202 into recess 2750 of fold clutch 2710 such that fold clutch 2710 abuts primary fold gear 1202. At this time, fold clutch 2710 is engaged as described above in FIG. 40A.

In the case of electrical operation, power is delivered to motor 604 resulting in the rotation of secondary fold gear 622 as described above in FIGS. 38-39. Since fold clutch 2710 is disengaged, primary fold gear 1202 is free to rotate when driven instead of actuator 400 rotating around primary fold gear 1202. As primary fold gear 1202 rotates, protrusion 2754 of primary fold gear 1202 will begin to align with recess 2750 of fold clutch 2710. Once primary fold gear 1202 is rotated such that protrusion 2754 of primary fold gear 1202 aligns with recess 2750 of fold clutch 2710, the biasing force of fold spring 2708 will force fold clutch 2710 to abut primary fold gear 1202. At this time, fold clutch 2710 is engaged and fold drive 506 can be operated as described above in FIGS. 38-39 in order to actuate mirror head 206 back to the desired position.

In some instances, it may be desirable to have a memory function for use with actuator 400. A memory function would allow the driver of a vehicle to set a specific fold and tilt angle for mirror head 206 that can then be stored at a later time. If the position of mirror head 206 is changed, the stored position could then be retrieved at a later time to automatically move mirror head 206 back to the stored position without any fine tune adjustment by the driver. A fold memory function of actuator 400 will now be described with reference to FIGS. 41-42.

Figure 41:
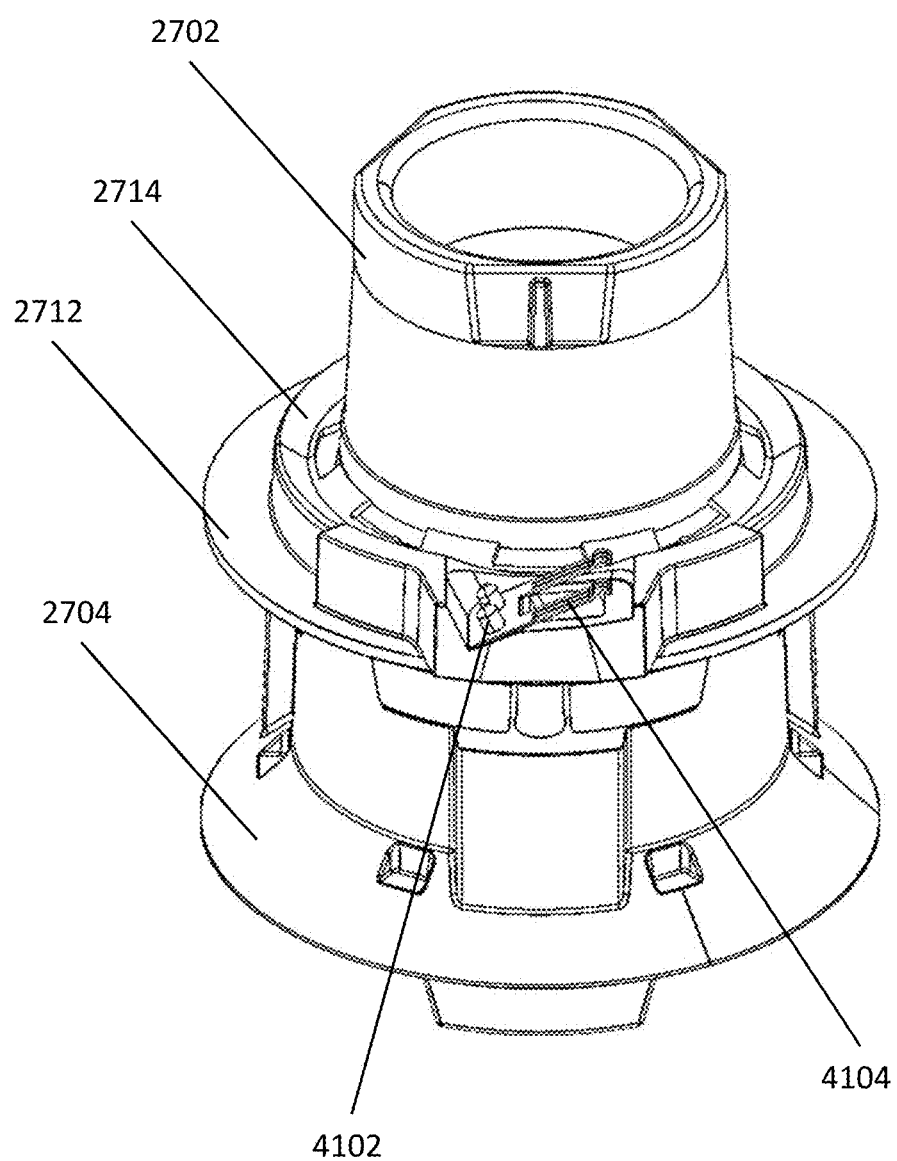
FIG. 41 illustrates a fold memory wiper installed on a gear seat in accordance with aspects of the present disclosure.

FIG. 41 illustrates a fold memory wiper installed on gear seat 2712 in accordance with aspects of the present disclosure. As shown in the figure, gear seat 2712 includes a fold wiper carrier 4102 and a fold wiper 4104. Fold wiper 4104 is attached to gear seat 2712 via fold wiper carrier 4102. In this arrangement fold wiper 4104 remains static during the operation of actuator 400 since shaft 2702 is fixed to mirror base 204 via aperture 2719 as described above in FIG. 28. Therefore, since shaft 2702 is static, slip collar 2704, lock ring 2706, and gear seat 2712 which includes fold wiper carrier 4102 and fold wiper 4104 are also static.

Figure 42:
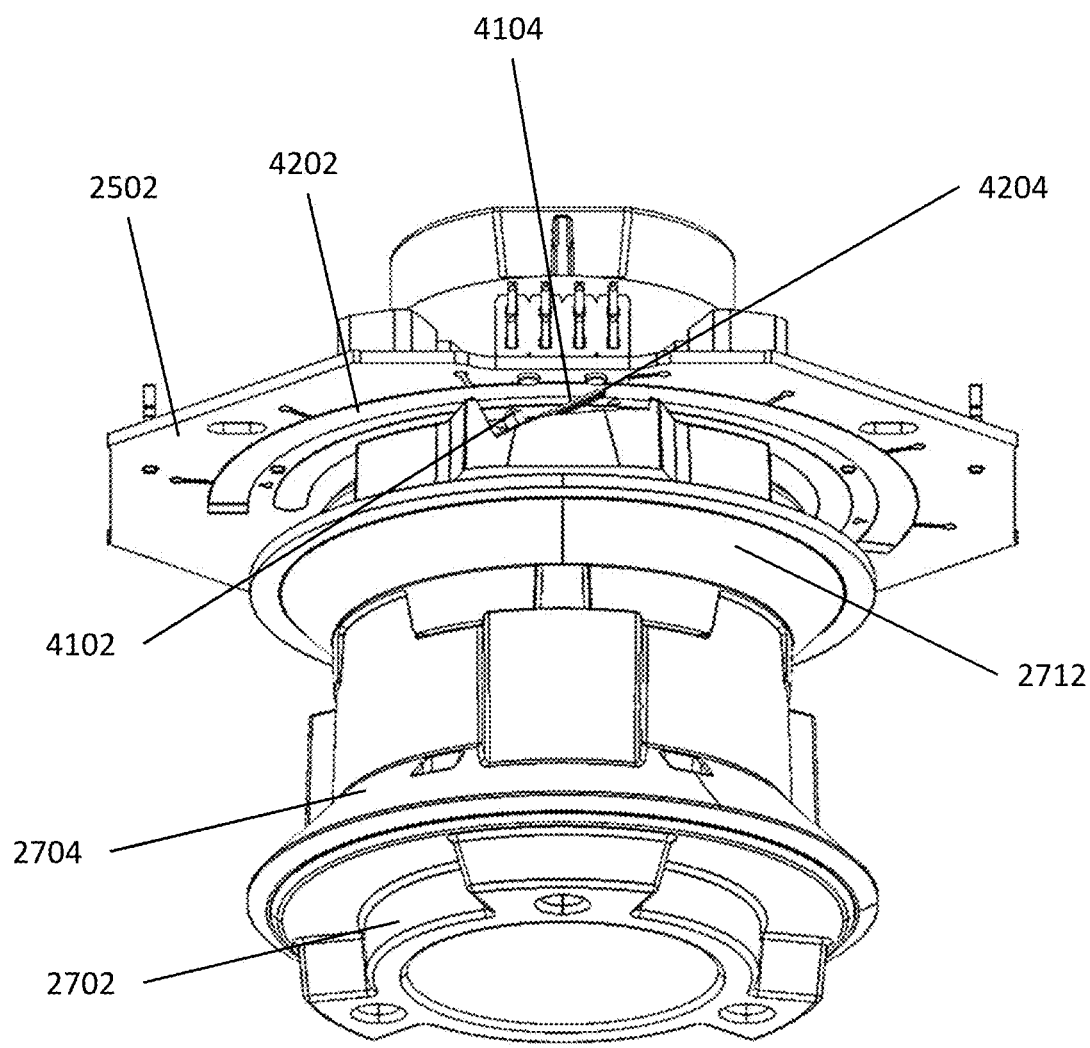
FIG. 42 illustrates the operation of a fold memory wiper in accordance with aspects of the present disclosure.

FIG. 42 illustrates the operation of fold wiper 4104 in accordance with aspects of the present disclosure. As shown in the figure, PCB 2502 is arranged in its installed location within actuator 400 relative to fold drive 506. In this position, fold wiper 4104 contacts carbon strip 4202 of PCB 2502 at contact point 4204. PCB 2502 is arranged on upper housing 402 as described above in FIGS. 25-26, however for sake of clarity, upper housing 402 is not shown in FIG. 41-42.

As described above, during the operation of fold drive 506 shaft 2702, slip collar 2704, and gear seat 2712 will remain static while actuator 400 rotates about axis 202, including PCB 2502. As PCB 2502 rotates around axis 202 during the operation of fold drive 506, fold wiper 4104 will contact different points along carbon strip 4202. Once the desired fold position of mirror head 206 has been reached a measurement may be taken by a potentiometer (not shown) to record the position of fold wiper 4104 along carbon strip 4202. In order to adjust the fold angle of mirror head 206 by using the memory system, power may delivered to motor 602 to adjust the fold angle of mirror head 206 until the potentiometer system detects that the position of fold wiper 4104 has contacted the point along carbon strip 4202 that matches the stored position of fold wiper 4104 along carbon strip 4202.

The foregoing description of various preferred embodiments have been presented for purposes of illustration and description. It is not intended to be exhaustive or to limit the disclosure to the precise forms disclosed, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated.

REFERENCE SIGN LIST

100—Vehicle
102—Exterior Rearview Mirror Assembly
104—Exterior Rearview Mirror Assembly
202—Axis
204—Mirror Base
206—Mirror Head
208—First Fold Direction
210—Second Fold Direction
302—Axis
304—First Tilt Direction
306—Second Tilt Direction
400—Actuator
402—Upper Housing
404—Lower Housing
406—Fastener
408—Bearing
410—Bearing
412—End Surface
414—End Surface
416—Recess
418—Recess
420—Channel
422—Taper
502—Gear Assembly
504—Tilt Drive
506—Fold Drive
602—Motor
604—Motor
606—Worm Gear
608—Worm Gear
610—Intermediate Spindle
612—Intermediate Tilt Gear
614—Intermediate Fold Gear
616—Gear Sub Assembly
618—Spindle
620—Secondary Tilt Gear
622—Secondary Fold Gear
624—Slide
626—Worm Insert
628—Biasing Element
630—Channel
632—Aperture
634—Boss
636—End Surface
638—Cavity
640—Boss
642—End Surface
644—First End
646—Second End
648—Aperture
902—Spur Gear Portion
904—Worm Gear Portion
906—Transition Point
908—Diameter
910—Diameter
912—Spur Gear Portion
914—Worm Gear Portion 916—Transition Point
918—Diameter
920—Diameter
1202—Primary Fold Gear
1204—Point
1206—Point
1302—Primary Tilt Gear
1304—Tilt Gear Extension
1306—Point
1402—First Fold Gear Direction
1404—Second Fold Gear Direction
1406—First Tilt Gear Direction
1408—Second Tilt Gear Direction
1502—Tilt Journal
1504—Tilt Axle
1506—Tilt Clutch
1508—Tilt Spring
1510—Tilt Inner
1512—Aperture
1514—Taper
1516—Attachment Point
1518—Taper
1520—Taper
1522—Aperture
1524—Taper
1526—Aperture
1528—Protrusion
1530—Slot
1532—Recess
1534—Slot
1536—Extension
1538—Slot
1540—Protrusion
1542—Support
1544—Tilt Wiper Carrier Connector
2002—Aperture
2004—Bearing
2006—Recess
2008—Surface
2502—Printed Circuit Board (PCB)
2504—Tilt Wiper Carrier
2506—Slot
2508—Carbon Strip
2510—Tilt Wiper
2702—Shaft
2704—Slip Collar
2706—Lock Ring
2708—Fold Spring
2710—Fold Clutch
2712—Gear Seat
2714—Retainer
2716—Diameter
2718—Diameter
2720—Recess
2722—Pin
2724—Locator Pin
2726—Protrusion
2728—Recess
2730—Recess
2732—Taper
2734—Aperture
2736—Aperture
2738—Protrusion
2740—Extension
2742—Protrusion
2744—Aperture
2746—Aperture
2748—Recess
2750—Recess
2752—Annular Extension
2754—Protrusion
2756—Extension
2758—Aperture
2760—Taper
2762—Recess
2764—Aperture
2766—Aperture
3702—Gap
3704—Direction
3706—Direction
4102—Fold Wiper Carrier
4104—Fold Wiper
4202—Carbon Strip
4204—Contact Point

The invention claimed is:

1. An actuator for a rearview device having a mirror head and a mirror base, said actuator comprising:
a fold drive operable to rotate said mirror head in a first direction about a first axis relative to said mirror base and rotate said mirror head in a second direction about said first axis;
a tilt drive operable to rotate said mirror head in a third direction about a second axis relative to said mirror base and rotate said mirror head in a fourth direction about said second axis relative to said mirror base;
a gear assembly comprising a secondary tilt gear and a secondary fold gear,
wherein the rotation of said secondary fold gear in a first secondary fold gear direction results in said fold drive rotating said mirror head in said first direction about said first axis and wherein the rotation of said secondary fold gear in a second secondary fold gear direction results in said fold drive rotating said mirror head in said second direction about said first axis, and
wherein the rotation of said secondary tilt gear in a first secondary tilt gear direction results in said tilt drive rotating said mirror head in said third direction about said second axis and wherein the rotation of said secondary tilt gear in a second secondary tilt gear direction results in said tilt drive rotating said mirror head in said fourth direction about said second axis;
a primary fold gear comprising a first set of teeth and a plurality of extensions extending radially inward from an inner circumference of said primary fold gear, wherein a distance between each of said plurality of extensions is uniformly arranged around said inner circumference, and wherein said plurality of extensions further comprises a first taper;
said secondary fold gear comprising a second set of teeth, wherein said first set of teeth of said primary fold gear mesh with said second set of teeth of said secondary fold gear such that said first set of teeth and said second set of teeth have a first spacing; and
a gear seat arranged adjacent to said primary fold gear, wherein said gear seat has a second taper,
wherein said first taper of said primary fold gear contacts said second taper of said gear seat.

2. The actuator of claim 1, wherein said
secondary tilt gear comprising a spur gear portion, a worm gear portion, and a transition point;
wherein said transition point divides said secondary tilt gear into said spur gear portion and said worm gear portion; and wherein said worm gear portion comprises a second set of teeth.

3. The actuator of claim 1, further comprising:
a spring operable to apply a biasing force to said primary fold gear such that said primary fold gear is biased towards said gear seat, wherein a deformation of the primary fold gear occurs when said primary fold gear is biased towards said gear seat.

4. The actuator of claim 3, wherein said deformation of said primary fold gear modifies the first spacing between said first set of teeth of said primary fold gear and said second set of teeth of said secondary fold gear to a second spacing, and wherein said first spacing is different than said second spacing.

5. A rearview device with an actuator according to claim 1.

6. An actuator for a rearview device having a mirror head and a mirror base, said actuator comprising:
a fold drive operable to rotate said mirror head in a first direction about a first axis relative to said mirror base and rotate said mirror head in a second direction about said first axis;
a tilt drive operable to rotate said mirror head in a third direction about a second axis relative to said mirror base and rotate said mirror head in a fourth direction about said second axis relative to said mirror base;
a gear assembly comprising a secondary tilt gear and a secondary fold gear,
  wherein the rotation of said secondary fold gear in a first secondary fold gear direction results in said fold drive rotating said mirror head in said first direction about said first axis and wherein the rotation of said secondary fold gear in a second secondary fold gear direction results in said fold drive rotating said mirror head in said second direction about said first axis, and
  wherein the rotation of said secondary tilt gear in a first secondary tilt gear direction results in said tilt drive rotating said mirror head in said third direction about said second axis and wherein the rotation of said secondary tilt gear in a second secondary tilt gear direction results in said tilt drive rotating said mirror head in said fourth direction about said second axis;
a gear assembly comprising a primary tilt gear, a spindle and a carrier arranged on said spindle,
wherein said carrier comprises a slot;
wherein said primary tilt gear comprises a carrier connector receivable in said slot of said carrier;
wherein said primary tilt gear may rotate in a first tilt direction or a second tilt direction; and
wherein said carrier is slidable in a first translation direction along said spindle when the primary tilt gear rotates in said first tilt direction; and said carrier is slidable in a second translation distance along the spindle when said primary tilt gear rotates in said second tilt direction.

7. The actuator of claim 6, further comprising a wiper attached to said carrier.

8. The actuator of claim 7, further comprising a PCB with an attached carbon strip wherein said wiper contacts said carbon strip.

9. The actuator of claim 7, wherein
said wiper is slidable along said carbon strip in a first wiper direction when said carrier slides in said first translation direction along said spindle; and
wherein said wiper is slidable along said carbon strip in a second wiper direction when said carrier slides in said second translation direction along said spindle.

10. A rearview device with an actuator according to claim 6.

* * * * *